(12) United States Patent
Benattar

(10) Patent No.: US 12,256,192 B2
(45) Date of Patent: *Mar. 18, 2025

(54) ACTIVE NOISE CONTROL AND CUSTOMIZED AUDIO SYSTEM

(71) Applicant: STAGES LLC, Cranbury, NJ (US)

(72) Inventor: Benjamin D Benattar, Cranbury, NJ (US)

(73) Assignee: STAGES LLC, Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,691

(22) Filed: May 15, 2023

(65) Prior Publication Data

US 2023/0336912 A1    Oct. 19, 2023

Related U.S. Application Data

(63) Continuation of application No. 16/819,679, filed on Mar. 16, 2020, now Pat. No. 11,689,846, which is a
(Continued)

(51) Int. Cl.
*H04R 1/40* (2006.01)
*H04R 1/02* (2006.01)
(Continued)

(52) U.S. Cl.
CPC ............. *H04R 1/406* (2013.01); *H04R 1/028* (2013.01); *H04R 5/027* (2013.01); *H04R 5/033* (2013.01);
(Continued)

(58) Field of Classification Search
CPC ........ H04R 1/406; H04R 1/028; H04R 5/027; H04R 5/033; H04R 5/0335; H04R 5/04;
(Continued)

(56) References Cited

U.S. PATENT DOCUMENTS 5,638,343 A * 6/1997 Ticknor ........... G11B 20/10527
369/4
6,959,075 B2 * 10/2005 Cutaia ............... H04M 3/42221
370/260
(Continued)

*Primary Examiner* — Paul Kim
(74) *Attorney, Agent, or Firm* — UNGERMAN IP PLLC; Mark E. Ungerman

(57) ABSTRACT

An acoustic customization system to enhance a user's audio environment. One type of enhancement would allow a user to wear headphones and specify what ambient audio and source audio will be transmitted to the headphones. Added enhancements may include the display of an image representing the location of one or more audio sources referenced to a user, an audio source, or other location and/or the ability to select one or more of the sources and to record audio in the direction of the selected source(s). The system may take advantage of an ability to identify the location of an acoustic source or a directionally discriminating acoustic sensor, track an acoustic source, isolate acoustic signals based on location, source and/or nature of the acoustic signal, and identify an acoustic source. In addition, ultrasound may be serve as an acoustic source and communication medium. The audio customization system may be responsive to one or more inputs that enhance aspects of an audio output and one or more inputs that diminish aspects of an audio output. The system may lessen the influence of ambient audio or in some situations enhance ambient audio over source audio. The system may specify aspects of audio to be modified by specification of filtering algorithm, characterization of audio samples, monitored distortion, user selection, location specification or environmental specification.

8 Claims, 57 Drawing Sheets

Related U.S. Application Data continuation of application No. 15/532,866, filed as application No. PCT/US2015/064139 on Dec. 4, 2015, now Pat. No. 10,609,475, and a continuation-in-part of application No. 14/827,317, filed on Aug. 15, 2015, now abandoned, and a continuation-in-part of application No. 14/827,322, filed on Aug. 15, 2015, now abandoned, and a continuation-in-part of application No. 14/827,315, filed on Aug. 15, 2015, now Pat. No. 9,747,367, and a continuation-in-part of application No. 14/827,316, filed on Aug. 15, 2015, now abandoned, and a continuation-in-part of application No. 14/827,319, filed on Aug. 15, 2015, now abandoned, and a continuation-in-part of application No. 14/827,320, filed on Aug. 15, 2015, now Pat. No. 9,654,868, and a continuation-in-part of application No. 14/561,972, filed on Dec. 5, 2014, now Pat. No. 9,508,335.

(51) Int. Cl.
*H04R 5/027* (2006.01)
*H04R 5/033* (2006.01)
*H04R 5/04* (2006.01)
*H04S 7/00* (2006.01)
*H04R 1/10* (2006.01)
*H04R 3/00* (2006.01)

(52) U.S. Cl.
CPC ............ *H04R 5/0335* (2013.01); *H04R 5/04* (2013.01); *H04S 7/304* (2013.01); *H04R 1/1083* (2013.01); *H04R 3/005* (2013.01); *H04R 2201/023* (2013.01); *H04R 2460/01* (2013.01); *H04S 2400/01* (2013.01)

(58) Field of Classification Search
CPC ............................ H04R 1/1083; H04R 3/005; H04R 2201/023; H04R 2460/01; H04S 7/304; H04S 2400/01
USPC ........................................................... 381/92
See application file for complete search history.

(56) References Cited

U.S. PATENT DOCUMENTS

| | | | |
|---|---|---|---|
| 2006/0056638 A1* | 3/2006 | Schobben | H04S 1/002 381/17 |
| 2014/0270231 A1* | 9/2014 | Dusan | G10L 25/90 381/74 |

* cited by examiner

DISTANCE FROM AMBIENT SOUND SOURCE

AUTOMATIC    MANUAL (NOTE: AUTOMATIC WILL UTILIZE 360° MICROPHONE ARRAY TO ADJUST BASED ON RELATIVE STRENGTH OF UNDESIRED AMBIENT NOISE)

DISTANCE FROM MICROPHONE ARRAY TO EAR (SLIDE ADJUSTMENT)

|  | COMMUNICATIONS TABLE | | | 1810 |
|---|---|---|---|---|
| 1834 | REQUESTING ID | REQUESTED ID | AUTHORIZATION FLAG | 1811 |
| 1834 | 1831 | 1832 | | |

FIG. 18

|  | AUTHORIZATION TABLE | | 1912 |
|---|---|---|---|
| 1933 | TRANSMITTING STATION ID | TRANSMIT AUTHORIZATION | 1935 |
|  |  |  |  |
|  |  |  |  |

FIG. 19

ACTIVE NOISE CONTROL AND CUSTOMIZED AUDIO SYSTEM

CROSS REFERENCE RELATED APPLICATIONS

This application is a continuation of application Ser. No. 16/819,679 filed on Mar. 16, 2020, which is a continuation of application Ser. No. 15/532,866 filed on Jun. 2, 2017, now U.S. Pat. No. 10,609,475 issued on Mar. 31, 2020, which is the National Stage Entry of PCT/US2015/064139 filed Dec. 4, 2015, which is a continuation-in-part of i) application Ser. No. 14/827,315 filed Aug. 15, 2015, now U.S. Pat. No. 9,747,367 issued on Aug. 29, 2017, ii) a continuation-in-part of application Ser. No. 14/827,316 filed Aug. 15, 2015, abandoned on Dec. 21, 2017, iii) a continuation-in-part of application Ser. No. 14/827,317, abandoned on Aug. 2, 2017, iv) a continuation-in-part of application Ser. No. 14/827,319 filed Aug. 15, 2015, abandoned Oct. 15, 2018, v) a continuation-in-part of application Ser. No. 14/827,320 filed Aug. 15, 2015, now U.S. Pat. No. 9,654,868 issued on May 16, 2017, vi) a continuation-in-part of application Ser. No. 14/827,322 filed Aug. 15, 2015, abandoned on Jun. 20, 2018, and vii) a continuation-in-part of application Ser. No. 14/561,972 filed Dec. 5, 2014, now U.S. Pat. No. 9,508,335 issued on Nov. 29, 2016.

This application claims the subject matter of application Ser. No. 15/355,822 filed Nov. 18, 2016, now U.S. Pat. No. 10,945,080 issued on Mar. 9, 2021. This application claims the subject of application Ser. No. 15/946,647 filed Apr. 5, 2018, now U.S. Pat. No. 11,330,388 issued May 10, 2022.

BACKGROUND OF THE INVENTION

1. Field of the Invention

The invention relates to audio processing systems and particularly customized audio adjustment systems.

2. Description of the Related Technology

Personal audio players are nearly ubiquitous. The popularization of smartphones has ushered in an environment where anyone and everyone with a smartphone has an on-board personal audio player. Personal audio is typically delivered to a user by headphones. Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

Active noise reduction; active noise cancellation and active noise control are known in the prior art Elliot, S. J. et al., "Active Noise Control," IEEE Signal Processing Magazine, October 1993 (pages 12-35), the disclosure of which is expressly incorporated by reference herein, describes the history and background of active noise control systems and describes the use of adaptive filters.

Kuo, Sen M. et al., "Active Noise Control: A Tutorial Review," Proceeding of the IEEE, Vol. 87, No. 6, June 1999 (pages 943-973), the disclosure of which is expressly incorporated by reference herein, describes principles and systems for active noise control.

Kuo, Sen M. et al., "Design of Active Noise Control Systems with the TMS320 Family," Application Report, Texas Instruments Digital Signal Processing Solutions, Digital Signal Processing Products—Semiconductor Group, SPRA042, June 1996, the disclosure of which is expressly incorporated by reference herein, describes specialized digital signal processors designed for real-time processing of digitized signals and details the design of an Active Noise Control ("ANC") system using a TMS320 DSP.

United States Published Patent Application US 2014-0044275, the disclosure of which is expressly incorporated by reference herein, describes an active noise control system with compensation for error sensing at the ear drum including a subjective tuning module and user control.

Active noise control systems utilize various active filtration techniques and rely on algorithms to process source audio to reduce the influence of noise on the listener. This may be accompanied by modification of the source audio by combination with an "anti-noise" signal derived from comparing ambient sound to source audio at the ear of a listener.

Active noise control devices in the prior art suffer from being incapable of addressing the wide variation of ambient sound, dominant noise, acoustic sensors, specific characteristics of headphones or earphones or other listening devices, the type nature and characteristics of source audio (such as sound from a digital electronic device), and individual audio perceptions as each of these and other elements of sound interact to comprise a listening experience.

Adaptive noise cancellation is described in Singh, Arti. "Adaptive Noise Cancellation," Dept. of Electronics & Communications, Netaji Subhas Institute of Technology, (2001). http://www.cs.cmu.edu/naarti/pubs/ANC.pdf#. Accessed Nov. 21, 2014, the disclosure of which is incorporated herein. The customization according to the invention may be performed in accordance with the principles described therein.

U.S. Patent Application Publication No. US 2013/0325993 A1, the disclosure of which is incorporated by reference herein, discloses a method and system for group-based communication in a social networking space. The system is for managing and tracking social networking group events and does not contemplate free form connections for audio communications.

Advancements in hearing aid technology have resulted in numerous developments which have served to improve the listening experience for people with hearing impairments, but these developments have been fundamentally limited by an overriding need to minimize size and maximize invisibility of the device. Resulting limitations from miniaturized form factors include limits on battery size and life, power consumption and, thus, processing power, typically two or fewer microphones per side (left and right) and a singular focus on speech recognition and speech enhancement.

Hearing aid technology may use "beamforming" and other methods to allow for directional sound targeting to isolate and amplify just speech, wherever that speech might be located.

Hearing aid technology includes methods and apparatus to isolate and amplify speech and only speech, in a wide variety of environments, focusing on the challenge of "speech in noise" or the "cocktail party" effect (the use of directional sound targeting in combination with noise cancellation has been the primary approach to this problem).

Hearing aid applications typically ignore or minimize any sound in the ambient environment other than speech. Hearing devices may also feature artificial creation of sounds as masking to compensate for tinnitus or other unpleasant remnants of the assistive listening experience for those suffering from hearing loss.

Due to miniature form factors, hearing aids are constrained by a severe restriction on available power to preserve battery life which results in limitations in signal processing power. Applications and devices not constrained by such limitations but rather focused on providing the highest quality listening experience are able to utilize the highest quality of signal processing, which among other things, will maintain a high sampling rate, typically at least twice that of the highest frequency that can be perceived. Music CDs have a 44.1 kHz sampling rate to preserve the ability to process sound with frequencies up to about 20 kHz. Most hearing devices sample at rates significantly below 44.1 kHz, resulting in a much lower range of frequencies that can be analyzed for speech patterns and then amplified, further necessitating the use of compression and other compensating methodologies in an effort to preserve the critical elements of speech recognition and speech triggers that reside in higher frequencies.

Hearing aids have almost always required the need to compensate for loss of hearing at very high frequencies, and given equivalent volume is much higher for very high and very low frequencies (i.e., more amplification is required to achieve a similar volume in higher and lower frequencies as midrange frequencies), one strategy has been compression (wide dynamic range compression or WDRC) whereby either the higher frequency ranges are compressed to fit within a lower frequency band, or less beneficially, higher frequency ranges are literally cut and pasted into a lower band, which requires a learning curve for the user.

For these reasons hearing aid technologies do not adequately function within the higher frequency bands where a great deal of desired ambient sound exists for listeners, and hearing aids and their associated technologies have neither been developed to, nor are capable as developed, to enhance the listening experience for listeners who do not suffer from hearing loss but rather want an optimized listening experience.

Noise reduction systems have been implemented in such a way that their use and processing is fixed across listening environments in either an On/Off paradigm or a degree of noise reduction setting, or on a frequency-specific basis utilizing multi-channel processors to apply noise reduction within specific frequency bands, however, in each of these systems, other than identifying speech within a hearing aid application, these noise reduction systems have treated all ambient noise as a single class of disturbance.

Typical hearing devices utilize either a system of a) isolating steady-state sound or other ambient sounds that do not correspond to predetermined modulation rates and peak to trough characteristics or b) measure signal to noise ratios in an ambient environment which all assume the desired "signal" is speech, or within frequency bands in a multi-channel system to similarly isolate environments in which signal to noise ratios are high (all ambient sound is not too loud and thus lower or no noise suppression across frequencies or within frequency bands is applied) or in which signal to noise ratios are low (all ambient sound is deemed to be too loud/undesirable and thus more noise suppression is applied), but the invention will allow similar systems to be employed with the fundamental and unique attribute that they will allow the listener to determine which sounds or signals in the ambient environment are desirable and to similarly determine which signals or sound profiles constitute undesired noise, thus enabling the established methodologies of utilizing modulation and other sound pattern or signal to noise methodologies to be employed in the current invention. These methodologies may incorporate the inclusion of speech, in general, as the relevant signal, or may further refine the characteristics of that speech to associate the signal with the speech of a child or of children, or certain specific individuals or sounds which incorporate speech as part of their acoustic signal, but will also focus on the limitless combination of ambient sound which are, in fact, desirable and not group all such sounds into a single group as has been done in the prior art. Headphone, earphone and other listening devices have focused on the reproduction of source audio signals at the ears of listeners and have all been developed with the assumption or belief that such source audio signal is the only source of desired sound. These listening devices later incorporated one or more microphones either for use in noise cancellation or to enable the listening devices to function as the speaking and hearing components of wireless communication devices, recognizing the benefit to users of not having to remove such listening device when using such wireless communication system. In each of these incarnations and scenarios where users may wish to communicate with others in their presence, these listening devices have muted the source sound while activating the microphone. Neither hearing aid nor active noise cancellation technologies are capable of permitting users to communicate with others in their presence while also permitting admission of desirable audio information to the user.

It is known to use microphone arrays and beamforming technology in order to locate and isolate an audio source. Personal audio is typically delivered to a user by headphones. Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

A sensitive transducer element of a microphone is called its element or capsule. Except in thermophone based microphones, sound is first converted to mechanical motion by means of a diaphragm, the motion of which is then converted to an electrical signal. A complete microphone also includes a housing, some means of bringing the signal from the element to other equipment, and often an electronic circuit to adapt the output of the capsule to the equipment being driven. A wireless microphone contains a radio transmitter.

The condenser microphone is also called a capacitor microphone or electrostatic microphone. Here, the diaphragm acts as one plate of a capacitor, and the vibrations produce changes in the distance between the plates.

A fiber optic microphone converts acoustic waves into electrical signals by sensing changes in light intensity, instead of sensing changes in capacitance or magnetic fields as with conventional microphones. During operation, light from a laser source travels through an optical fiber to illuminate the surface of a reflective diaphragm. Sound vibrations of the diaphragm modulate the intensity of light reflecting off the diaphragm in a specific direction. The modulated light is then transmitted over a second optical fiber to a photo detector, which transforms the intensity-modulated light into analog or digital audio for transmission or recording. Fiber optic microphones possess high dynamic and frequency range, similar to the best high-fidelity conventional microphones. Fiber optic microphones do not react to or influence any electrical, magnetic, electrostatic or radioactive fields (this is called EMI/RFI immunity). The fiber optic microphone design is therefore ideal for use in areas where conventional microphones are ineffective or dangerous, such as inside industrial turbines or in magnetic resonance imaging (MRI) equipment environments.

Fiber optic microphones are robust, resistant to environmental changes in heat and moisture, and can be produced for any directionality or impedance matching. The distance between the microphone's light source and its photo detector may be up to several kilometers without need for any preamplifier or other electrical device, making fiber optic microphones suitable for industrial and surveillance acoustic monitoring. Fiber optic microphones are suitable for use application areas such as for infrasound monitoring and noise-canceling.

U.S. Pat. No. 6,462,808 B2, the disclosure of which is incorporated by reference herein shows a small optical microphone/sensor for measuring distances to, and/or physical properties of, a reflective surface The MEMS (MicroElectrical-Mechanical System) microphone is also called a microphone chip or silicon microphone. A pressure-sensitive diaphragm is etched directly into a silicon wafer by MEMS processing techniques, and is usually accompanied with integrated preamplifier. Most MEMS microphones are variants of the condenser microphone design. Digital MEMS microphones have built in analog-to-digital converter (ADC) circuits on the same CMOS chip making the chip a digital microphone and so more readily integrated with modern digital products. Major manufacturers producing MEMS silicon microphones are Wolfson Microelectronics (WM7xxx), Analog Devices, Akustica (AKU200x), Infineon (SMM310 product), Knowles Electronics, Memstech (MSMx), NXP Semiconductors, Sonion MEMS, Vesper, AAC Acoustic Technologies, and Omron.

A microphone's directionality or polar pattern indicates how sensitive it is to sounds arriving at different angles about its central axis. The polar pattern represents the locus of points that produce the same signal level output in the microphone if a given sound pressure level (SPL) is generated from that point. How the physical body of the microphone is oriented relative to the diagrams depends on the microphone design. Large-membrane microphones are often known as "side fire" or "side address" on the basis of the sideward orientation of their directionality. Small diaphragm microphones are commonly known as "end fire" or "top/end address" on the basis of the orientation of their directionality.

Some microphone designs combine several principles in creating the desired polar pattern. This ranges from shielding (meaning diffraction/dissipation/absorption) by the housing itself to electronically combining dual membranes.

An omni-directional (or non-directional) microphone's response is generally considered to be a perfect sphere in three dimensions. In the real world, this is not the case. As with directional microphones, the polar pattern for an "omni-directional" microphone is a function of frequency. The body of the microphone is not infinitely small and, as a consequence, it tends to get in its own way with respect to sounds arriving from the rear, causing a slight flattening of the polar response. This flattening increases as the diameter of the microphone (assuming it's cylindrical) reaches the wavelength of the frequency in question.

A Unidirectional Microphone is Sensitive to Sounds from Only One Direction

A noise-canceling microphone is a highly directional design intended for noisy environments. One such use is in aircraft cockpits where they are normally installed as boom microphones on headsets. Another use is in live event support on loud concert stages for vocalists involved with live performances. Many noise-canceling microphones combine signals received from two diaphragms that are in opposite electrical polarity or are processed electronically. In dual diaphragm designs, the main diaphragm is mounted closest to the intended source and the second is positioned farther away from the source so that it can pick up environmental sounds to be subtracted from the main diaphragm's signal. After the two signals have been combined, sounds other than the intended source are greatly reduced, substantially increasing intelligibility. Other noise-canceling designs use one diaphragm that is affected by ports open to the sides and rear of the microphone.

Sensitivity indicates how well the microphone converts acoustic pressure to output voltage. A high sensitivity microphone creates more voltage and so needs less amplification at the mixer or recording device. This is a practical concern but is not directly an indication of the microphone's quality, and in fact the term sensitivity is something of a misnomer, "transduction gain" being perhaps more meaningful, (or just "output level") because true sensitivity is generally set by the noise floor, and too much "sensitivity" in terms of output level compromises the clipping level.

A microphone array is any number of microphones operating in tandem. Microphone arrays may be used in systems for extracting voice input from ambient noise (notably telephones, speech recognition systems, hearing aids), surround sound and related technologies, binaural recording, locating objects by sound: acoustic source localization, e.g., military use to locate the source(s) of artillery fire, aircraft location and tracking.

Typically, an array is made up of omni-directional microphones, directional microphones, or a mix of omni-directional and directional microphones distributed about the perimeter of a space, linked to a computer that records and interprets the results into a coherent form. Arrays may also be formed using numbers of very closely spaced microphones. Given a fixed physical relationship in space between the different individual microphone transducer array elements, simultaneous DSP (digital signal processor) processing of the signals from each of the individual microphone array elements can create one or more "virtual" microphones.

Beamforming or spatial filtering is a signal processing technique used in sensor arrays for directional signal transmission or reception. This is achieved by combining elements in a phased array in such a way that signals at particular angles experience constructive interference while others experience destructive interference. A phased array is an array of antennas, microphones, or other sensors in which the relative phases of respective signals are set in such a way that the effective radiation pattern is reinforced in a desired direction and suppressed in undesired directions. The phase relationship may be adjusted for beam steering. Beamforming can be used at both the transmitting and receiving ends in order to achieve spatial selectivity. The improvement compared with omni-directional reception/transmission is known as the receive/transmit gain (or loss).

Adaptive beamforming is used to detect and estimate a signal-of-interest at the output of a sensor array by means of optimal (e.g., least-squares) spatial filtering and interference rejection.

To change the directionality of the array when transmitting, a beamformer controls the phase and relative amplitude of the signal at each transmitter, in order to create a pattern of constructive and destructive interference in the wavefront. When receiving, information from different sensors is combined in a way where the expected pattern of radiation is preferentially observed.

With narrow-band systems the time delay is equivalent to a "phase shift", so in the case of a sensor array, each sensor output is shifted a slightly different amount. This is called a phased array. A narrow band system, typical of radars or small microphone arrays, is one where the bandwidth is only a small fraction of the center frequency. With wide band systems this approximation no longer holds, which is typical in sonars.

In the receive beamformer the signal from each sensor may be amplified by a different "weight." Different weighting patterns (e.g., Dolph-Chebyshev) can be used to achieve the desired sensitivity patterns. A main lobe is produced together with nulls and sidelobes. As well as controlling the main lobe width (the beam) and the sidelobe levels, the position of a null can be controlled. This is useful to ignore noise or jammers in one particular direction, while listening for events in other directions. A similar result can be obtained on transmission.

Beamforming techniques can be broadly divided into two categories:
  a. conventional (fixed or switched beam) beamformers
  b. adaptive beamformers or phased array
    i. desired signal maximization mode
    ii. interference signal minimization or cancellation mode Conventional beamformers use a fixed set of weightings and time-delays (or phasings) to combine the signals from the sensors in the array, primarily using only information about the location of the sensors in space and the wave directions of interest. In contrast, adaptive beamforming techniques generally combine this information with properties of the signals actually received by the array, typically to improve rejection of unwanted signals from other directions. This process may be carried out in either the time or the frequency domain.

As the name indicates, an adaptive beamformer is able to automatically adapt its response to different situations. Some criterion has to be set up to allow the adaption to proceed such as minimizing the total noise output. Because of the variation of noise with frequency, in wide band systems it may be desirable to carry out the process in the frequency domain.

Beamforming can be computationally intensive.

Beamforming can be used to try to extract sound sources in a room, such as multiple speakers in the cocktail party problem. This requires the locations of the speakers to be known in advance, for example by using the time of arrival from the sources to mics in the array, and inferring the locations from the distances.

A Primer on Digital Beamforming by Toby Haynes, Mar. 26, 1998 http://www.spectrumsignal.com/publications/beamform_primer.pdf describes beam forming technology.

According to U.S. Pat. No. 5,581,620, the disclosure of which is incorporated by reference herein, many communication systems, such as radar systems, sonar systems and microphone arrays, use beamforming to enhance the reception of signals. In contrast to conventional communication systems that do not discriminate between signals based on the position of the signal source, beamforming systems are characterized by the capability of enhancing the reception of signals generated from sources at specific locations relative to the system.

Generally, beamforming systems include an array of spatially distributed sensor elements, such as antennas, sonar phones or microphones, and a data processing system for combining signals detected by the array. The data processor combines the signals to enhance the reception of signals from sources located at select locations relative to the sensor elements. Essentially, the data processor "aims" the sensor array in the direction of the signal source. For example, a linear microphone array uses two or more microphones to pick up the voice of a talker. Because one microphone is closer to the talker than the other microphone, there is a slight time delay between the two microphones. The data processor adds a time delay to the nearest microphone to coordinate these two microphones. By compensating for this time delay, the beamforming system enhances the reception of signals from the direction of the talker, and essentially aims the microphones at the talker.

A beamforming apparatus may connect to an array of sensors, e.g. microphones that can detect signals generated from a signal source, such as the voice of a talker. The sensors can be spatially distributed in a linear, a two-dimensional array or a three-dimensional array, with a uniform or non-uniform spacing between sensors. A linear array is useful for an application where the sensor array is mounted on a wall or a podium talker is then free to move about a half-plane with an edge defined by the location of the array. Each sensor detects the voice audio signals of the talker and generates electrical response signals that represent these audio signals. An adaptive beamforming apparatus provides a signal processor that can dynamically determine the relative time delay between each of the audio signals detected by the sensors. Further, a signal processor may include a phase alignment element that uses the time delays to align the frequency components of the audio signals. The signal processor has a summation element that adds together the aligned audio signals to increase the quality of the desired audio source while simultaneously attenuating sources having different delays relative to the sensor array. Because the relative time delays for a signal relate to the position of the signal source relative to the sensor array, the beamforming apparatus provides, in one aspect, a system that "aims" the sensor array at the talker to enhance the reception of signals generated at the location of the talker and to diminish the energy of signals generated at locations different from that of the desired talker's location. The practical application of a linear array is limited to situations which are either in a half plane or where knowledge of the direction to the source in not critical. The addition of a third sensor that is not co-linear with the first two sensors is sufficient to define a planar direction, also known as azimuth. Three sensors do not provide sufficient information to determine elevation of a signal source. At least a fourth sensor, not co-planar with the first three sensors is required to obtain sufficient information to determine a location in a three dimensional space.

Although these systems work well if the position of the signal source is precisely known, the effectiveness of these systems drops off dramatically and computational resources required increases dramatically with slight errors in the estimated a priori information. For instance, in some systems with source-location schemes, it has been shown that the data processor must know the location of the source within a few centimeters to enhance the reception of signals. Therefore, these systems require precise knowledge of the position of the source, and precise knowledge of the position of the sensors. As a consequence, these systems require both that the sensor elements in the array have a known and static spatial distribution and that the signal source remains stationary relative to the sensor array. Furthermore, these beamforming systems require a first step for determining the talker position and a second step for aiming the sensor array based on the expected position of the talker.

A change in the position and orientation of the sensor can result in the aforementioned dramatic effects even if the talker is not moving due to the change in relative position and orientation due to movement of the arrays. Knowledge of any change in the location and orientation of the array can compensate for the increase in computational resources and decrease in effectiveness of the location determination and sound isolation. An accelerometer is a device that measures acceleration of an object rigidly inked to the accelerometer. The acceleration and timing can be used to determine a change in location and orientation of an object linked to the accelerometer.

U.S. Pat. No. 7,415,117 shows audio source location identification and isolation. Known systems rely on stationary microphone arrays. Known systems rely on stationary microphone arrays. In digital recording, audio signals are converted into a stream of discrete numbers, representing the magnitude of the audio air pressure or changes over time in air pressure. In this way, analog audio signals are converted into a stream of discrete numbers, representing the changes over time in air pressure. The discrete numbers are then recorded to digital media, such as DAT or addressable memory. To play back a digital recording, the numbers are retrieved and converted back into their original analog waveforms.

U.S. Pat. No. 7,492,907 B2 relates to multi-channel audio enhancement system for use in recording and playback and methods for providing same. It describes an audio enhancement system and method for use that receives a group of multi-channel audio signals and provides a simulated surround sound environment through playback of only two output signals. The group of audio signals, represent sounds existing in a 360 degree sound field, are combed to create a pair of signals which can accurately represent the 360 degree sound field when played through a pair of speakers. The multi-channel audio signals comprise a pair of front signals intended for playback from a forward sound stage and a pair of rear signals intended for playback from a rear sound stage. The front and rear signals are modified in pairs by separating an ambient component of each pair of signals from a direct component and processing at least some of the components with a head-related transfer function. Processing of the individual audio signal components is determined by an intended playback position of the corresponding original audio signals. The individual audio signal components are then selectively combined with the original audio signals to form two enhanced output signals for generating a surround sound experience upon playback Ultrasounds are sound waves with frequencies higher than the upper audible limit of human hearing. Ultrasound is not different from 'normal' (audible) sound in its physical properties, only in that humans cannot hear it. This limit varies from person to person and is approximately 20 kilohertz (20,000 hertz) in healthy, young adults. Ultrasound devices operate with frequencies from 20 kHz up to several gigahertz.

Ultrasound is used in many different fields. Ultrasonic devices are used to detect objects and measure distances. Ultrasound imaging or sonography is often used in medicine. In the nondestructive testing of products and structures, ultrasound is used to detect invisible flaws. Industrially, ultrasound is used for cleaning, mixing, and to accelerate chemical processes. Animals such as bats and porpoises use ultrasound for locating prey and obstacles. Scientist are also studying ultrasound using graphene diaphragms as a method of communication. https://en.wikipedia.org/wiki/Ultrasound [Nov. 24, 2015]

Use of ultrasound to transmit data signals has been discussed. Jiang, W., "Sound of silence": a secure indoor wireless ultrasonic communication system, School of Engineering—Electrical & Electronic Engineering, UCC, Snapshots of Doctoral Research at University College Cork 2014, http://publish.ucc.ie/boolean/pdf/2014/00/09-jiang-2014-00-en.pdf, retrieved Nov. 24, 2015. Sound is a mechanical vibration or pressure wave that can be transmitted through a medium such as air, water or solid materials. Unlike radio waves, sound waves are regulation free and do not interfere with wireless devices operating at radio frequencies. According to Jiang, there are also no known adverse medical effects of low-energy ultrasound exposure. On the other hand, ultrasound can be confined easily due to the way that it moves. Ultrasound travelling through air does not penetrate through walls or windows. Jiang proposes to use ultrasonic technology for secure and reliable wireless networks using digital transmissions by turning a transmitter on and off where the presence of an ultrasonic wave represents a digit '1' and its absence represents a digit '0'. In this way Jiang proposes a series of ultrasound bursts travelling as pressure waves through the air. A receiving sensor may detect corresponding changes of sound pressure, and converts it into an electrical signal.

A voice frequency (VF) or voice band is one of the frequencies, within part of the audio range that is used for the transmission of speech. In telephony, the usable voice frequency band ranges from approximately 300 Hz to 3400 Hz. It is for this reason that the ultra-low frequency band of the electromagnetic spectrum between 300 and 3000 Hz is also referred to as voice frequency, being the electromagnetic energy that represents acoustic energy at baseband. The bandwidth allocated for a single voice-frequency transmission channel is usually 4 kHz, including guard bands, allowing a sampling rate of 8 kHz to be used as the basis of the pulse code modulation system used for the digital PSTN. Per the Nyquist-Shannon sampling theorem, the sampling frequency (8 kHz) must be at least twice the highest component of the voice frequency via appropriate filtering prior to sampling at discrete times (4 kHz) for effective reconstruction of the voice signal.

The voiced speech of a typical adult male will have a fundamental frequency from 85 to 180 Hz, and that of a typical adult female from 165 to 255 Hz. Thus, the fundamental frequency of most speech falls below the bottom of the "voice frequency" band as defined above. However, enough of the harmonic series will be present for the missing fundamental to create the impression of hearing the fundamental tone. Wikipedia, Voice Frequency, https://en.wikipedia.org/wiki/Voice_frequency, retrieved Nov. 24, 2015.

U.S. Pat. No. 3,806,919 entitled, "Light Organ," is expressly incorporated by reference herein. U.S. Pat. No. 3,806,919 relates to a light organ and shows a system for energizing lights in response to sound intensity. Light organs may be responsive to a microphone or electrical signals corresponding to audio. U.S. Pat. No. 3,806,919 shows a detector amplifier stage that generates a signal representative of sound intensity detected by a microphone. The output of the amplifier stage controls the switching of a phase-controlled power switch connected across one of two lamp filaments connected in series. As the intensity of one lamp increases with sound intensity, the intensity of the other decreases. Automatic gain control circuitry adjusts the gain of the amplifier stages such that the lighting effect is substantially the same response for sound changes, and it is independent of ambient sound level. The lamps used are disclosed as having filaments which operate across an AC power source such as a full wave rectified 117-volt, 60 Hertz source.

In various lighting applications, the use of light emitting diodes (LEDs) for illumination or decoration is now known. LEDs have long life, are energy efficient, are durable and operate over a wide temperature range. PixMob offers a wireless lighting technology that controls wearable LED devices intended to be worn by many individuals in a densely populated area such as a stadium or arena. By transforming the wearable objects into pixels, the crowd becomes a display. The light effects produced by the LED devices can be controlled to match a light show, pulsate in sync with the music, react to the body movement, etc. PixMob technology uses infrared or Bluetooth Low Energy ("BLE") to control RGB LEDs that are embedded in different objects such as balls or wristbands. These wearable objects are given to an audience, transforming each individual into a pixel during the show. To light up each pixel (i.e. each LED), commands are sent from computers to transmitters that emit invisible light (infrared) or BLE. The signals are picked up by receivers in each object and goes to a microprocessor to control the LEDs. This enables the creation of animated video effects and transforms the audience into a display screen. Despite the low-resolution result due to a low number of pixels, quite detailed video effects can be achieved on a large canvas, using bright colors and bold movements. The control of an individual LED may be either based on an expected location of the LED or may be dependent on proximity to a known location.

Xylobands are another known wearable LED and control system for use, for example, in a concert venue. Xylobands are wristbands which contain light-emitting diodes and radio frequency receivers. The lights inside the wristband may be controlled by a software program, which sends signals to the wristband, instructing it to light up or blink, for example. They are available in green, blue, yellow, red, pink and white. The wristbands themselves may be constructed of a thick fabric with LEDs inside the fabric. A radio receiver is located within a plastic piece on the band, and it receives wireless signals from a controller, which is hosted on a laptop computer linked to a radio transmitter, which can remotely control the bands from up to 328 yards away. The operator of the laptop software may program all wristbands or only those of certain colors to flash on and off at specific intervals and specific moments. The wristbands are not intended to be lit outside of the concert venue. https://en.wikipedia.org/wiki/Xyloband.

U.S. 2014/0184386 A1 relates, in general, to an interactive lighting effect and is particularly, but not exclusively, applicable to electronic wristbands that can be selectively activated to energize light emitting devices integrated into each wristband to produce a coordinated display from individual wristbands worn by members of an audience at a show, such as a concert or a sporting event. In the exemplary context of an RF-based LED wristband with an integrated antenna. The wristbands are intended to be distributed at an event upon payment to an event organizer or pre-delivered. Typically, the wristband will include a controller coupled to a local power source, such as a battery. The controller is programmable through a suitable interface, which may include a physical connection or a passively accessible contact. In addition, each wristband contains at least one high-intensity LED device (or other controllable light-emitting device) operationally responsive to a control signal issued by a control station. The control station communicates with the wristbands using an RF transmitter and, if necessary, repeater stations that provide appropriate RF coverage within an arena or venue. Data bursts may be targeted using an activation code assigned to one or more of the wristbands. The wristbands may be assigned a zone address correspondingly the section of the venue that the user is expected to be in before it is deployed. Actuation of LEDs on the wristbands to support lighting effects is based on the assigned address and is not dependent on the actual location of the wristband in any way. The use of RF is preferred.

WO 2014/096861 A2 relates to a system for controlling light devices in a venue to create an image based on the position of the light devices. The position of a light device may be determined by GPS data or proximity using near field technology, RFID tags, or Bluetooth Low Energy devices such as i Beacons (RTE). Data indicative of the position of the pixel device is received at a server, a display attribute is calculated based on the position. This is particularly useful where the pixel devices are devices without a fixed position, such as mobile phones, PDAs and tablets, etc. for forming complex visual effects.

SUMMARY OF THE INVENTION

It is an object to overcome the current deficiency in other listening devices that treat sound other than that coming from a source signal as noise or as a disturbance by noise-canceling processes that suppress those disturbances.

The system may, among other things, facilitate any desired interaction with sound. An audio signal may be conducted without either removing a listening device or muting or silencing a source audio signal. The system may allow a listener to combine and customize one or more sources of sound, both ambient and otherwise, to personalize and enhance a listening experience.

It is an object to overcome the current deficiency in hearing aid and assistive listening device technologies that isolate speech within the ambient environment and classify other sound as noise or as a disturbance and thus apply noise cancellation to suppress non-speech sound and isolate and amplify speech.

It is an object to provide a system to customize audio. The customized audio system may be used to enhance desirable audio information, decrease undesirable audio information, and/or tune audio to improve listening experience.

It is an object to provide a personal active noise control system that can function using any combination of a single noise detecting microphone, two noise detecting microphones and an array of noise detection microphones (acoustic sensors).

It is an object to provide a personal active noise control system using traditional microphone technologies and MEMS or other miniature or acoustic sensors on silicon and similar technologies to maximize the amount of ambient acoustic information which can be detected so such information may be analyzed and utilized to customize the listening experience for the user.

It is an object to provide an active noise control system that allows a user to adjust the system based on personal preferences.

It is an object to provide an active noise control system that adjusts or allows a user to adjust the system to respond to environmental noise conditions.

No pre-fixed algorithm can optimally compensate for a wide variation of noise in a matter that is optimal for an individual listener. Every individual hears sound in a different way, and noise cancellation may be optimized by providing a system that allows a user to either adjust the filtration algorithms or switch among them in a variety of ways to enhance the listening experience.

It has also been found that the wide variation of environments including background noise and dominant noise types, variations in sensor characteristics and positioning, and variation in speakers create a complex profile that cannot be adequately compensated for by static active filtration algorithms.

For this reason, the system may involve an adjustable active filtration system in combination with customizable digital signal processing to be utilized in active noise reduction.

The system may be implemented in either hardware or software. Hardware may be incorporated into headphones, earphones or other listening devices and may take the form of a device that can be coupled to any existing or future headphones, earphones or other listening devices. Software may be installed in either dedicated peripherals or included in the software or operating system in any mobile audio or telephony device.

It is an object of the system to enable a consumer audio device or assistive listening device user to avoid having to choose between listening to a source signal or listening to environmental audio as captured by one or more microphones.

It an object to introduce those aspects of the ambient sound environment that a listener identifies as desirable into the source or streamed listening environment, and to make one or more adjustments to enhance the resulting combined sound.

The system may use directional microphones, microphone arrays, omni-directional microphones, miniature or MEMS microphones (MEMS microphones are very small microphones, generally less than 1 millimeter, that can be incorporated directly onto an electronic chip and commonly uses a small thin membrane fabricated on the chip to detect sound), digital signal processes and sound filtration processes to enable listeners to actively characterize elements of the ambient sound environments in which they find themselves into desirable sound and undesirable noise, and to customize and adjust those environments specifically to tailor their noise cancellation experience. This will enable listeners to interact with the ambient sound environment without the need to remove their hearing device or otherwise mute or bypass the source signal of whatever consumer audio or mobile telephony device they might be utilizing.

It is a further object to allow users to utilize a library of predetermined desirable ambient sounds and ambient profiles or "experiences" to result in an immediately enhanced listening experience and also allow users to add additional desirable ambient sounds and listening "experiences" to their individual libraries which will provide the system with an updated database of information. As an example, a listener may be able to hear important information or hold a conversation with another person without the need to remove the listening device or mute or bypass the source signal. As another example, a listener may be able to utilize a device according to an embodiment to filter out unwanted elements of ambient noise not relating to speech such as in a live entertainment venue where there is ambient sound that is either too loud or otherwise too distorted relative to a level which would be comfortable for the listener. An embodiment may enable the listener to customize the ambient sound environment they hear without any input signal from a mobile audio or telephony device, and to adjust a variety of features to tailor the volume and other characteristics of the ambient sound to match their desired preference. Those settings could be saved as an "experience" within their library, along with desirable ambient sounds. Each "experience" can relate to a specific type of sound or can relate to a particular listening environment, such as a car, public transportation of any kind, etc.

Similar to voice biometric applications which have been developed primarily for use in security systems, the system may utilize sound spectrographing technology which, in recognizing that all sounds have unique characteristics which distinguish them in minute ways from other, even very similar sounds, can both record the frequency and time patterns of sounds to identify and classify them, but also effectively read existing spectrographs which may exist in a personal ambient sound library of a user, or which may otherwise reside in a database of available ambient sound spectrographs and decode such spectrographs to inform the digital signal processing and active filtration systems of those patters which should be treated as desired ambient sounds and thus included in the customized listening environment of a user when they are present in the ambient environment.

The system may allow a user to select which sounds are to be heard from both the ambient environment and the source signal, and to apply a variety of adjustments/mixing controls to that combined sound environment to ensure the appropriate blending of the sounds, such adjustments to include, but are not limited to, relative volume, timing delays, distance compensation between microphones or both microphones and source signals and a wide variety of other adjustments The system may utilize one or more appropriate noise cancelling algorithms. The system may include manually or automatically adjusting parameters and/or coefficients of an algorithm, resulting in a change to the manner in which the algorithm suppresses noise.

The system may enable a user to make adjustments to the characteristics of the noise cancelling experience. The adjustments may include application of predetermined algorithms to one or more frequency bands and/or one or more channels. The system may permit generation of new or custom algorithms to facilitate the desired noise cancellation profile. The system may permit a user to access or "download" specific algorithms that relate best to a specific environment.

The system may enable users to utilize a library of predetermined desirable ambient sounds and to create and add to their own library of desirable ambient sounds. Desirable ambient sounds may be added, among other ways, through an interface which may allow the capture of desirable audio and generation of a sound profile. The sound profile may be added to the library and may operate to specify ambient sounds that may be exempted from noise cancellation.

According to the system omni-directional microphones and/or directional microphones may be used. The system may include an array of directional microphones. The array of directional microphones permits flexibility in the processing applied to audio sensed from various directions and will also facilitate the capture and subsequent analysis of many distinct characteristics of such audio for analysis and use by the system.

Directional microphones may be used to isolate and enhance or damp audio originating from a particular direction. The system may manually or automatically focus noise cancellation functions on regions where a greater degree of ambient sound is emanating, while still capturing ambient sound, and isolating undesirable ambient noise for cancellation.

The system may be implemented in one or more digital signal processors and/or adaptive filters operating on ambient, directional or directionless, source and noise audio in order to enhance delivery of desirable audio and damp delivery of undesirable audio. The system may be implemented in a single device or in multiple components. The components may be connected wirelessly or in a wired fashion.

The system may enable users to compensate or adjust for inclement listening environments, such as that experienced in a moving vehicle with the windows down or in a live entertainment venue where large speakers may be located on one side of a user, in which instance the force of the wind or the SPL of the sound creates distortion within the system; the ability of the system to utilize an array of input microphones will enable dynamic adjustment of desired ambient sound from certain microphones or direction where the acoustic representation of wind, sound pressure or other inclement environmental sounds (included as undesirable acoustic sounds) is not registered or is registered at a lower level to be compensated to whatever degree desired by the listener either manually or automatically, with desired ambient sound captured by other microphones which are not capturing such sounds (i.e., microphones on the back, front or right side of the system could be blended to compensate for such undesired sounds captured by the left side array for a driver with the driver side window down at high speed or a user standing to the left side of a stage in front of a stack of loudspeakers).

The system may be utilized in a live entertainment event like a concert. A signal may be streamed or otherwise transmitted to a device embodying the system that is simultaneously being amplified in a venue. The transmission of audio information may be related to source audio and may be similar to a "board feed" as heard by a sound engineer in a concert. The system may allow adjustment to compensate for any time delay that might exist between the ambient sound and the source signal, and adjustments to customize the audio cancellation profile of the ambient environment.

According to a feature of the system, a sampling process may be used to distinguish specific voices based on frequency, synchronous energy and modulation characteristics of the sampled audio. For example, the sounds of a child or a spouse or certain important sounds like an alarm, a telephone ringing, a mobile device notification, a ringtone, a doorbell, beach sounds or nature sounds.

In the inverse process, a feature of the system may use a sampling process to permit adoption of an adaptive filter to damp undesirable sounds. The adaptive filter may alternatively be affected by predetermined audio profiles of ambient background or dominant audio to damp.

In a situation where an acoustic source signal is identical to ambient sound, such as listening to a prerecorded or direct feed sound signal that is concurrently being broadcast in the ambient sound environment, a system according to the system may enable a noise cancelling device to recognize selected aspects of the ambient noise as desirable and thus allow the digital signal processors and filters to not treat those ambient sounds as errors or disturbances and not suppress them.

In the same manner, a system according to the system may enable a noise cancelling device to treat any elements of the source signal that are deemed to be undesirable as noise to be suppressed. An example of this might be the voice of a particular singer or a particular feature of a song that is being listened to through a mobile device, which once registered in the acoustic domain, similar to undesirable ambient sound captured by microphones outside of the acoustic domain, can then be suppressed by the system.

An embodiment of the system may incorporate digital signal processing and sampling rates equivalent to those incorporated in high fidelity digital music systems matching the full range of human hearing, e.g. sampling rates of up to 44.1 kHz corresponding to the full dynamic hearing range of an individual without hearing loss.

An embodiment according to the system may incorporate multi-channel digital signal processing to divide ambient sound environment into multiple channels based on frequency ranges, directionality, or audio characteristics, including but not limited to modulation rates that correspond to a wide variety of ambient sounds, including speech, among many others, thus enabling a system according to an embodiment of the system to identify and learn/store characteristics of unique sounds and sound patterns for inclusion in its database. The inclusion may be subject to approval by the user.

An embodiment of the system may dynamically adjust attenuation rates across channels and frequency ranges, may have a feature that enables a user to apply adaptive filters to each channel either independently or across all channels simultaneously.

According to a feature of an embodiment of the system reliance on predetermined noise cancellation algorithms or predetermined signal processing which isolates only specific sounds, such as speech may be avoided.

It is an object to provide an active noise control system that allows a user to adjust the system based on personal preferences.

It is an object to provide an active noise control system that adjusts or allows a user to adjust the system to respond to environmental noise conditions.

No pre-fixed algorithm can optimally compensate for a wide variation of noise in a matter that is optimal for an individual listener. Every individual hears sound in a different way, and noise cancellation may be optimized by providing a system that allows a user to either adjust the filtration algorithms or switch among them in a variety of ways to enhance the listening experience.

A wide variation of environments including background noise and dominant noise types, variations in sensor characteristics and positioning, and variation in speakers create a complex profile that cannot be adequately compensated for by static active filtration algorithms.

For this reason, an adjustable active filtration system in combination with customizable digital signal processing may be utilized in active noise reduction.

It is an object to enable a consumer audio device or assistive listening device user to avoid having to choose between listening to a source signal or listening to environmental audio as captured by one or more microphones.

It an object to introduce those aspects of the ambient sound environment that a listener identifies as desirable into the source or streamed listening environment, and to make one or more adjustments to enhance the resulting combined sound.

It is a further object to allow users to utilize a library of predetermined desirable sounds and profiles or "experiences" to result in an immediately enhanced listening experience and also allow users to add additional desirable sounds and listening "experiences" to their individual libraries which will provide the system with updated database of information. As an example, a listener may be able to hear important information or hold a conversation with another person without the need to remove the listening device or mute or bypass the source signal. As another example, a listener may be able to utilize a device according to an embodiment of the invention to filter out unwanted elements of ambient noise not relating to speech such as in a live entertainment venue where there is ambient sound that is either too loud or otherwise too distorted relative to a level which would be comfortable for the listener. An embodiment of the invention may enable the listener to customize the ambient sound environment they hear without any input signal from a mobile audio or telephony device, and to adjust a variety of features to tailor the volume and other characteristics of the ambient sound to match their desired preference. Those settings could be saved as an "experience" within their library, along with desirable ambient sounds. Each "experience" can relate to a specific type of sound or can relate to a particular listening environment, such as a car, public transportation of any kind, etc.

Sound spectrographing technology, acoustic fingerprinting, and other audio processing technologies may be used to recognize sounds with unique characteristics which distinguish them in minute ways from other, even very similar sounds, can both record the frequency and time patterns of sounds to identify and classify them, but also effectively read existing spectrographs which may exist in a personal ambient sound library of a user, or which may otherwise reside in a database of available ambient sound spectrographs and decode such spectrographs to inform the digital signal processing and active filtration systems of those patterns which should be treated as desired ambient sounds and thus included in the customized listening environment of a user when they are present in the ambient environment.

It is an object to provide a system for managing a sound library and audio profiles. The user can select one or more profiles from a library for enhancement of the perception of audio. The system may operate by caching profiles and allowing users to download selected profiles.

This can be done by having a repository of sound profiles organized by participants in the system. When a user wants to enhance perception of audio matching another participant's voice, the other participant's voice profile can be obtained from the repository and associated with the requesting user.

Another way of obtaining a profile is for it to be included in an electronic contact card that can be transmitted to the user and saved in a profile library in the same way that a contact card with e-mail and other address information is saved to a user's contacts. The system may then access the voice profile in a manner similar to a telephone application obtaining a telephone number from contacts or as an e-mail client obtains an e-mail address from a contact.

The voice profile library and/or the active voice profiles may be saved locally on a user device. Audio processing and profile storage may be on a user client device or a server device depending on computational and communication resources available.

There are many uses for such an enhancement to an active noise control and customized audio system. This may be used to enhance perception of an individual speaker in a lecture environment, for example, a university professor in a lecture hall. The system may also be used by friends in a noisy environment such as in a school hallway, a bar/club or at a concert. This could eliminate the need for yelling to be heard or straining to hear a friend. At the same time the user can keep the headphone on the user's ears and continue to listen to source and/or ambient audio at a normal or customized level.

A user may select which sounds are to be heard from both the ambient environment and the source signal, and to apply a variety of adjustments/mixing controls to that combined sound environment to ensure the appropriate blending of the sounds, such adjustments to include, but are not limited to, relative volume, timing delays, distance compensation between microphones or both microphones and source signals and a wide variety of other adjustments One or more appropriate noise cancelling algorithms may be applied. Manual or automatic adjustment of parameters and/or coefficients of an algorithm may be used to change the manner in which the algorithm suppresses noise.

User adjustments to the characteristics of the noise cancelling experience are enabled. The adjustments may include application of predetermined algorithms to one or more frequency bands and/or one or more channels. The system may generate new or custom algorithms to facilitate a desired noise cancellation profile. A user may access or "download" specific algorithms that relate best to a specific environment.

Users may utilize a library of sound profiles to set the audio customizations applied to ambient and source audio. Desirable ambient sounds may be added, among other ways, through an interface which may allow the capture of desirable audio and generation of a sound profile. The sound profile may be added to the library and may operate to specify ambient sounds that may be exempted from noise cancellation. The system may use profiles to pass or exclude audio according to one or more profiles.

The system may be implemented in one or more digital signal processors and/or adaptive filters operating on ambient, directional or directionless, source and noise audio in order to enhance delivery of desirable audio and damp delivery of undesirable audio. The system may be implemented in a single device or in multiple components. The components may be connected wirelessly or in a wired fashion.

A sampling process may be used to distinguish specific voices based on frequency, synchronous energy and modulation characteristics of the sampled audio. For example, the sounds of a child or a spouse or certain important sounds like an alarm, a telephone ringing, a mobile device notification, a ringtone, a doorbell, beach sounds or nature sounds.

An embodiment may incorporate digital signal processing and sampling rates equivalent to those incorporated in high fidelity digital music systems matching the full range of human hearing, e.g. sampling rates of up to 44.1 kHz corresponding to the full dynamic hearing range of an individual without hearing loss.

An embodiment may incorporate multi-channel digital signal processing to divide ambient sound environment into multiple channels based on frequency ranges, directionality, or audio characteristics, including but not limited to modulation rates that correspond to a wide variety of ambient sounds, including speech, among many others, thus enabling the system to identify and learn/store characteristics of unique sounds and sound patterns for inclusion in its database. The inclusion may be subject to approval by the user.

An embodiment of the invention may dynamically adjust attenuation rates across channels and frequency ranges, may have a feature that enables a user to apply adaptive filters to each channel either independently or across all channels simultaneously.

Advantageous features of a system may facilitate adjustment of filtration on the basis of direction of sound sources; signal detection methodology of acoustic measurement among modulation rates, synchronous energy (opening and closing of vocal folds) or signal to noise ratios depending on both the environment and the nature of the sound which is desirable (i.e. speech or other ambient sounds) as well as whether such sound profiles are new or already exist in the listener's library (in which case such methodology selection may be automatic); ambient sound bypass or source sound bypass or other parameters;

Advantageous features of a system according to the system may facilitate adjustment of filtration on the basis of one or more of the following characteristics, or others.

Number of channels;
Frequency band of each channel;
Direction of sound sources;
Activation of all microphones, directional microphones and omni-directional microphones, or omni-directional microphones only (applicable in situations where directional microphones or microphone arrays are unavailable);
Signal detection methodology of acoustic measurement among modulation rates, synchronous energy (opening and closing of vocal folds) or signal to noise ratios depending on both the environment and the nature of the sound which is desirable (i.e. speech or other ambient sounds) as well as whether such sound profiles are new or already exist in the listener's library (in which case such methodology selection may be automatic);
Spectral regions;
Time patterns;
Modulation;
Rate of modulation;
All the distances between and among microphones;
Distances between microphones and source ambient signals;
Attack rates (speed at which noise cancelling algorithms suppress and then restore certain targeted ranges, such as compensating for sudden, brief undesirable sounds);
Digital signal processing programs (could include Bongiovi, Audyssey and/or others); newly created or commercially available programs, and/or
Noise cancellation algorithms, digital signal processing or other filtration either across all channels/all frequencies or by channel or frequency range.
Volume mix among source input and ambient sound
Bass, treble, midrange and other equalization settings
Ambient sound bypass or source sound bypass
Ambient and source sound match (as a means to analyze, calculate and adjust for ambient sound characteristics that differ from source sound characteristics in a setting wherein source and ambient sound inputs are the same but for those characteristics resulting from the introduction of the source sound into the relevant ambient environment)

The various noise cancelling algorithms that may be utilized or created for use may, among other things, adjust for:
Signal depth, typically measured by noise attenuation in decibels (–dB);
Frequency breadth, relating to how much of the 10 hz to 20,000 hz frequency range is impacted by the noise cancellation algorithm or algorithms, which in the system might take the form of different algorithms running simultaneously in different frequency ranges in a multi-channel system;
Position, representing the point on the 10 hz to 20,000 hz frequency spectrum the cancellation profile is centered, which point will be subject to adjustment by the listener either by channel or by noise cancelling algorithm, depending on whether one or more channels and/or algorithms are in simultaneous use; and/or
Boosting, which represents the extent that noise cancelling algorithms generate additional undesirable sound as a result of the suppression signal exceeding the targeted undesirable sound they are trying to suppress, which would be addressed either by overlapping other noise cancelling algorithms to capture such boosting, or by the addition of identical sound signals to offset such boosting when it appears.

Certain aspects of the adaptive filters may be adjusted in an automated fashion on the basis of adjustments not controlled by the listener, in addition to adjustments controlled by the listener. The listener advantageously may control the active filtration to compensate for background noise environments. For example, the background in an automobile, on a train, walking the street, in a workout room, or in a performance arena all have differing characteristics. Another adjustment that may be made is to compensate for the difference between the noise sensor and the speaker. This difference may be in the form of distance or audio characteristics. The background adjustment may be controlled by a smart algorithm using location services, wireless input or user input. Adjustments for reproduction device characteristic may be based on pre-established profiles or user preference. The profiles may be generic to a reproduction device class or may be specific to an individual reproduction device model.

The system may have variable inputs to compensate for dominant noise. Dominant noise may be a noise type that is different from a more steady state background noise, for example, the noise created by a conversation may be considered a dominant noise, and the noise otherwise present in the cabin of a moving vehicle—train, airplane, car—is the background noise. Another dominant noise may be noise generated by machinery or audio content of an ambient audio program.

It is possible that each of these be identified by an automated analysis of the ambient audio, and automated identification such as a beacon transmitting an identification of audio or other environmental characteristics, or a user-controlled modification.

Ultimately, the user/listener will be in the best position to make at least some adjustment to modify the active filtration algorithms to the user's preference.

An active noise control system may have an adaptive filter having a source audio input and an audio signal output. A filtration control may be connected to the adaptive filter and a variable input control may be connected to the filtration control wherein the variable input control dynamically influences the filtration control. The active noise control system may have a variable input control that is a user control. The variable input control may be a dynamic audio analysis unit; an identification based variable input control; and/or a non-audio environmental identification based variable input control. The non-audio environmental identification based variable input control may be a location service based variable input control and the location service based variable input control may further include a database containing adaptive filter parameters indexed according to non-audio parameters and a non-audio monitor connected to the database. The identification based variable input control may be an audio based variable input control which may include a database containing adaptive filter parameters indexed according to audio based parameters and may include an audio monitor connected to the database. The non-audio environmental identification-based variable input control may include an adaptive filter control responsive to an environmental input.

A method for active noise control may include the steps of setting a dynamic filtration control input parameter, establishing an adaptive filter filtration control signal based at least in part on the dynamic filtration control input parameter, modifying an audio signal to control perceived noise based at least in part on the adaptive filter filtration control signal. The step of setting a dynamic filtration control input parameter may be responsive, at least in part, to user set variable parameters. The step of setting a dynamic filtration control input parameter may be responsive, at least in part, to an audio analysis. The step of setting a dynamic filtration control input parameter may be responsive, at least in part, to a condition identification.

An audio customization system may include an adaptive filter responsive to at least one audio input, an adaptive filter parameter control connected to the adaptive filter to enhance an aspect of the audio input; and an adaptive filter parameter control connected to the adaptive filter to diminish an aspect of the audio input. The audio customization system may also include an audio sensor array of 3 or more audio sensors connected to the adaptive filter parameter control. The adaptive filter parameter control may be configured to provide directional control in response to the audio sensor array. The audio sensor array may include at least one directional audio sensor. The adaptive filter may be responsive to the audio sensor array.

The system may include an article of manufacture, a method, a system, and an apparatus for an audio customization system. The article of manufacture of the system may include a computer-readable medium comprising software for a system for generating an audio signature or audio fingerprints. The system may be embodied in hardware and/or software and may be implemented in one or more of a general purpose computer, a special purpose computer, a mobile device, or other dedicated or multipurpose device.

The system may include a profile management system that allows a user to obtain, create, activate and/or deactivate audio profiles to customize audio provided to the user.

An adaptive audio control system may have a memory for storing one or more audio profiles. An adaptive audio controller may be connected to the memory and be configured to apply a transformation defined by the audio profiles to one or more audio signals. In addition, a library of available profiles may be connected to the memory. Advantageously on of the audio sources includes at least one microphone.

The system may execute an audio control method by acquiring one or more audio profiles, establishing an audio transformation as a function of one or more audio profiles; acquiring audio signals from one or more sources; and applying the transformation to said audio signals. The step of acquiring the audio profiles may include the step of identification and designation of an audio representation stored in a library. The audio representation may be in the form of an audio profile. The audio representation may be a recording of an audio signal in which case the method also includes the step of characterizing said audio signal to obtain an audio profile. An audio profile may be generated by identification of characteristics of the audio information. The characteristics may be any parameter that tends to distinguish the audio information. The parameters may be detection of certain phenomes, cadence, tonal qualities or other audio property. The audio profiles may be associated with an identification and authorization information. Acquiring audio profiles may include the steps of searching a library and verifying authorization information associated with an audio profile. The method may include a procedure for issuing an authorization request to an address associated with a profile identification. The method may include designating the effect that an audio profile will have on an audio transformation. For example, a profile of a jackhammer may be designated for inclusion of the characterized audio. A profile of a police siren may be designated for amplification of audio characterized by the profile.

An adaptive audio control system may include an audio customization engine. One or more audio sources may be connected to the audio customization engine. One or more audio outputs may be connected to the audio customization engine. One or more audio profiles may be represented in a configuration control connected to the audio customization engine. A profile manager may be connected to the configuration control. An audio profile repository may be connected to the profile manager. The repository may be associated with a contact application. The repository may include an audio profile storage memory. The adaptive audio control system may include an audio profile generator connected to the profile manager and responsive to an audio source. The adaptive audio control system may also include an authorization invitation system connected to the profile manager.

It is an object to overcome limitations in social networking to provide real-time audio communications involving two or more stations.

Social networking systems allow subscribers to communicate with their friends and others. The permitted communications are typically static, for example texting, posting, etc. Social networking systems may also permit voice or audio communications however audio communications are either distribution of audio files or user-initiated "calls." One limitation in social networking is the lack of any ad hoc communications audio communications without a user-initiated call.

The invention may, among other things, facilitate a desired interaction with sound on the basis of an identification of a station. The invention may allow a listener to combine one or more sources of sound on the basis of the source.

It is an object to provide a system that permits a subscriber to carry on audio communications with other subscribers selected, without requiring real-time mutual action to establish connections.

It is an object to suppress delivery of portions of audio information not significant to a social networking communication. Alternatively, the suppression may be performed by attenuation of non-speech audio present at a station.

It is an object to provide a social networking audio communication system that allows a subscriber to adjust the system based on personal preferences. It is a further object to allow establishment of a connection for audio communications based on satisfaction of predefined criteria. The predefined criteria may include user specification of permissions, enable particular station connections, and/or other system, user, or station based parameters.

It is an object for the suppression subsystem to retain those aspects of the local and/or remote ambient sound environment that a listener identifies as desirable into the source or streamed listening environment, and to make one or more adjustments to enhance the resulting combined sound.

The audio suppression function may be implemented in one or more digital signal processors and/or adaptive filters operating on ambient, directional or directionless, source and noise audio in order to enhance delivery of desirable audio and damp delivery of undesirable audio. The invention may be implemented in a single device or in multiple components. The components may be connected wirelessly or in a wired fashion.

An active noise control system may have an adaptive filter having a source audio input and an audio signal output. A filtration control may be connected to the adaptive filter and a variable input control may be connected to the filtration control wherein the variable input control dynamically influences the filtration control. The active noise control system may have a variable input control that is a user control. The variable input control may be a dynamic audio analysis unit; an identification based variable input control; and/or a non-audio environmental identification based variable input control.

An audio spatialization system is desirable for use in connection with a personal audio playback system such as headphones, earphones, and/or earbuds. The system is intended to operate so that a user can customize the audio information received through personal speakers. The system is capable of customizing the listening experience of a user including at least some portion of the ambient audio. The system is provided so that the audio spatialization applied maintains orientation with respect to a fixed frame of reference as the listener moves and tracks movement of an actual or apparent audio source provided that the speakers and sensor are maintained in the same relative position and orientation to the listener. For example, the system may operate to identify and isolate audio emanating from a source located in a particular position. The isolated audio may be provided through an audio spatialization engine to a user's personal speakers maintaining the same orientation. The system is designed so that should the user turn or move the apparent location of the audio source will remain constant. For example, if the user turns to the right, the personal speakers will turn with the user. The system will apply a modification to the spatialization so that the apparent location of the audio source will be moved relative to the user, i.e., to the user's left and the user will perceive the audio source remaining stationary even while the user is moving relative to the source. This may be accomplished by motion sensors detecting changes in position or orientation of the user and modifying the audio spatialization in order to compensate for the change in location or orientation of the user, and in particular the ear speakers being used. The system may also use audio source tracking to detect movement of the audio source and to compensate so that the user will perceive the audio source motion.

An audio customization system is provided to enhance a user's audio environment. One type of enhancement would allow a user to wear headphones and specify what ambient audio and source audio will be transmitted to the headphones. An added enhancement is the display of an image representing the location of one or more audio sources. Another enhancement is the application of spatialization to the audio from the audio source and to modify the spatialization in a manner that corresponds to movement of the user and in a manner that corresponds to movement of the audio source relative to the user.

The system may also generate an image of the locations of audio sources referenced to the position or location of a microphone array. It is also advantageous to generate an image referenced to a location of an audio source. To generate an image referenced to an audio source information representative of the location of the audio source relative to the microphone array is required. It is also advantageous to generate an image representative of the location(s) of audio source(s) referenced to a specified position. This requires information representative of the relative position of the microphone array to the specified position.

In order to provide an enhanced audio experience to the users a source location identification unit may use beamforming in cooperation with a directionally discriminating acoustic sensor to identify the location of an audio source. The location of a source may be accomplished in a widescanning mode to identify the vicinity or general direction of an audio source with respect to a directionally discriminating acoustic sensor and/or in a narrow scanning mode to pinpoint an acoustic source. A source location unit may cooperate with a location table that stores a wide location of an identified source and a "pinpoint" location. Because narrow location is computationally intensive, the scope of a narrow location scan can be limited to the vicinity of sources identified in a wide location scan. The source location unit may perform the wide source location scan and the narrow source location scan on different schedules. The narrow source location scan may be performed on a more frequent schedule so that audio emanating from pinpoint locations may be processed for further use.

The location table may be updated in order to reduce the processing required to accomplish the pinpoint scans. The location table may be adjusted by adding a location compensation dependent on changes in position and orientation of the directionally discriminating acoustic sensor. In order to adjust the locations for changes in position and orientation of the sensor array, a motion sensor, for example, an accelerometer, gyroscope, and/or manometer, may be rigidly linked to the directionally discriminating sensor, which may be implemented as a microphone array. Detected motion of the sensor may be used for motion compensation. In this way the narrow source location can update the relative location of sources based on motion of the sensor arrays. The location table may also be updated on the basis of trajectory. If over time an audio source presents from different locations based on motion of the audio source, the differences may be utilized to predict additional motion and the location table can be updated on the basis of predicted source location movement. The location table may track one or more audio sources.

The locations stored in the location table may be utilized by a beam-steering unit to focus the sensor array on the locations and to capture isolated audio from the specified location. The location table may be utilized to control the schedule of the beam steering unit on the basis of analysis of the audio from each of the tracked sources.

Audio obtained from each tracked source may undergo an identification process. The audio may be processed through a multi-channel and/or multi-domain process in order to characterize the audio and a rule set may be applied to the characteristics in order to ascertain treatment of audio from the particular source. Multi-channel and multi-domain processing can be computationally intensive. The result of the multi-channel/multi-domain processing that most closely fits a rule will indicate the processing. If the rule indicates that the source is of interest, the pinpoint location table may be updated and the scanning schedule may be set. Certain audio may justify higher frequency scanning and capture than other audio. For example, speech or music of interest may be sampled at a higher frequency than an alarm or a siren of interest.

Computational resources may be conserved in some situations. Some audio information may be more easily characterized and identified than other audio information. For example, the aforementioned siren may be relatively uniform and easy to identify. A gross characterization process may be utilized in order to identify audio sources which do not require computationally intense processing of the multi-channel/multi-domain processing unit. If a gross characterization is performed a ruleset may be applied to the gross characterization in order to indicate whether audio from the source should be ignored, should be isolated based on the gross characterization alone, or should be subjected to the multi-channel/multi-domain computationally intense processing. The location table may be updated on the basis of the result of the gross characterization.

In this way the computationally intensive functions may be driven by a location table and the location table settings may operate to conserve computational resources required. The wide area source location may be used to add sources to the source location table at a relatively lower frequency than needed for user consumption of the audio. Successive processing iterations may update the location table to reduce the number of sources being tracked with a pinpoint scan, to predict the location of the sources to be tracked with a pinpoint scan to reduce the number of locations that are isolated by the beam-steering unit and reduce the processing required for the multi-channel/multi-domain analysis.

An audio source imaging system with an audio source location table containing a representation of the location of one or more audio sources connected to an input of an image translation unit and an output of an image of the audio source locations.

The output may be referenced to a microphone array to a position at a known direction and distance from the microphone array, to a position at a known direction and distance from said microphone array, or referenced to a location of one of the audio sources.

The output referenced to a microphone array may be translated to an image referenced to one of the audio source locations and/or another location referenced to the sensor array.

It is an object to apply directional information to audio presented to a personal speaker such as headphones or earbuds and to modify the spatial characteristics of the audio in response to changes in position or orientation of the personal speaker system. The audio spatialization system includes a personal speaker system with an input of an electrical signal which is converted to audio. An audio spatialization engine output is connected to the personal speaker system to apply a spatial or directional component to the audio being output by the personal speaker system. An audio source signal is connected to the audio spatialization system. The motion sensor associated with the personal speaker system is connected to a listener position/orientation unit having an output connected to the audio spatialization engine representing position and orientation of the personal speaker system. The audio spatialization engine adds spatial characteristics to the output of the audio source on the basis of the output of the listen position/orientation unit and/or directional cues obtained from a directional cue reporting unit. The directional cue reporting unit may include a location processor in turn connected to a beamforming unit, a beam steering unit and directionally discriminating acoustic sensor associated with the personal speaker system. The directionally discriminating acoustic sensor may be a microphone array. The association between the directionally discriminating acoustic sensor and the personal speaker system is such that there is a fixed or a known relationship between the position or orientation of the personal speaker system and the directionally discriminating acoustic sensor. A motion sensor also is arranged in a fixed or known position and orientation with respect to the personal speaker system. The audio spatialization engine may apply head related transfer functions to the audio source.

In one mode of operation the directional or audio source recording function is useful to allow certain audio to be captured and recorded for later consumption. For example, this may facilitate multi-tasking. A student may attend class and record a lecturer to the exclusion of other sounds or distractions. If during a real-time event a user's attention to audio is distracted intentionally or unintentionally, the user may replay the audio. The system may have an interface like a typical DVR which allows the user to "pause" or "rewind" the delivery of audio from a particular source or designate the audio to be saved for subsequent consumption. The directionality of the playback may be controlled. Directionality may be set to be centered on playback even if the live audio had a different "directionality. The directionality of the playback may be controlled to correspond to the directionality of the original source. The system may be set to capture audio from a fixed location, or to track an audio source as it moves. For example, the recording may be limited to a specific source based on acoustic characteristics, a source identification, such as a beacon identification fixed to the source or by manual selection. The recorder may have session based controls, such as for a particular time duration or until occurrence of a detected event. Sessions may be scheduled on an ad hoc basis or in advance. The recorder may be controlled to select more than one audio source and or some aspects of ambient audio other than the selected source(s).

An object is to provide a directional recording system. The directional recording system may include a directionally discriminating acoustic sensor connected to a beamforming unit. A location processor may be connected to the beamforming unit. A beam steering unit may be connected to the location processor and the directionally discriminating acoustic sensor. A digital storage unit may be connected to the beam steering unit. In addition, a record/playback controller may be connected to the digital storage unit. The digital storage unit may also be connected to the location processor. Accordingly, the beamforming unit may identify the direction of an acoustic source and a beam steering unit may capture directionally isolated acoustic information using the directionally discriminating sensor. The directionally isolated acoustic information may be stored along with corresponding directional cues in a digital memory. The digital memory may be a RAM memory and the playback controller may control a buffered output of the storage unit to facilitate special playback functions such as pause, rewind, jump back, etc. The record/playback controller may also control session recordings and playback of session recordings at a time unrelated to the recording time. The playback output from the digital storage unit may be combined with directional cues by an audio spatialization engine. The directional cues may be the directional cues originally stored as the audio was recorded or artificially applied directional cues. The spatialization engine may use head-related transfer functions. Conversion of acoustic energy to electrical energy and electrical energy to acoustic energy is well known. Conversion of digital signals to analog signals and conversion of analog signals to digital signals is also well known. Processing digital representations of energy and analog representations of energy either in hardware or by software directed components is also well known.

Audio sources may be stationary or mobile. In one configuration mobile devices may be carried by users. A mobile device may include a beacon which broadcasts an identification signal. The broadcast may be digital or analog information. The broadcast may be audible or inaudible. Inaudible broadcasts may be acoustic ultrasound or may be Bluetooth Low Energy (BLE), radio frequency, Wi-Fi, or other wireless transmission. Ultrasound is advantageous because it is inaudible and relative directionality may be determined by using a multi-directional acoustic sensor such as a microphone array or other directionally sensitive acoustic transducer. Acoustic beacons operate best when they are in the line of sight an acoustic sensor. Audio source location relative to a directionally discriminating acoustic sensor is most effective when there is no obstruction between the acoustic beacon and the sensor. In an area containing a plurality of mobile acoustic beacons coupled with directionally discriminating acoustics sensors obstructions in the area interfere with an accurate and complete map of the locations of the acoustic sources. For example, a plurality of operatives may be equipped with acoustic beacons coupled with directionally discriminating acoustic sensors and image displays referenced to the directionally discriminating acoustic sensor. A more complete view may be obtained by combining two or more individually incomplete acoustic source location maps whereby the location of an acoustic source obstructed from one of the operatives may be added based on information passed from a second operative who has an unobstructed "view" of that acoustic source. By combining multiple incomplete location sets, a more complete location set may be generated. This may be accomplished with an audio source imaging system which includes a directionally discriminating acoustic sensor, an acoustic beacon, advantageously an ultrasound beacon, and an associated display. An audio source location table may be created based on the presence of audio sources within the field of view of the operative. An image translation unit is provided with the locally generated location set and one or more other location sets generated from other perspectives. The image translation unit combines the location set to include the location of all audio sources which are unobstructed from the view of at least one of the operatives and outputs an image of the combined location set.

A lighting display system which is coordinated with an operating parameter of a personalized audio play device. An object is to provide some display components representative of audio output or another operating parameter of a customized audio device. The system operates in an environment where a customized audio device is provided which facilitates a user listening to ambient sounds through a personal speaker system where a customized audio device enhances the listening experience by modifying ambient audio and/or delivery of supplemental audio to a user. Once personalized listening devices are used in a live entertainment setting such as a festival, concert, or arena, LEDs or other color or pattern-coded lights or images may be embedded in headphones or earphone devices. For example, the lighting display may be part of a headphone top band, side cups, or a neck holder for earphones. The lighting display is manipulated by various controls setting off/on, colors, and/or images based on sounds heard by the device, the user, or based on ultrasonic, or RF communications received by the device or controlling connected devices.

The lighting display features may be used with a personalized audio delivery system to reflect some aspect of the audio being played. This may be desirable in the context of a shared music experience or other environments. The description is given in the context of a shared music experience, but the lighting system is not limited to such use. A shared music experience can be specific to an individual group member but still share a common group music characteristic.

The system may be useful to provide a personal audio delivery system at a festival concert where a user wearing headphones can hear any source, stage, show, and designated information, directions, promotion, and other content anywhere. Content may be delivered over small-cell LTE stepped up or by another distribution methodology such as Wi-Fi, P2P, BLE, or cellular. The personal audio delivery system may be controlled using an app running on a personal communication device. Transmission media may be small-cell LTE stepped up and controlled by a mobile user interface on the personal communication device. In addition, the personal audio delivery system may facilitate coordinated group social discussion, speech and shared content experience (nightclub or festival or any environment such as a conference, convention, schoolyard, etc.). Speakers with accepted profiles may be included in a group audio chat utilizing a customized audio delivery system integrated with the personal audio delivery system.

The personal audio delivery system may be a networking content delivery system which includes a plurality of user profiles, each corresponding to a user ID. A connection table controlling the connections containing a plurality of authorization identifications may be provided with a connection authorization where the connection authorizations include one or more user IDs and corresponding content identifications. Matching logic responsive to user profiles and the connection table may be provided for establishing connections to one or more communication devices corresponding to one or more of the user IDS. The networking content delivery system may be controlled or coordinated through a connection server. The content identification may represent identification of stored content or streaming content. The streaming content may be live. The stored content may be live or messaging content. The content identification may identify a communications channel or an audio profile. The audio profile may be a directional or geographic profile or may be a profile characterizing audio information.

The system may generate notifications delivered to the personal communication devices identifying available content. The personal communication devices may include an interface to designate content that will be processed by the personal communication device. The system may include matching logic which represents a set of matching criteria that correlate one or more user IDs. The lighting displays may be set or coordinated with the selected content.

The system may implement a method of coordinating the delivery of audio and lighting display content to a personal communication device which includes the steps of designating a principle content stream at the personal communication device, designating one or more supplemental context streams, and customizing content output of a personal communication device where the content output includes a principal audio content stream and at least one supplemental content stream. The display system may involve designating one or more attributes of the content output or personal information correlated to a personal communication device, transforming the designated attribute or attributes to a lighting effect and using the lighting effect to drive a light display.

A personal lighting display system may be used in conjunction with the personalized audio play device or a customized audio device. A display attribute generation unit may be connected to the personalized or customized audio play device. The display attribute generation unit may be integrated together with the audio device. A display driver may be responsive to the display attribute generation unit and generate signals to drive a lighting device connected to the display driver. The lighting display device may be monochrome, multicolor, LED, or multi-pixel. The display device may be configured for public rather than personal display. The display attribute generation unit may be responsive to an operating parameter of the personalized or customized audio play device. The operating parameter may be an identification of content, may be some aspect of a user profile, or may be simply set by a user for the purpose of display. The operating parameter may be a combination of elements.

It is an object to work with an audio customization system to enhance a user's audio environment. One type of enhancement would allow a user to wear headphones and specify what ambient audio and source audio will be transmitted to the headphones. Added enhancements may include the display of an image representing the location of one or more audio sources referenced to a user, an audio source, or other location and/or the ability to select one or more of the sources and to record audio in the direction of the selected source(s). The system may take advantage of an ability to identify the location of an acoustic source or a directionally discriminating acoustic sensor, track an acoustic source, isolate acoustic signals based on location, source and/or nature of the acoustic signal, and identify an acoustic source. In addition, ultrasound may be serve as an acoustic source and communication medium.

It is an object to provide a helmet-mounted microphone array.

It is an object to provide a multi-directional acoustic sensor able to isolate an audio source in two or three-dimensional space.

It is an object to provide an audio sensor array that may be connected to or integrated with protective headgear. According to a particular embodiment, a fourth microphone may be mounted on a location corresponding to an ear. A fifth microphone may be mounted on the opposite side of the fourth microphone. An accelerometer or other motion/position sensor such as a gyroscope or magnetometer/compass (9-axis motion sensor) may be fixed to one or more of the microphone arrays. It may be affixed to any of the arrays. Advantageously all of the microphones are in a known relationship to each other and a motion sensor is also located in a known relative position or rigidly linked.

It is an object to provide an outerwear-mounted microphone array.

It is an object to provide a multi-directional acoustic sensor able to isolate an audio source in two or three-dimensional space.

It is an object to provide an audio sensor array that may be connected to or integrated with outerwear.

It is an object to provide a microphone array suitable for sensing audio information sufficient for determination of the location of an audio source in a three-dimensional space.

It is an object to provide an acoustic smart apparel, and more particularly smart apparel that enhances the use of directionally discriminating acoustic sensors, directional recording, ultrasonic location announcements and customized audio. It is an object to take advantage of the size of outerwear and geometric configuration to enhance audio capture and customization. To this end, a sensor array may be connected to or integrated with outerwear The ability to determine distance and direction of an audio source is related to the accuracy of the sensors, the accuracy of the processing, and the distance between sensors. An outerwear-mounted microphone array with a base may be configured to be worn by a user. Three or more microphones may be mounted on the base. A first microphone may be mounted in a position that is not co-linear with a second microphone and a third microphone. A fourth microphone may be mounted in a location that is not co-planar with the first microphone, the second microphone and the third microphone. The base may be outerwear such as a ski jacket, sports jersey, or other article intended to be worn on a user's torso. According to a particular embodiment, a fourth microphone may be mounted on a sleeve. A fifth microphone may be mounted on the opposite side of the fourth microphone. An accelerometer or other motion/position sensor such as a gyroscope or magnetometer/compass (9-axis motion sensor) may be fixed to one or more of the microphone arrays. It may be affixed to any of the arrays. Advantageously all of the microphones are in a known relationship to each other and a motion sensor is also located in a known relative position or rigidly linked.

CLOSE OF SUMMARY

The article of manufacture of the system may include a computer-readable medium comprising software for an active noise reduction system, comprising code segments for generating audio signatures.

The system may include a computer system including a computer-readable medium having software to operate a computer or other device in accordance with the system.

The article of manufacture of the system may include a computer-readable medium having software to operate a computer in accordance with the system.

Various objects, features, aspects, and advantages of the present system will become more apparent from the following detailed description of preferred embodiments of the system, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

FIG. 18 shows a communications table which may be utilized in an embodiment of the invention.
FIG. 19 shows an authorization table which may be used in an embodiment of the invention.

DETAILED DESCRIPTION OF PREFERRED EMBODIMENTS

Before the presently disclosed system is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Figure 1:
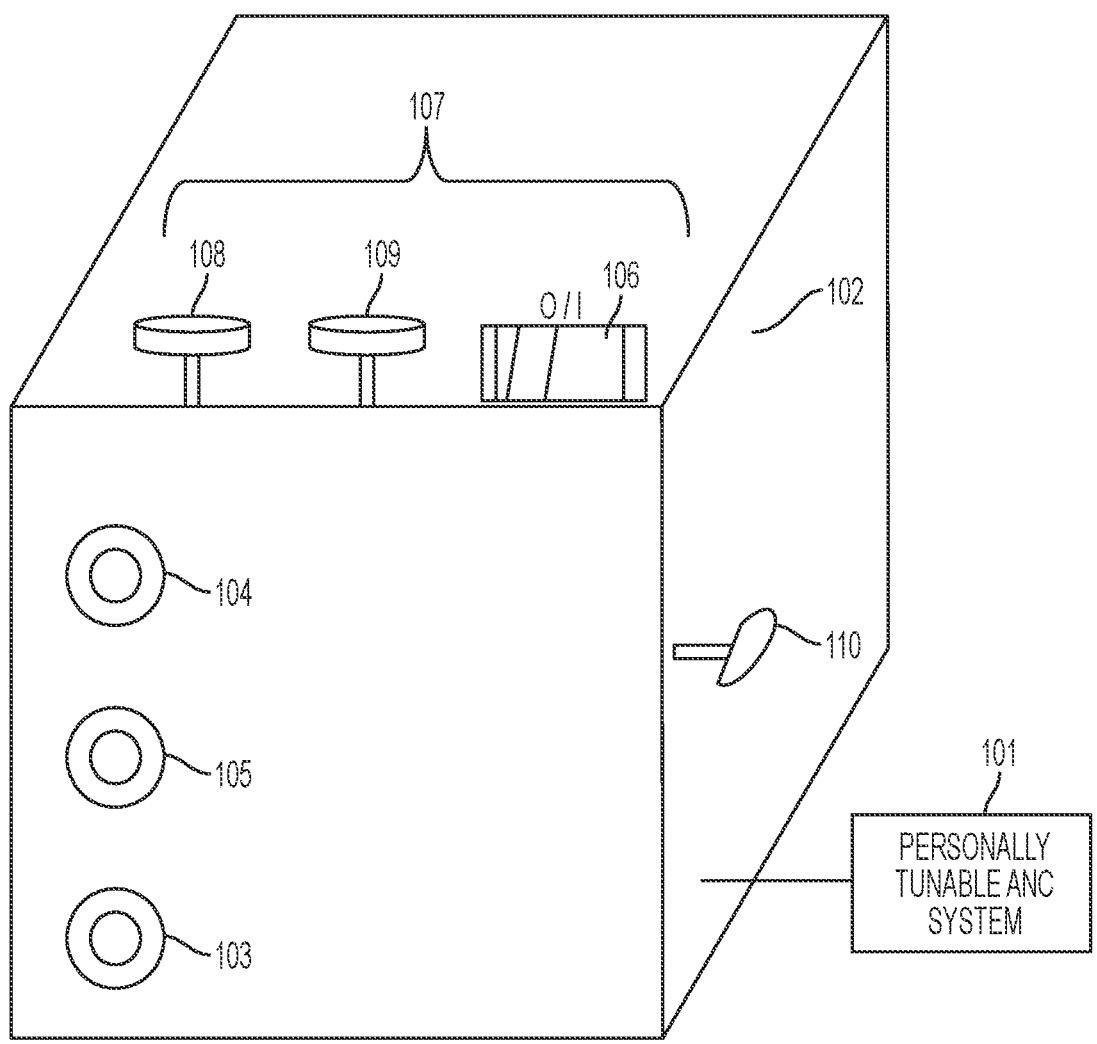
FIG. 1 shows an embodiment in the form of an auxiliary box allowing for personal tuning of an active noise reduction system.

FIG. 1 shows a personally tunable custom audio system 101 which may be suitable for Adaptive Noise Cancellation. The system may be implemented in a housing 102. The housing may be portable and have a clip for attaching to a belt, garment or exercise equipment.

Alternatively, the housing may be integrated with a case for a personal electronic device such as a smartphone or tablet.

The system may be implemented in a personal electronic device such as a smartphone or tablet.

The system may have or be connected to a noise-detecting sensor or microphone 110. The sensor may be integrated with the housing or be remote. In the case of a personal electronic device, the system may have a jack 103 for a remote noise-detecting sensor.

The system may be connected to or integrated with a sound reproduction device such as one or more speakers or headphones. The connection may be by a speaker jack 104.

The system may be connected to an audio source, for example, a personal media player such as an MP3 player. The connection may use jack 105.

The system may be provided with an on/off switch 106 and one or more user controls 107. The controls may be for one or more channels such as a left channel tune adjustment 108 and a right channel tune adjustment 109. There may be one or more controls for frequency bands per channel. Alternatively, the controls may be for degree in balance in one or more frequency bands.

Figure 2:
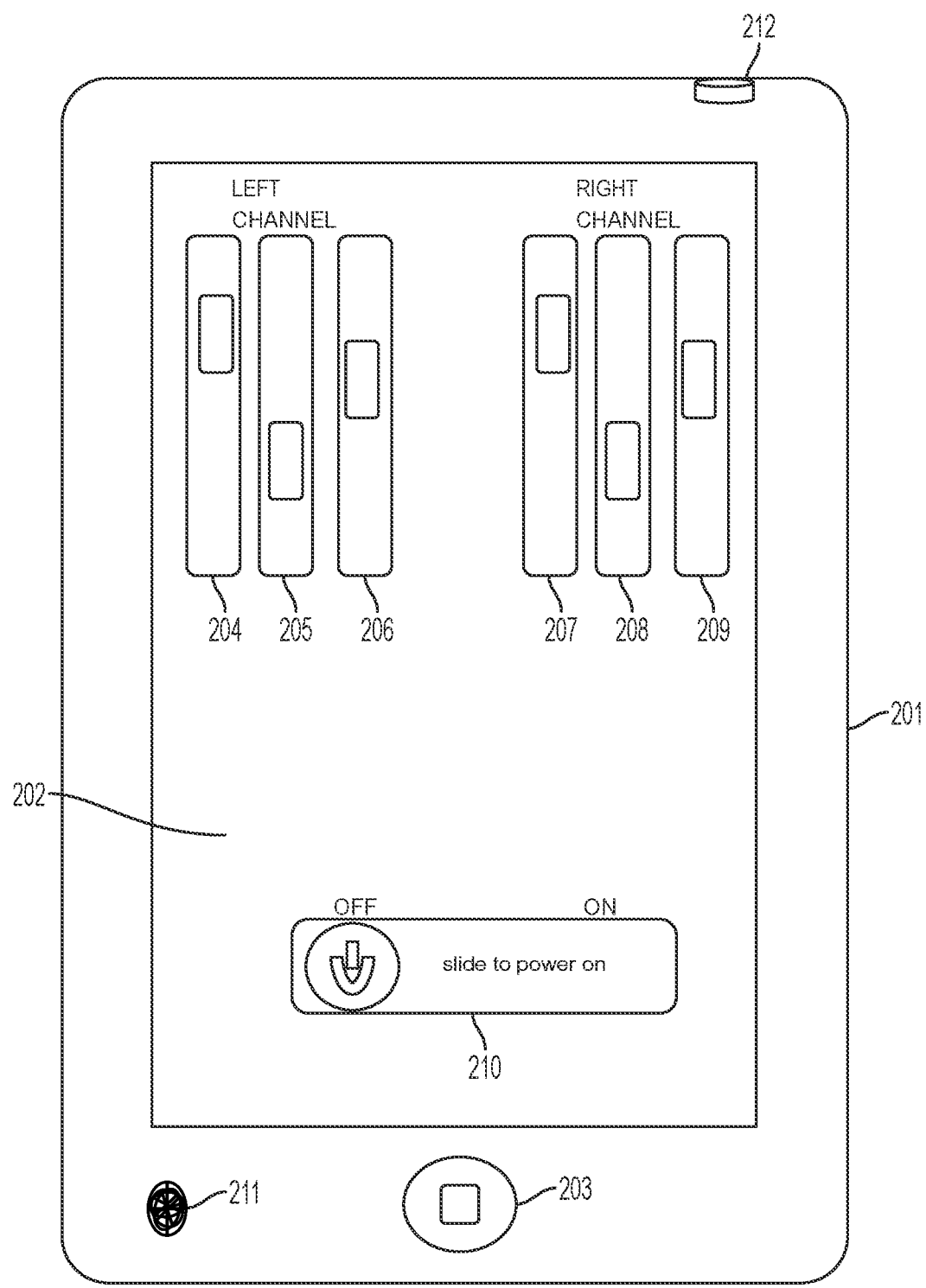
FIG. 2 shows an embodiment implemented on a personal electronic device, particularly a tablet.

FIG. 2 shows an embodiment implemented on a personal electronic device, 201, such as a tablet or smartphone. The device may have a touch screen 202 and a mechanical control 203. The device shown in FIG. 2 may be implemented in an application. FIG. 2 shows three level sliders 204, 205 and 206 for three frequency bands for the left channel and three level sliders 207, 208 and 209 for three frequency bands for the right channel. There is an on/off switch 210 that is also a touch control. The tablet 201 may have an on-board microphone 211 and a stereo headphone jack 212. Audio input may be provided by an onboard radio player or an external input.

Figure 3:
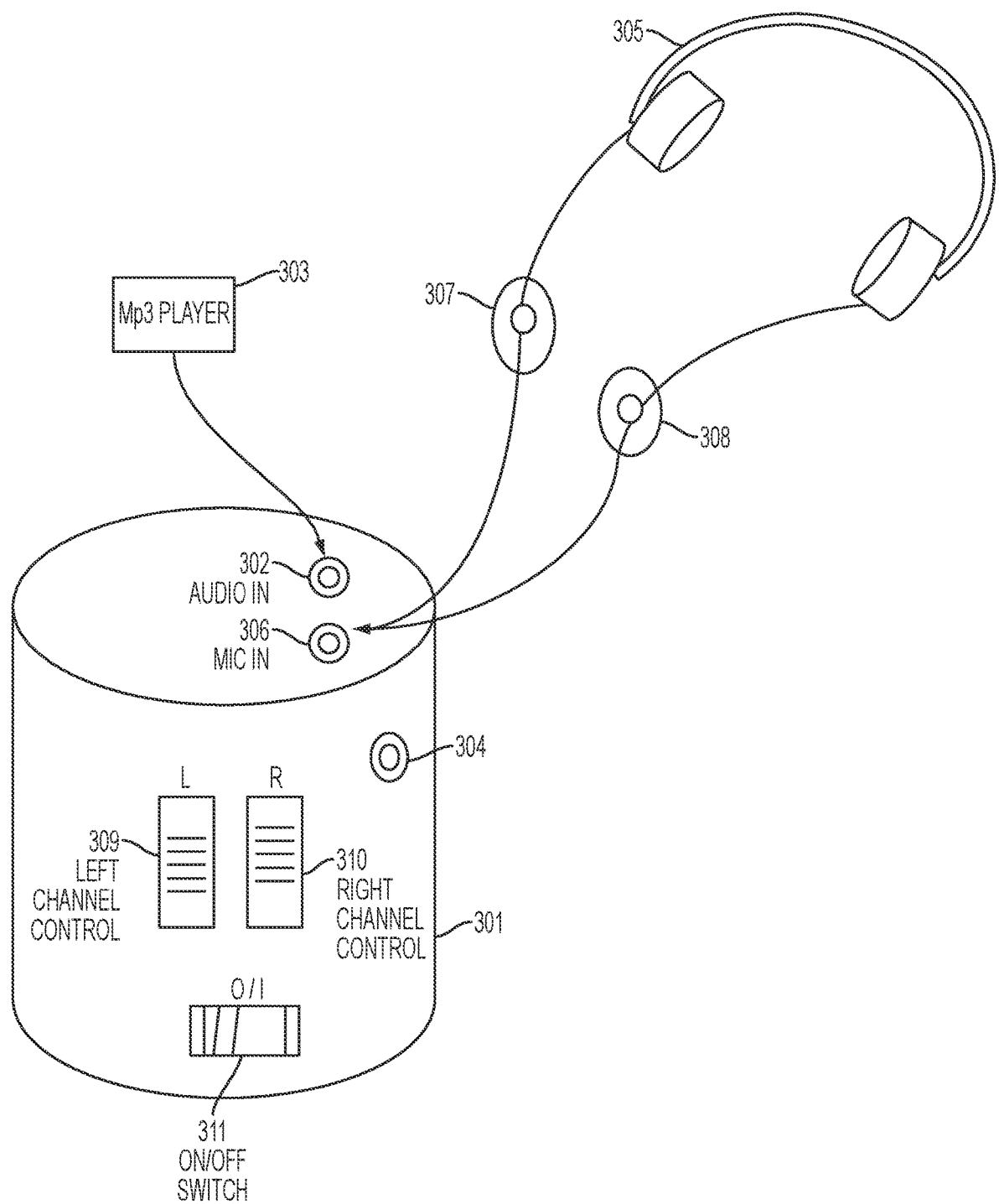
FIG. 3 shows an embodiment with two noise-sensing microphones mounted on a set of headphones.

FIG. 3 shows an embodiment with a housing 301. The housing provided with an input jack 302 which may be connected to an audio source such as an MP3 player 303. The housing 301 is provided with an audio output jack 304. Headphones 305 may be connected by a cable to the jack 304. The housing may be connected to two noise-sensing microphones 307 and 308. The microphones may be hardwired or connected with a jack.

The microphones 307 and 308 may be affixed to the headphone earpieces in a manner to approximate location of the user's ears. The housing may also include a left channel control 309, a right channel control 310, and an on/off switch 311.

The system may be used with or without an audio source. The system may enhance the user's listening experience by reducing the impact of external and ambient noise and sounds when used with an audio source. When used without an audio source, the system still operates to reduce the impact of external sounds and ambient noise.

Figure 4:
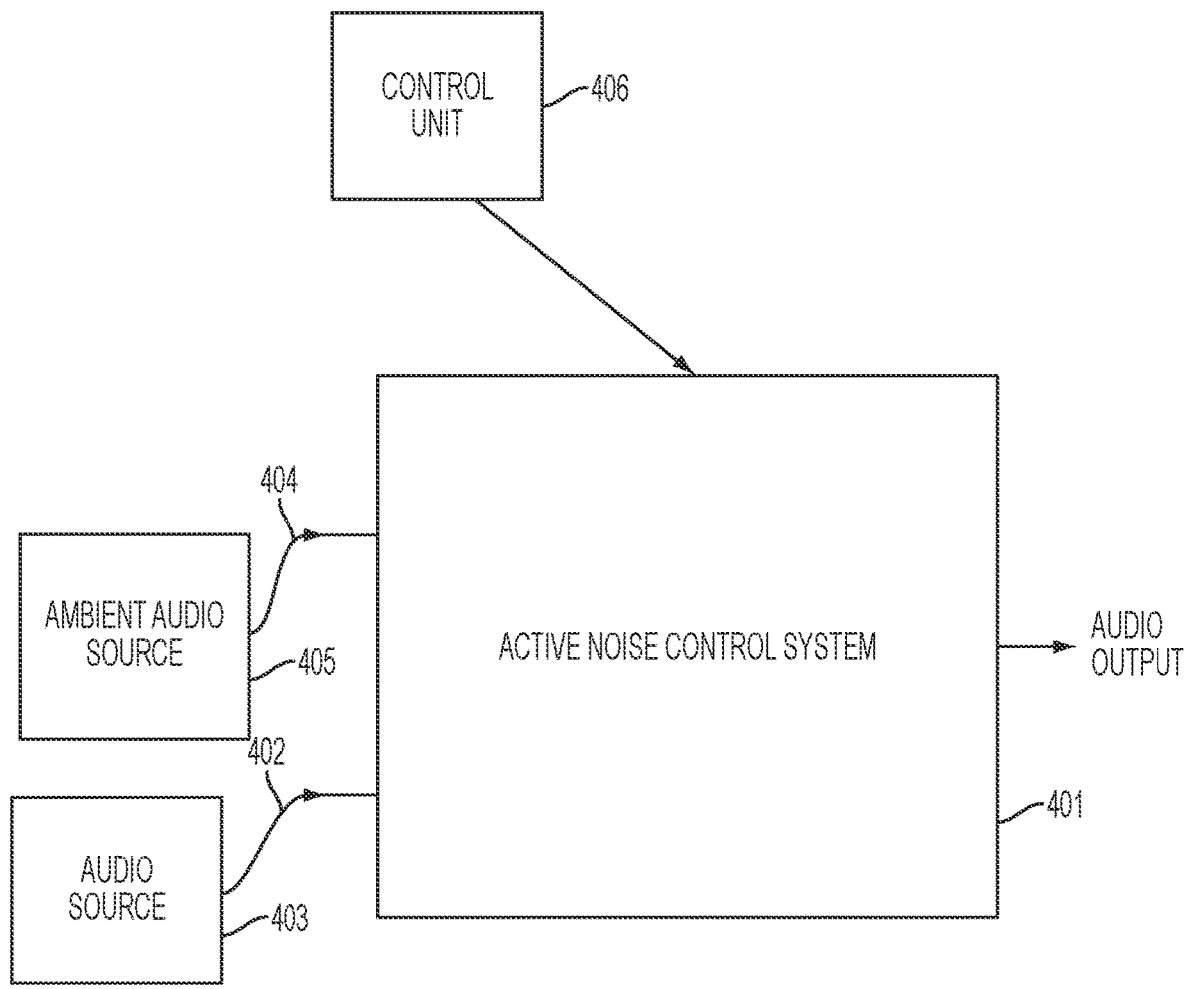
FIG. 4 shows a schematic of an embodiment.

FIG. 4 shows a schematic of an embodiment of the custom audio system according to the system which may be an adaptive noise cancellation system.

According to an embodiment of the system, audio is delivered to a user with a perceived reduction of noise. In addition, the audio characteristics may be tailored according to a profile selected by a user, a profile determined by audio analysis, a profile indicated by a non-audio input, and/or a preset profile.

Customized audio according to an embodiment of the system may be implemented by the use of an adaptive filter. The adaptive filter may be hardware or software implemented. A software implementation may be executed using an appropriate processor and advantageously by a digital signal processor (DSP).

An adaptive filter is a filter system that has a transfer function controlled by variable parameters. According to embodiments of the system, an adaptive filter may allow improved control over the adjustment of the parameters.

User controlled adjustment; audio analysis driven adjustment; and/or non-audio analysis driven adjustment may be used to customize audio input. The adjustment types can be used individually, in combination with each other and/or in combination with other types of adjustment.

According to an embodiment illustrated in FIG. 4, an adaptive noise cancellation system 401 may receive a source audio signal 402 from an audio source 403 which may provide live or pre-recorded audio. Live audio may be obtained from an audio signal generator or an audio transducer, such as a microphone and analog to digital converter.

The adaptive noise cancellation system may receive an ambient audio signal 404 from an ambient audio source 405.

The ambient audio source may include one or more audio transducers such as a microphone(s) for detecting noise. According to one embodiment, two microphones may be used in positions corresponding to a user's ears. According to a different embodiment, a single microphone may be used. The single microphone may be in or connected to the system housing 102, associated with headphones in the form of a headset, or remotely located in a fixed or mobile position.

Alternatively, the ambient audio source may be an artificial source designed to provide a signal that acts as the base of the cancellation.

The active noise reduction system has a control unit 406. The control unit 406 provides parameters which define or influence the transfer function.

Figure 5:
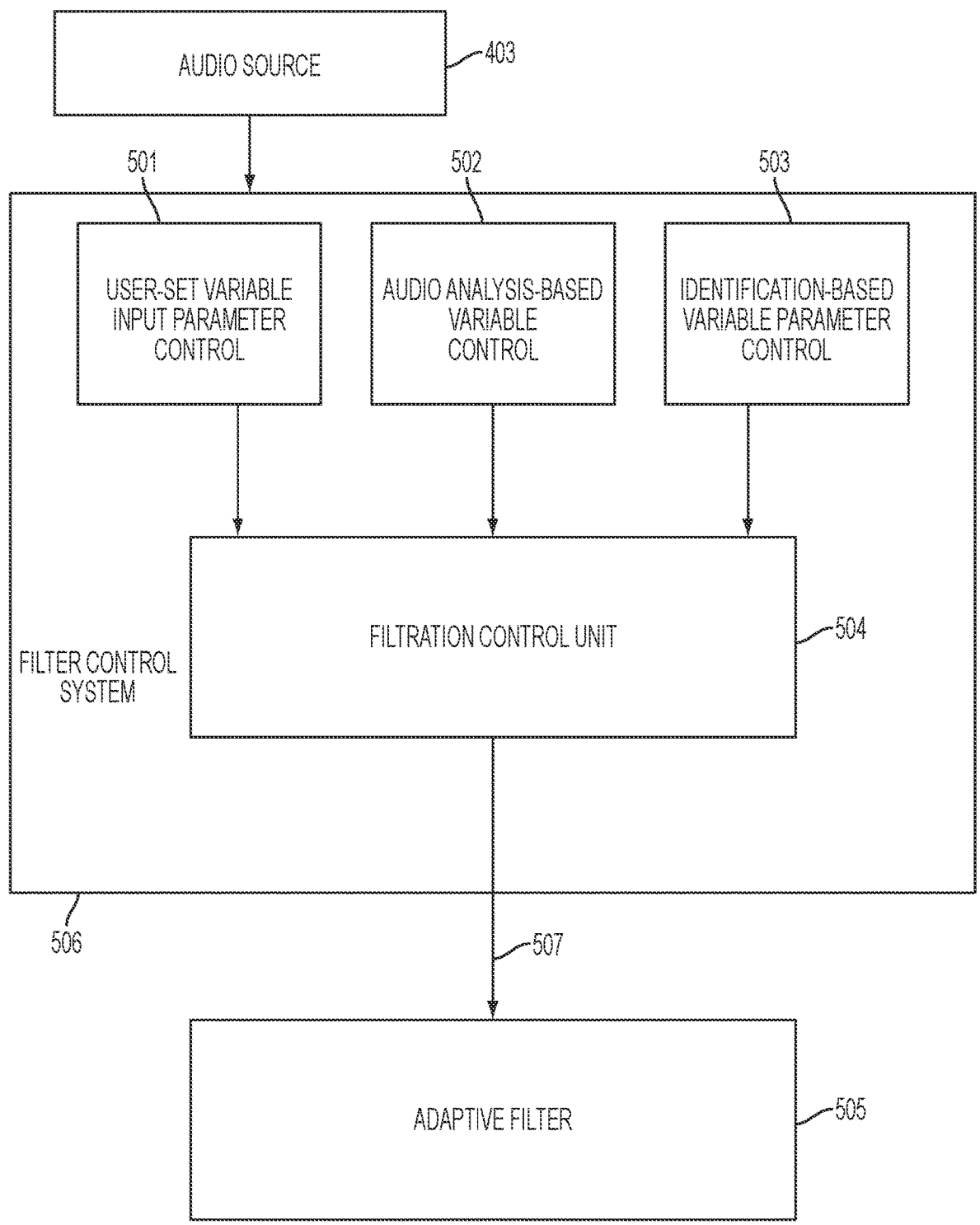
FIG. 5 shows an illustration of an adaptive filter.

FIG. 5 shows a more detailed illustration of the adaptive filter 505 and filter control system 506. The filter control system 506 responds to user variable input parameter control 501, audio analysis based variable control 502, and identification based variable parameter control 503.

The filtration control unit 504 mixes the variable parameters to create an adaptive filter control signal 507. The adaptive filter control signal defines the transfer function used by the adaptive filter 505.

User-set variable input parameter controls 501 are useful to tune the transfer function by the user to the preference of the user. The user set variable input parameter controls 501 may be established to permit the user to select a profile for the transfer function. Various profile controls can be provided to the user. For example, a profile specifically tuned to the environment inside of a passenger train. A profile specifically tuned to the environment in a jet airliner, a profile specifically tuned to the environment inside a subway train. The user adjustable controls may be a single control or multiple controls. They may correlate to conventional audio parameters such as bass, treble, frequency response. The user control parameters may be specifically engineered to modify the response of the adaptive filter according to conventional or non-conventional parameters. The user set variable input parameter controls may be controlled through switches and/or knobs on a connected interface or through a software implemented display interface such as a touchscreen. The touchscreen may be on a dedicated interface device or may be implemented in a personal electronic device such as a smart phone.

Audio analysis based variable controls may be based on a computerized assessment of the ambient audio source signal. The analysis of the ambient source audio may provide input to the filtration control unit 504 to modify the adaptive filter response based on analysis of background noise and/or dominant noise. For example, the audio analysis may assess the background noise typically present on a city street and the result of that analysis is used to influence the filtration control unit 504. The audio analysis may also detect dominant noise, in this example a jackhammer being operated at a construction site, to further influence the filtration control to provide an input to the adaptive filter to compensate for the dominant noise source.

The identification based variable parameter input unit 503 may provide input to the filtration control unit 504 to influence the response of the adaptive filter 505. Identification based variable parameters are further described in connection with FIG. 6.

The environmental identification may be provided in the form of a local radio beacon transmitting identification based variables. The local beacon may be transmitting Bluetooth, Wi-Fi or other radio signals. The identification may also be based on location services such as those available in an iOS or Android device. The available variables are provided to the filtration control unit 504 which combines or mixes the signals to generate an adaptive filter control signal 507. The adaptive filter control signal 507 is provided to the adaptive filter 505 and defines the transformation applied to the audio source 403.

Figure 6:
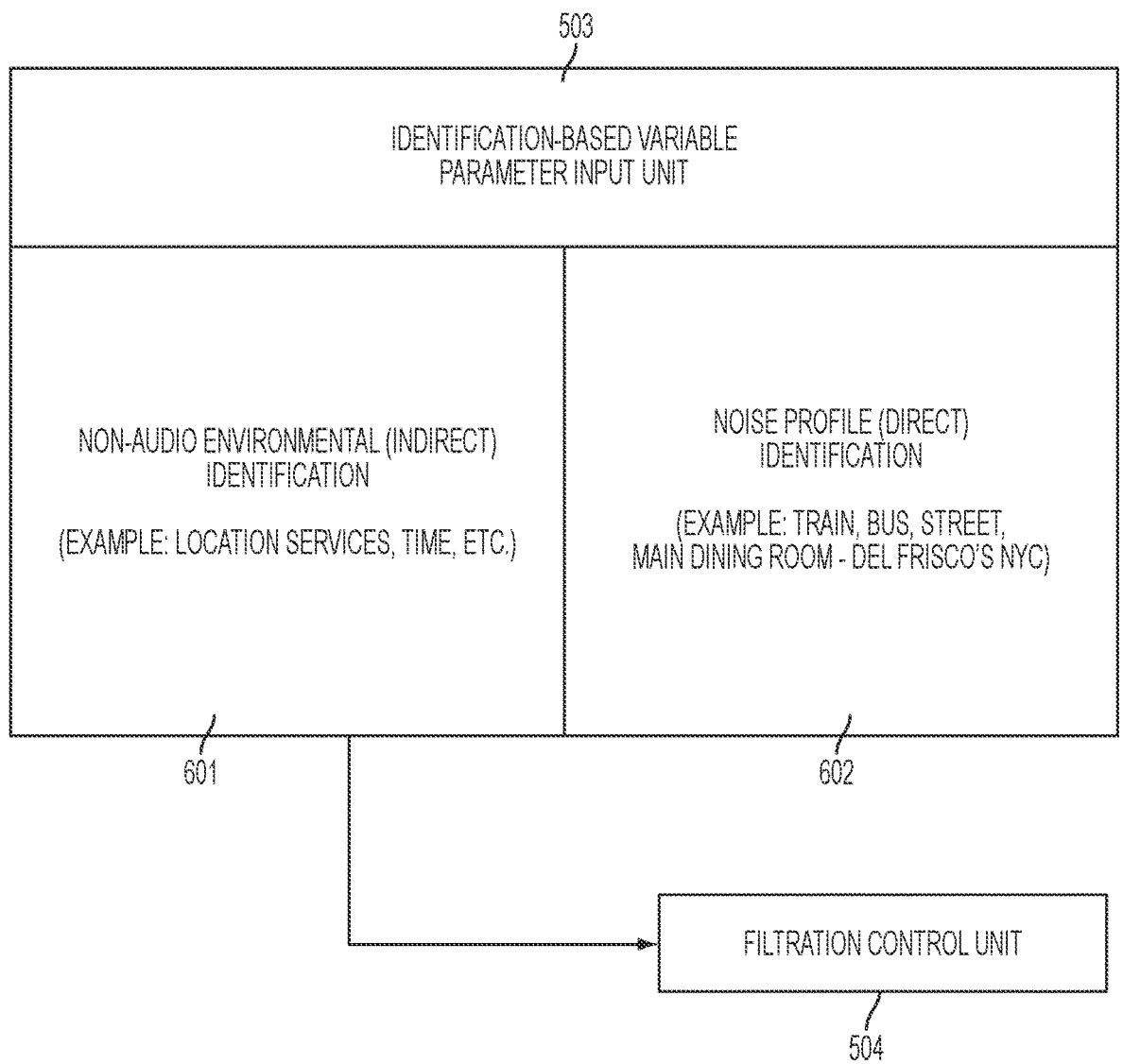
FIG. 6 shows a non-audio based identification input.

FIG. 6 illustrates identification based adaption non-audio-based variable parameter input unit 503 in order to provide an input to the filtration control unit 504. The identification based variable parameter input unit 503 obtains non-audio environmental identification signals. These non-audio environmental identification signals may serve as an index to noise profile compensation control. The noise profile compensation control may be generic or specific to a particular location. Examples of generic profiles include a passenger train, a bus, a city street, etc. Examples of specific profiles, for example, the main dining in Del Frisco's restaurant in New York City. Or inside of a 1970 Chevelle SS with a well-tuned 396 cubic inch V8 engine.

Figure 7:
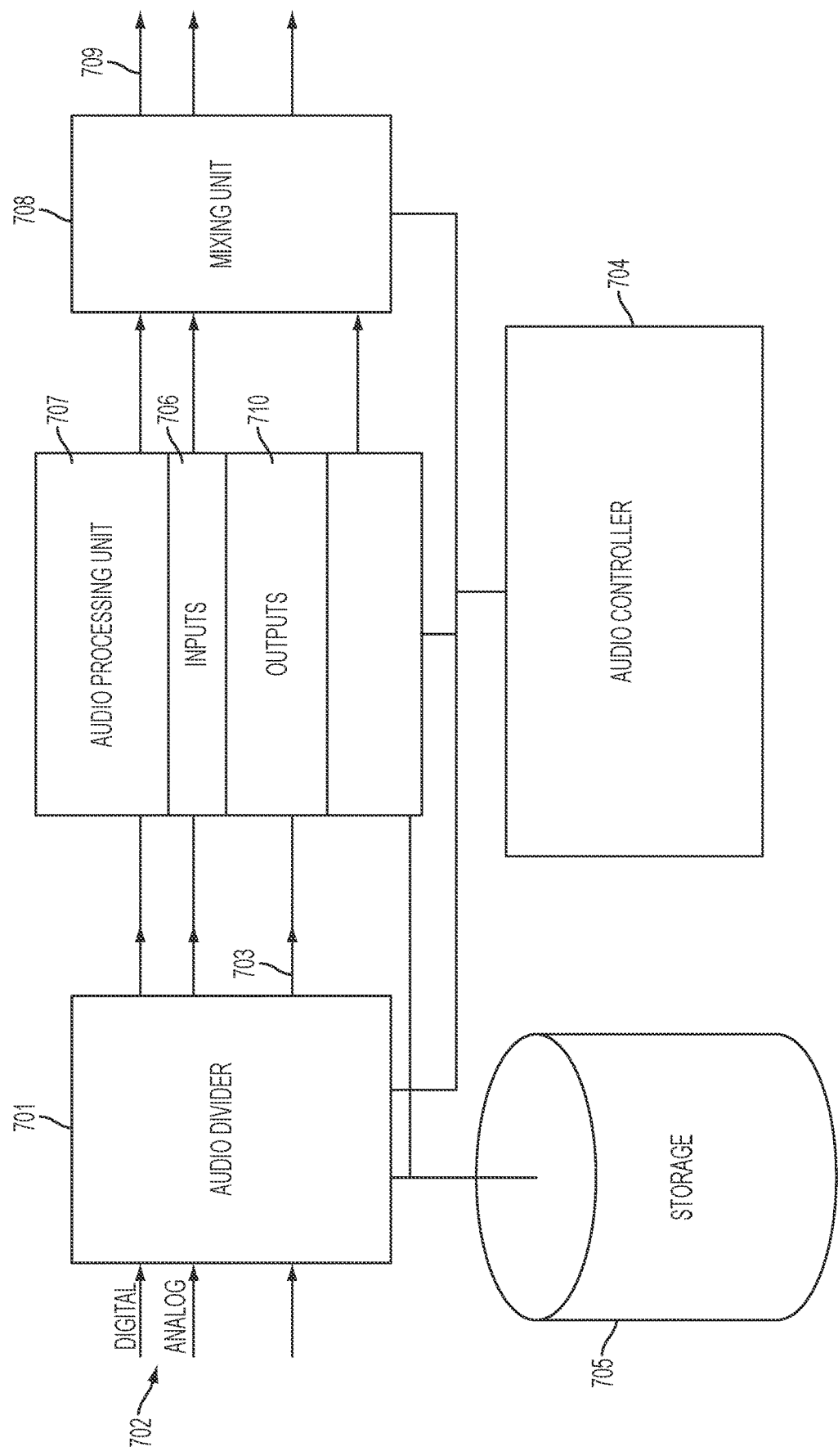
FIG. 7 shows an embodiment of an audio customization system.

FIG. 7 shows an audio customization system. The system includes an audio divider 701. The audio divider has one or more audio inputs 702. The audio inputs may be digital or analog signals. According to the preferred embodiment, analog signals may be digitized using an analog to digital converter. The analog inputs may be connected to microphones, instruments, pre-recorded audio or one or more audio source inputs like a board feed. The audio divider 701 may include one or more demultiplexers in order to separate different audio signals on the same input. The audio divider 701 also includes the capacity to divide input signals into multiple channels, for example, frequency domain channels.

The audio divider 701 may be implemented in a multi-channel audio processor such as an STA311B available from ST Microelectronics. The STA311B has an automode that may divide an audio signal into eight frequency bands. Audio input signals may be divided, shaped or transferred according to controllable frequency bands or in any other manner that may be accomplished by a digital signal processor or other circuitry. The audio divider may have matrix switching capabilities to allow control of selecting which input(s) is connected to which channel output(s) 703.

The audio divider 701 may be connected to an audio controller 704 which may dictate the manner in which the audio input signals 702 are handled. Alternatively, the audio divider 701 may be static and transform the audio inputs 702 to channel outputs 703 according to a predefined scheme. In addition, the audio divider 701 is connected to a storage unit 705 which may contain pre-recorded audio or audio profiles. The channel outputs 703 of the audio divider 701 are connected to the inputs 706 of an audio processing unit 707. The audio processing unit 707 is responsive to audio controller 704, and contains one or more adaptive filters to combine audio input signals 706. The audio controller 704 dictates which inputs are combined and the manner of combination. The audio processing unit 707 is connected to a mixing unit 708 which combines the channel outputs 703 of the audio processing unit 707 in a manner dictated by audio controller 704. The mixing unit 708 has one or more audio outputs (709). According to one embodiment, the mixing unit 708 may have a two-channel output for connection to a headphone (not shown).

Mixing may be accomplished using a digital signal processor. For example, a Cirrus Logic C54700xx Audio-System-on-a-chip (ASOC) processor may be used to mix the outputs 710 of audio processing unit 707.

In practical implementation a single digital signal processor may be used to perform the functions of the audio divider 701, audio processing unit 707 and mixing unit 708.

FIG. 8 shows an illustration of an embodiment of the system. FIG. 8A shows an integrated input/output headset 801. The headset may include left speaker 802 and right speaker 803. Speakers 802 and 803 may advantageously be connected by a headband 804. A microphone array 805 may be carried on the headband 804 and may include multiple microphones 806. Advantageously, the microphones 806 are directional.

Figure 8A:
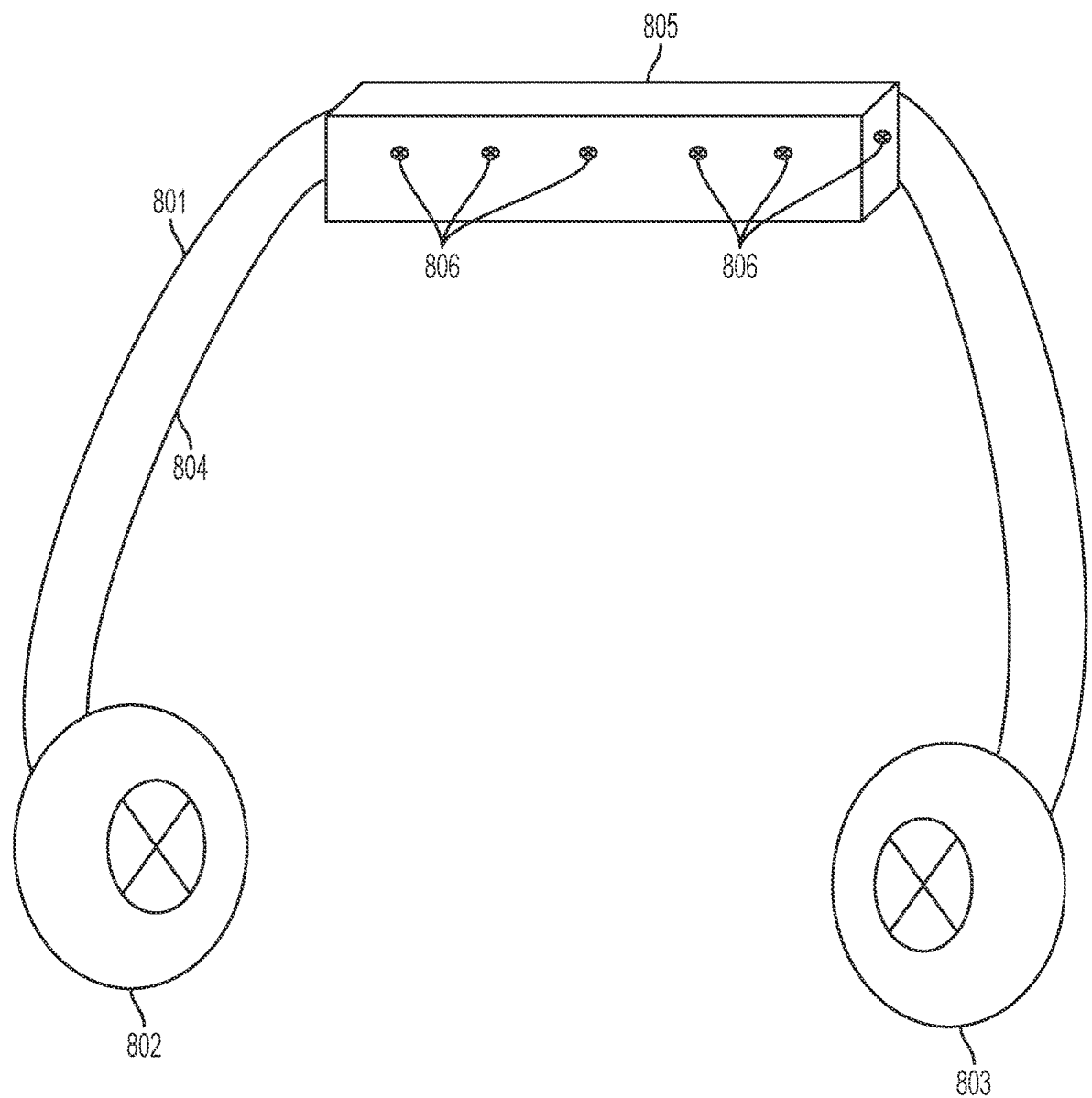
FIG. 8A shows an embodiment.
Figure 8B:
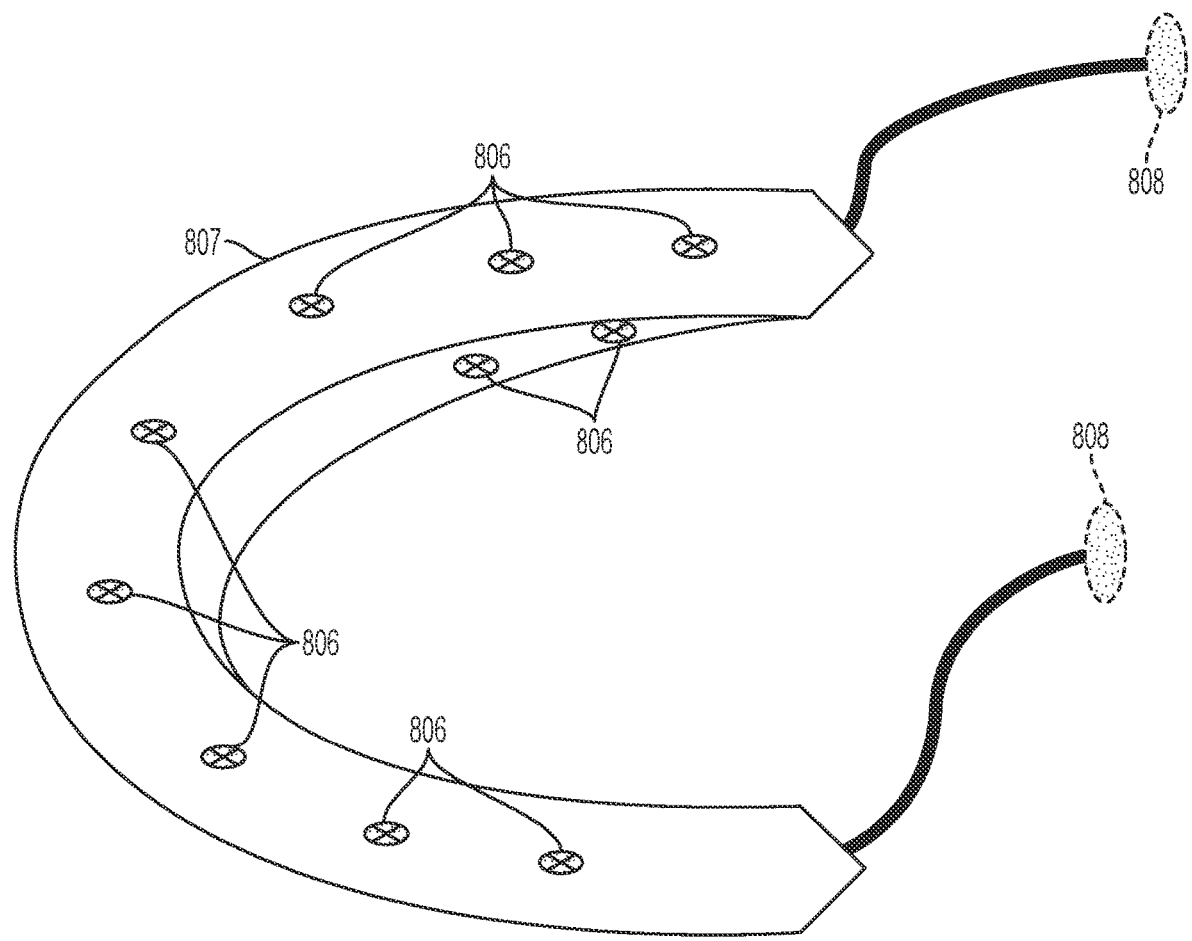
FIG. 8B shows an embodiment.

FIG. 8B shows an alternative embodiment of an input/output unit with microphones 806 located in a neckpiece housing 807 and including earphones 808.

Figure 8C:
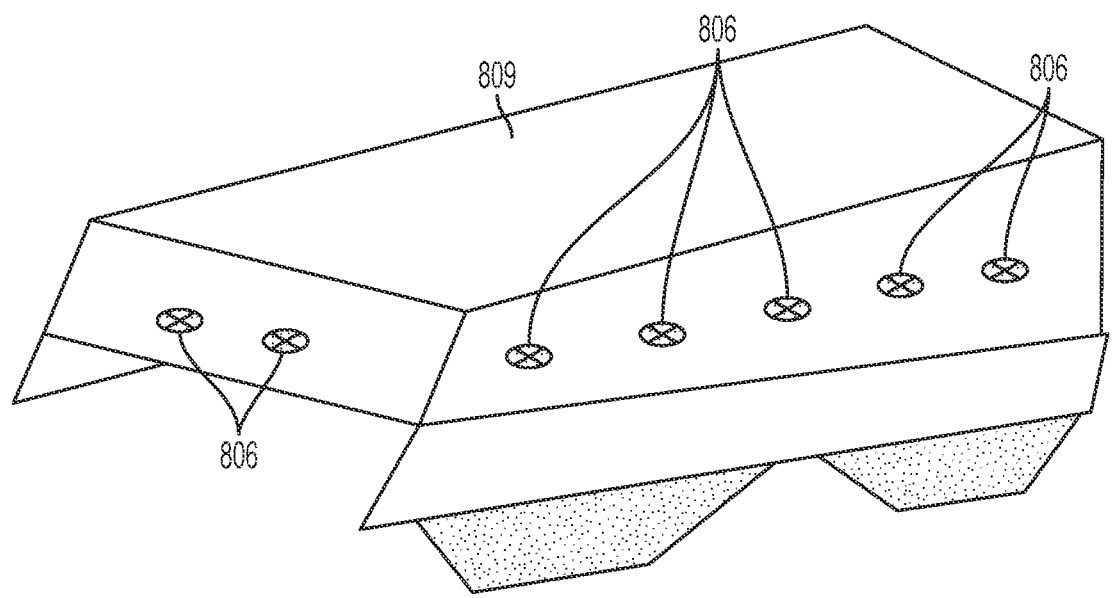
FIG. 8C shows an embodiment.
Figure 8C:
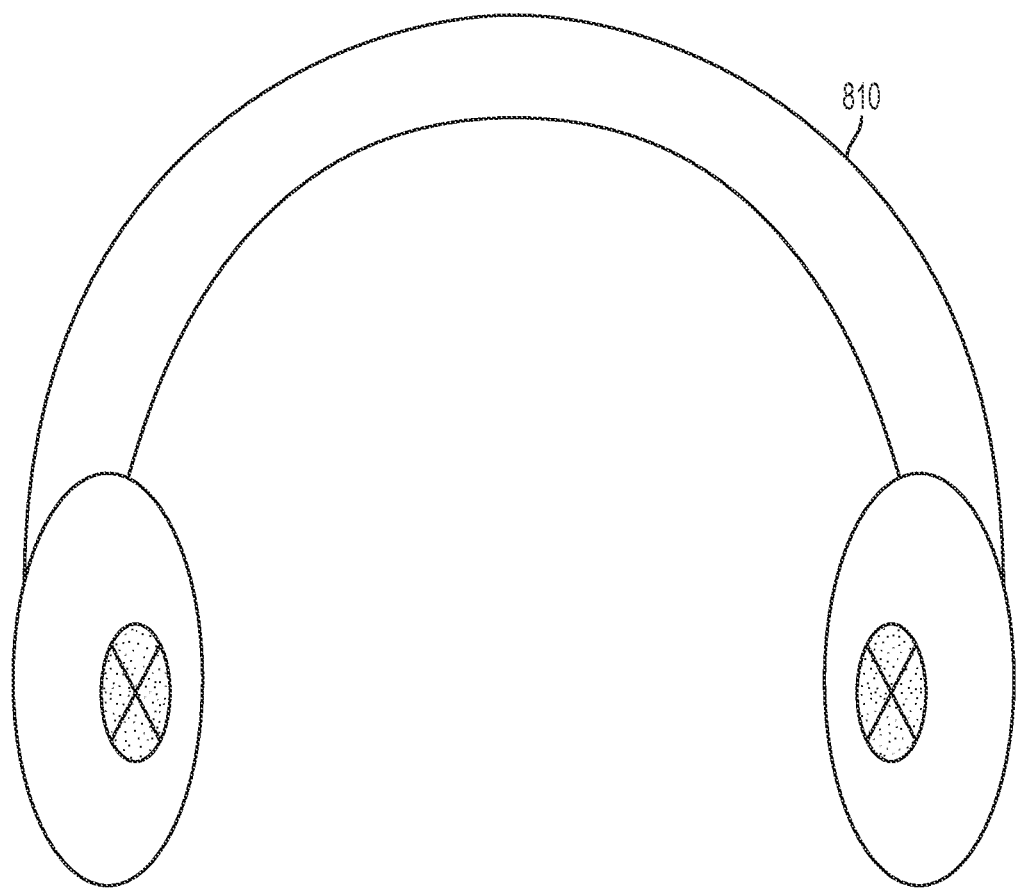

A third embodiment is illustrated in FIG. 8C. Conventional headphones 810 may be used as an audio output device. A microphone array 809 carrying a plurality of directional microphones 806 may be attached to the headband of a headphone 810.

Figure 8D:
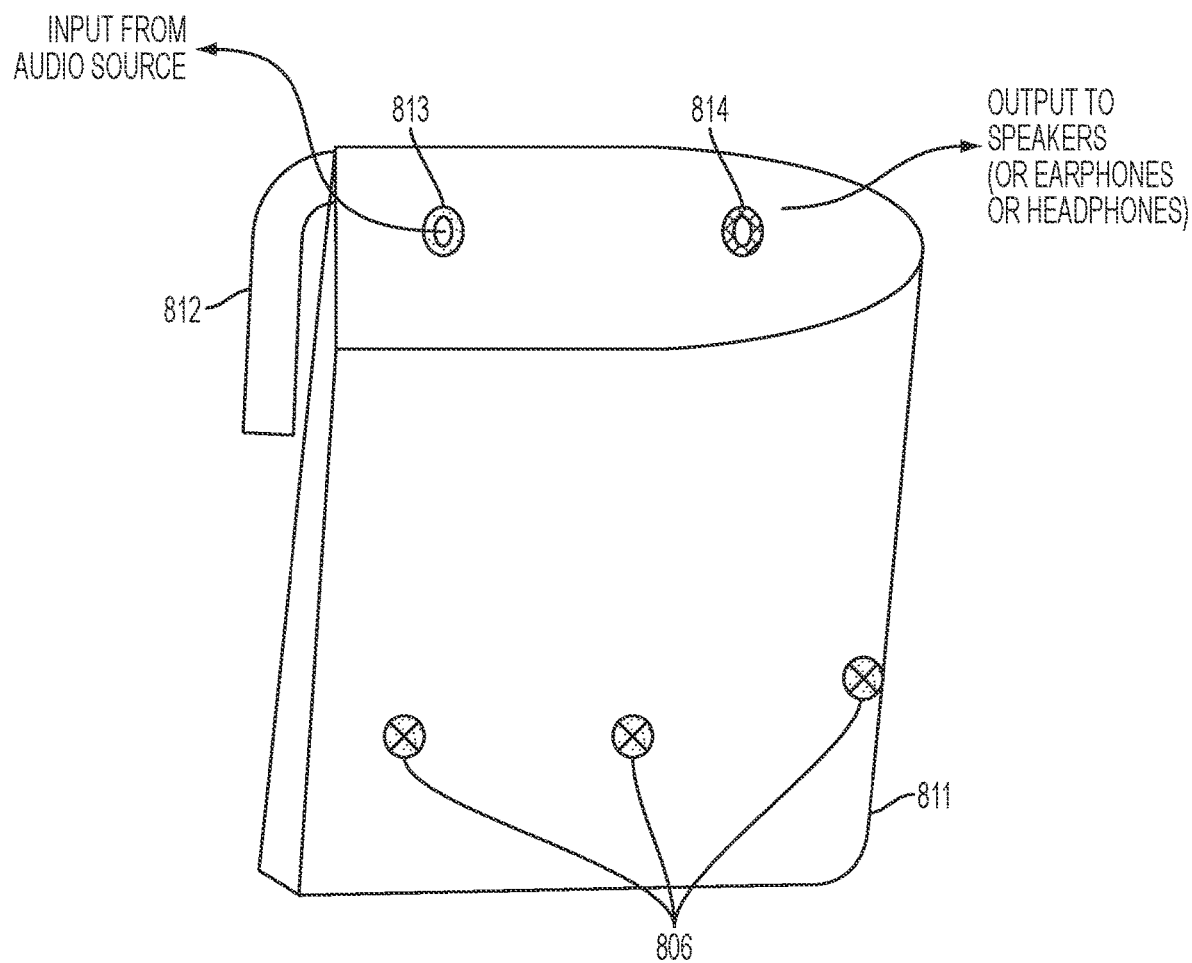
FIG. 8D shows an embodiment.

FIG. 8D shows an interface with a housing 811 designed to be connected to a belt or other structure by clip 812. The housing 811 may include one or more microphones 806, an input jack 813, and an output jack 814. The input jack 813 may be connected to an audio source such as an mp3 player. The output jack 814 may be connected to speakers, an earphone set or a headphone set.

Figure 8E:
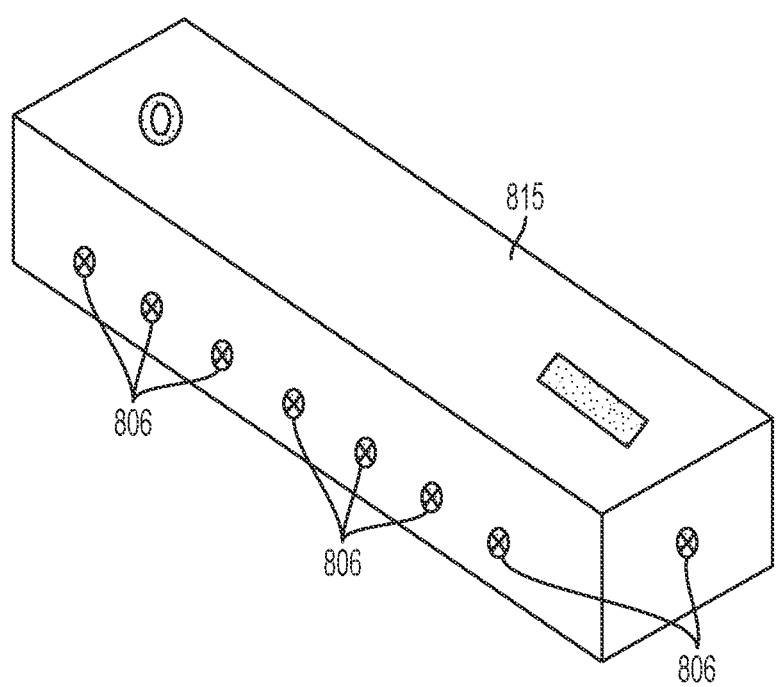
FIG. 8E shows an embodiment of the invention.

A further embodiment shown in FIG. 8E includes a housing 815 configured for connection to a smartphone such as an iPhone or Android phone. The housing 815 may be integrated with or connected to a smartphone case. The device shown in FIG. 8E may include one or more sensor microphones 806. Advantageously, a plurality of directional microphones may be used. Alternatively, one or more omnidirectional microphones may be used. The housing 815 may have a connector 816 suitable for electrically connecting the device to a smartphone. In the smartphone embodiment shown in FIG. 8E, the smartphone or other portable electronic device (not shown) may include application software operating as a user control. The signal processing capability may be incorporated into the smartphone or be performed by a separate processor located in the housing.

In each of the embodiments 8A, 8B, 8C, 8D, and 8E, user controls may be provided for in a connected input/output device such as a smartphone or by controls mounted on any of housings 805, 807, 809, 811 or 815. In addition, an audio divider 702 and mixing unit 708 may be provided for either within the microphone housings or control unit. In addition, connections between the input/output devices, audio inputs, audio processing unit, and mixing unit may be by wired or wireless connections. The same holds true for the controller and audio divider and/or storage if utilized.

FIG. 9A-G shows alternative aspects of a user control interface for use and connection with the audio optimization system according to the system.

Figure 9A:
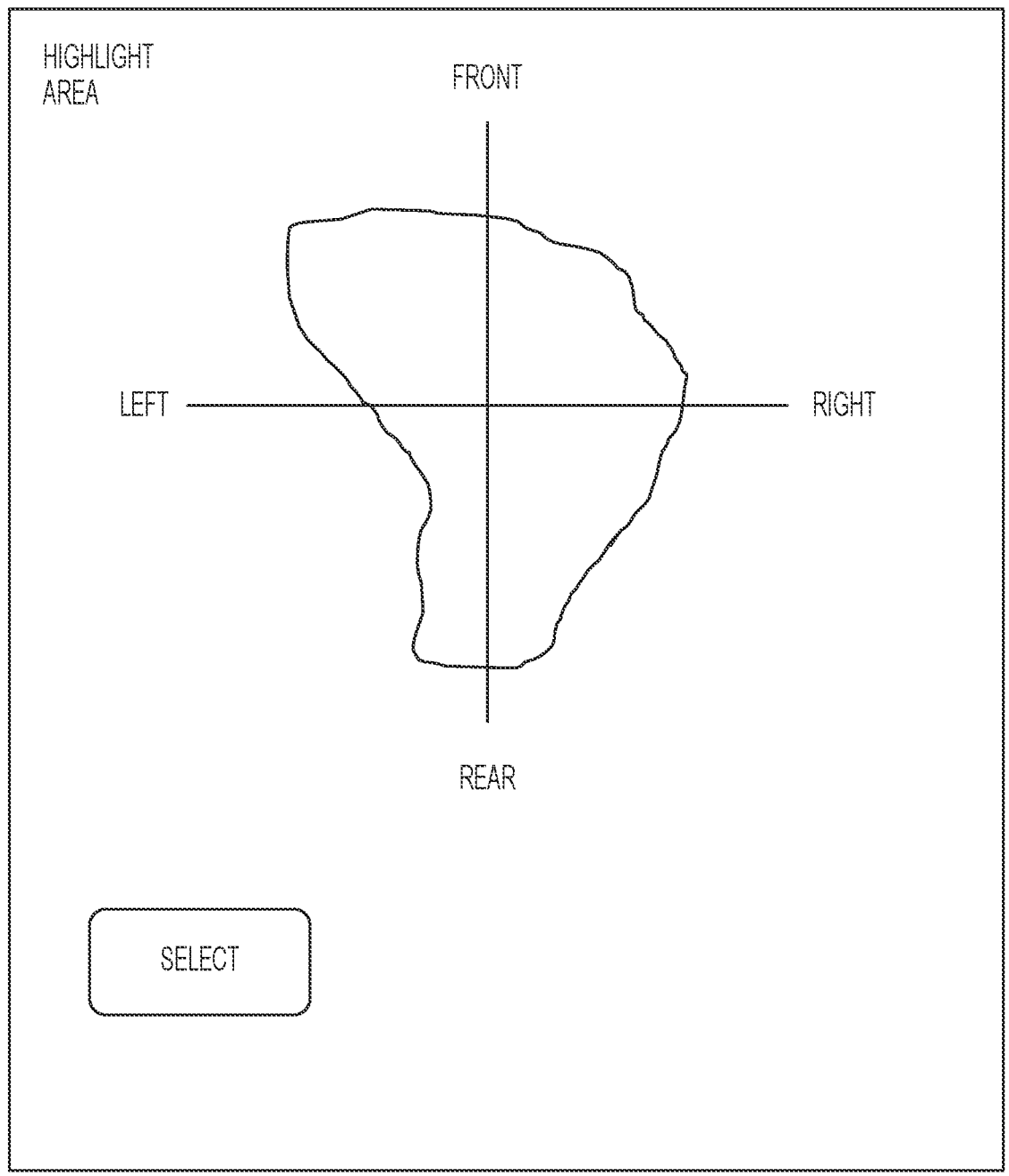
FIG. 9A shows an embodiment of a user control interface.

FIG. 9A shows a user control interface useful to control noise cancellation according to direction of noise source.

Figure 9B:
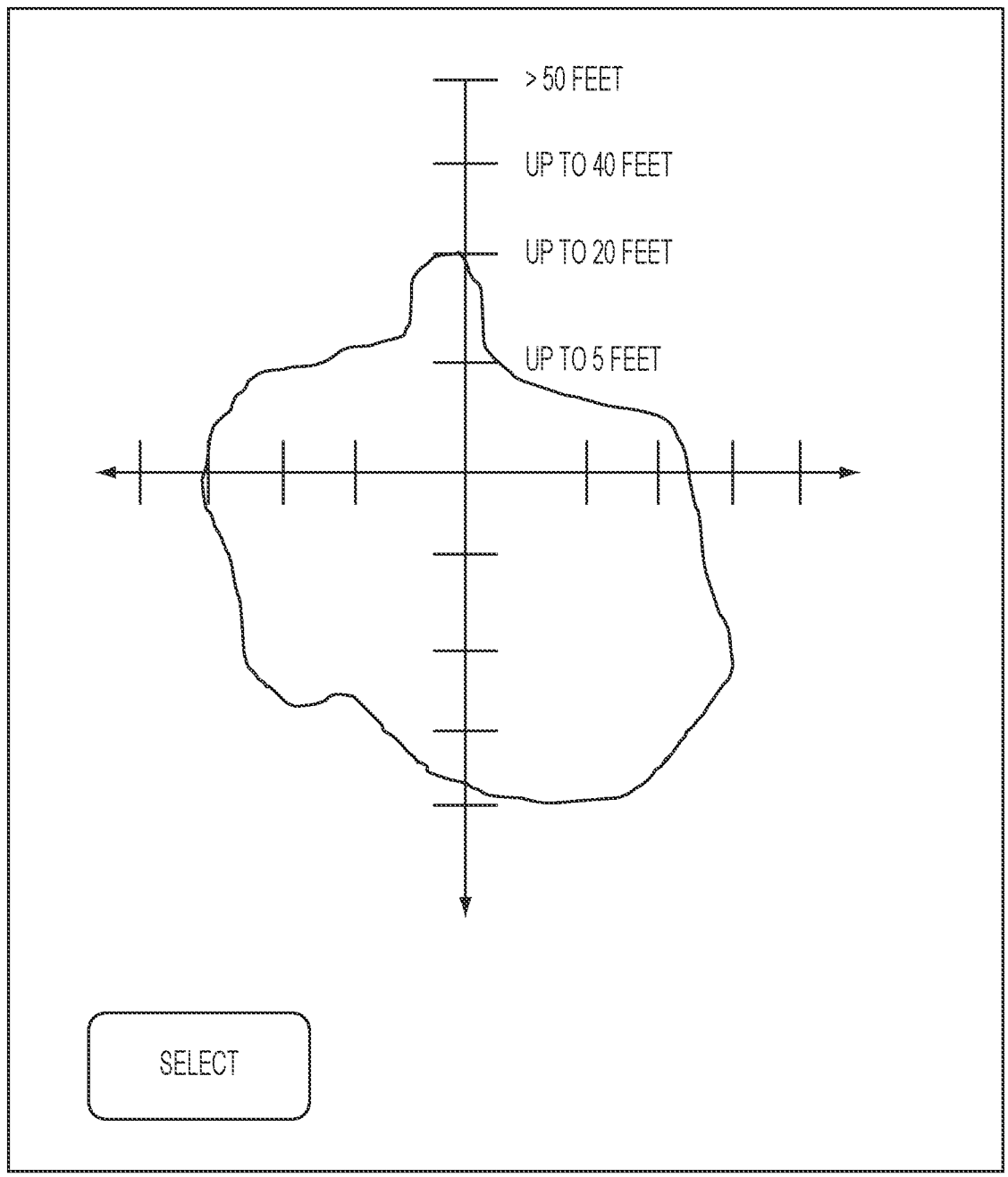
FIG. 9B shows an embodiment of a user control interface.

FIG. 9B shows a user control interface suitable for controlling direction and distance of audio subject to noise cancellation.

Figure 9C:
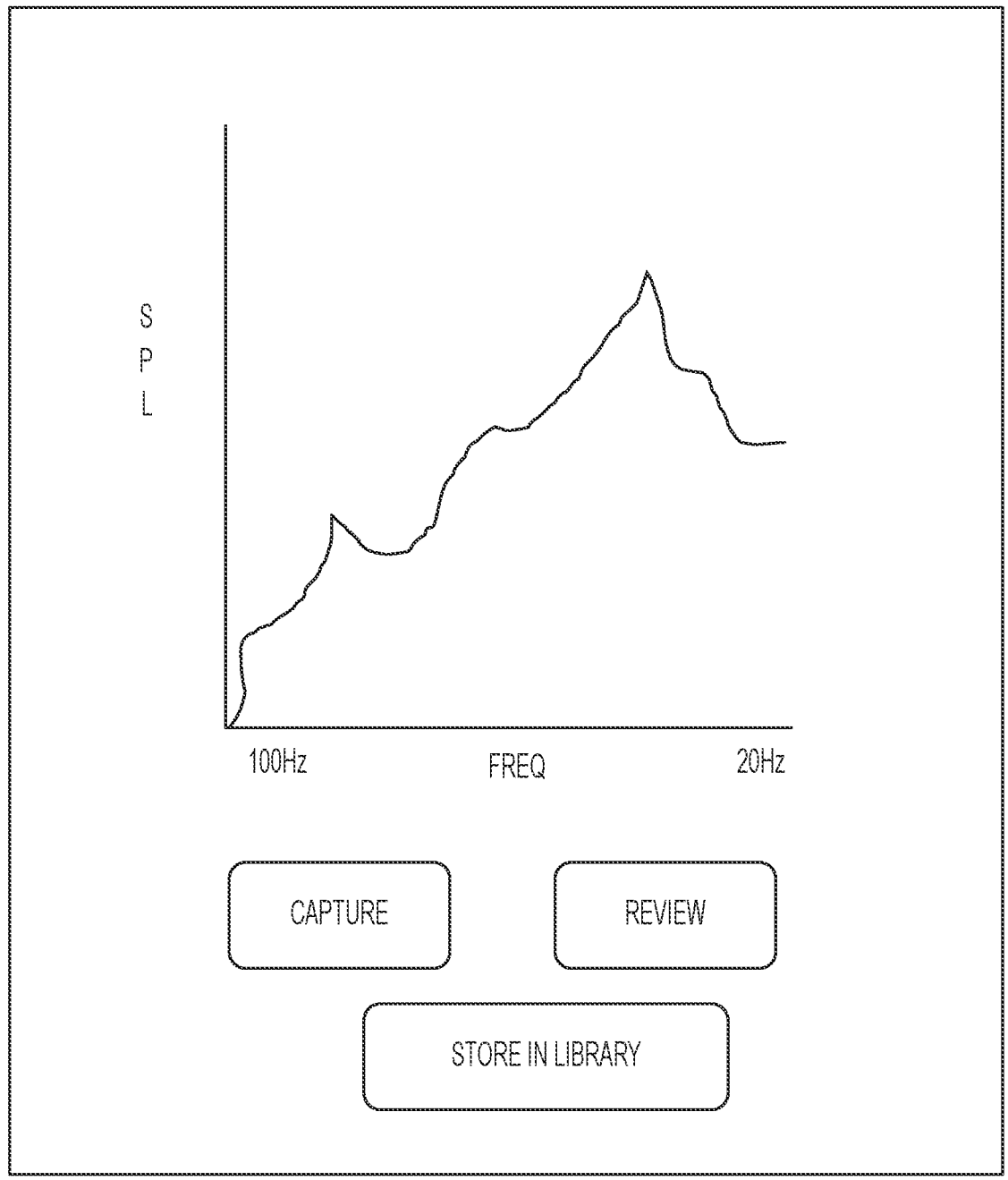
FIG. 9C shows an embodiment of a user control interface.

FIG. 9C shows a user control interface to facilitate a user capturing audio to serve as a model for enhancement or cancellation. The interface of FIG. 9B to record a sample audio that is to be exempted from cancellation, enhanced or specifically subject to cancellation. For example, a particular ringtone or alarm may be recorded and stored to serve as a profile to permit the same or similar audio to be transferred to the audio output.

The user control interface may also include controls for channels, volume, bass, treble, midrange, other frequency ranges, selection of cancellation algorithm or profile, selection of enhancement algorithm or profile, feature on/off switches, etc.

Figure 9D:
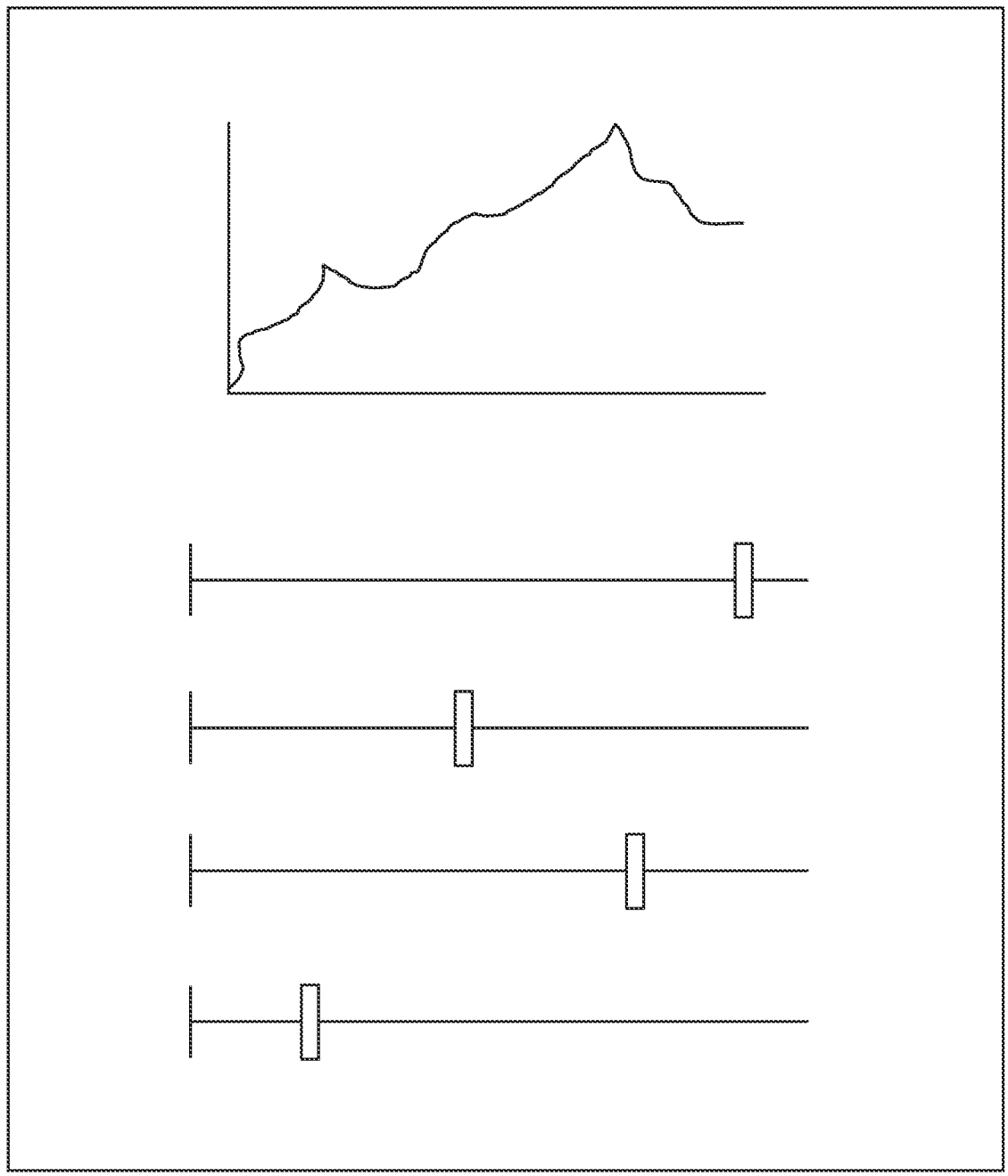
FIG. 9D shows an embodiment of a user control interface.

FIG. 9D shows a user control interface including a display of a representation of an ambient sound and sliders to change or customize audible parameters in an audio library.

Figure 9E:
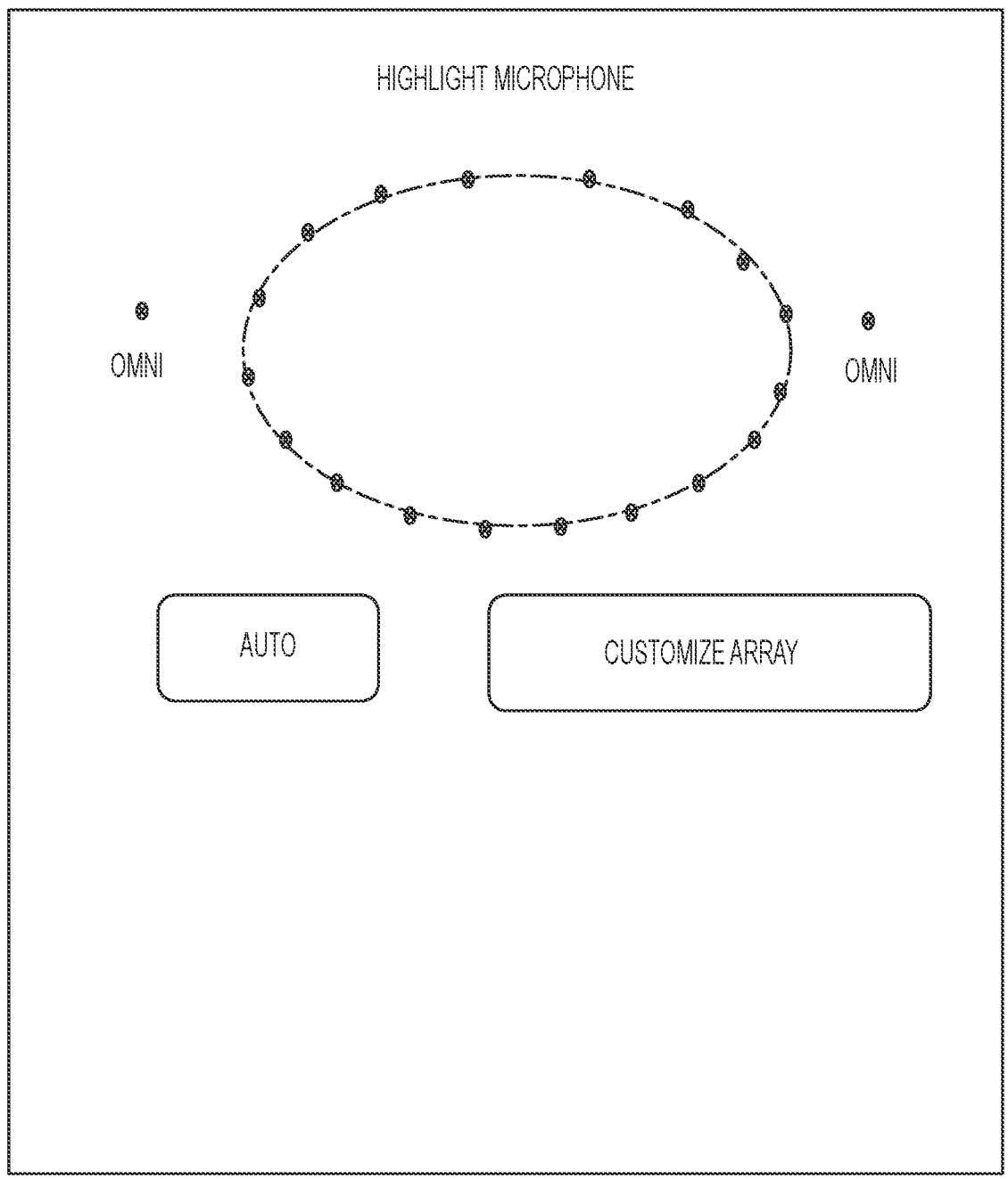
FIG. 9E shows an embodiment of a user control interface.

FIG. 9E shows a user control interface designed for microphone selection.

Figure 9F:
FIG. 9F shows an embodiment of a user control interface.

FIG. 9F shows a user control interface including a display allowing selection of distance from ambient sound source and/or microphone array.

Figure 9G:
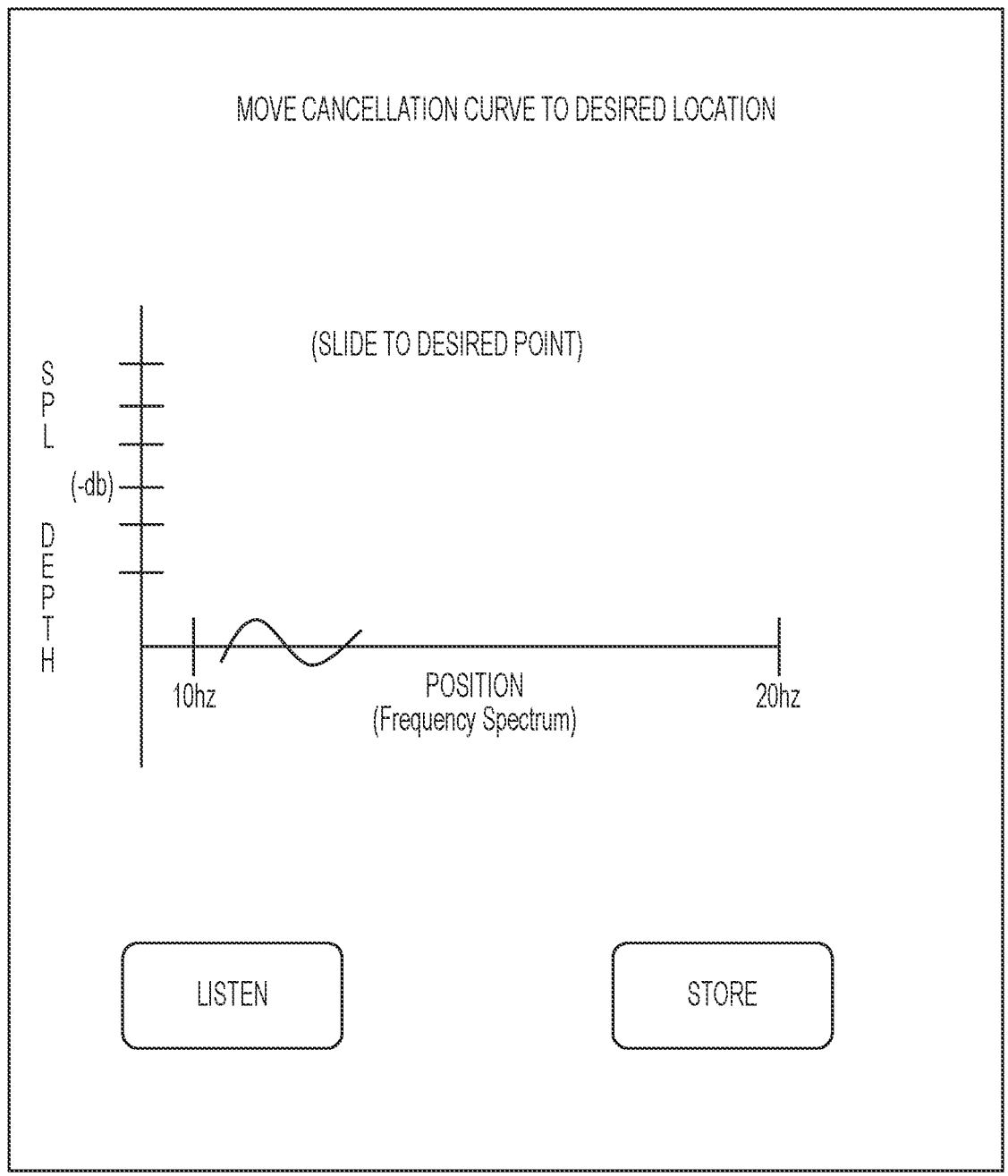
FIG. 9G shows an embodiment of a user control interface.

FIG. 9G shows a user control interface including a display corresponding to a noise cancellation algorithm and user input controls.

Figure 10:
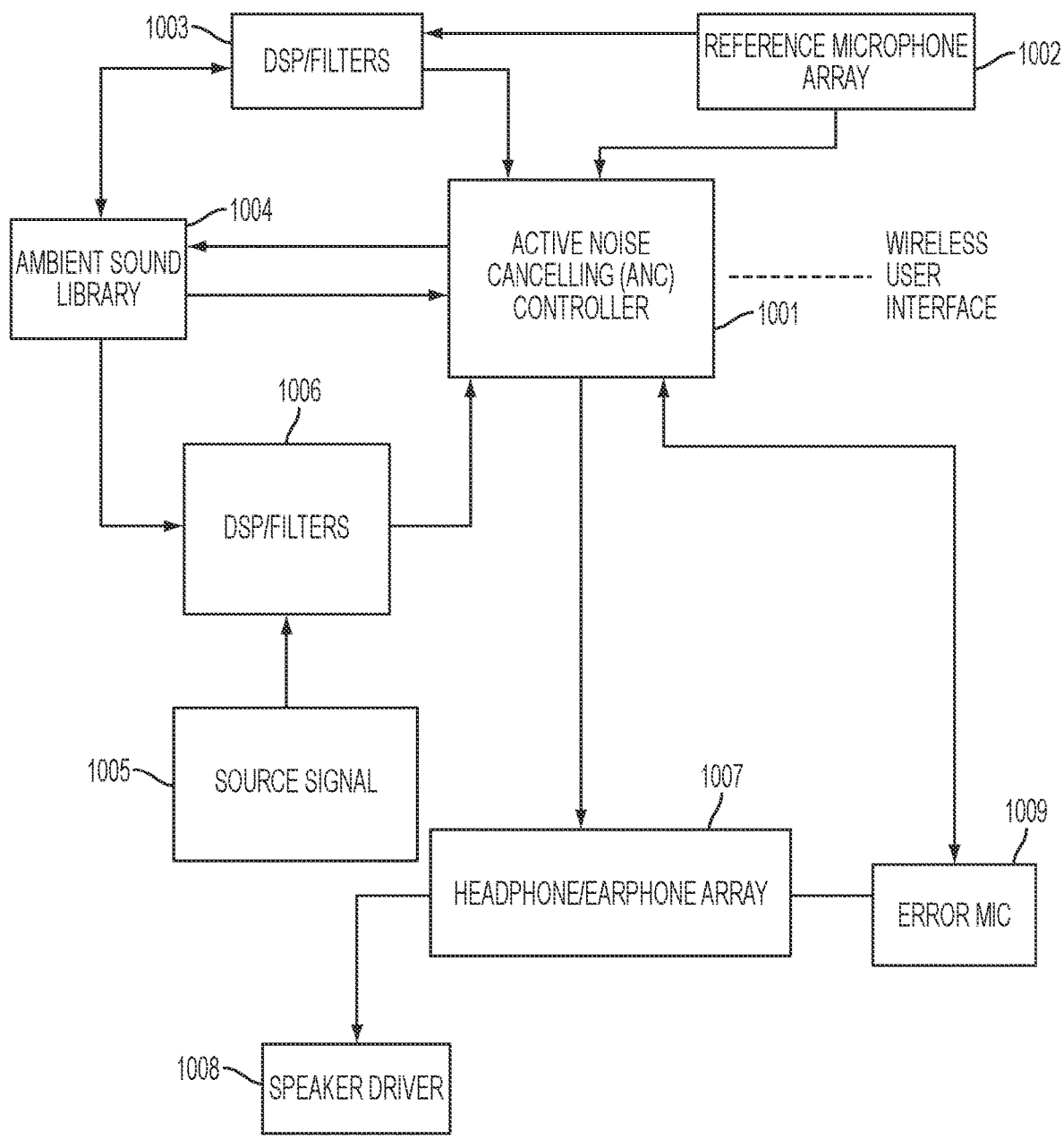
FIG. 10 shows a system layout according to an embodiment.

FIG. 10 shows a system layout according to an embodiment of the system. An adaptive noise controller 1001 is provided. The adaptive noise controller 1001 may be connected to a reference microphone array 1002 and to a set of digital filters 1003. The reference microphone array 1002 may also be connected to the digital filters 1003. The digital filters 1003 may rely on ambient sound profiles stored in an ambient sound library 1004 also connected to the adaptive noise controller 1001. A source signal 1005 may be connected to digital filters 1006 which in turn are connected to ambient sound library 1004 and adaptive noise controller 1001. Output devices such as earphone/headphone 1007 may be connected to the adaptive noise controller 1001 and may be connected to a speaker driver 1008. One or more error microphones 1009 may be connected to the adaptive noise controller 1001 and/or the headphone/earphone array 1007.

An embodiment of the system may operate to allow a user to select audio received in a headphone. The system may include a programmable audio processor which transmits audio selected by a user to an audio transducer, such as a headphone. The selection of audio can be by audio source and can be particular aspects or portions of an audio signal. It is a recognized problem that when audio is being played through headphones a user can become isolated from his audio environment. Noise canceling headphones designed to increase the perceived quality of audio to a user increase the level of isolation. The embodiment of the system may be designed to allow a user to selectively decrease audio isolation from the user's environment.

Figure 11:
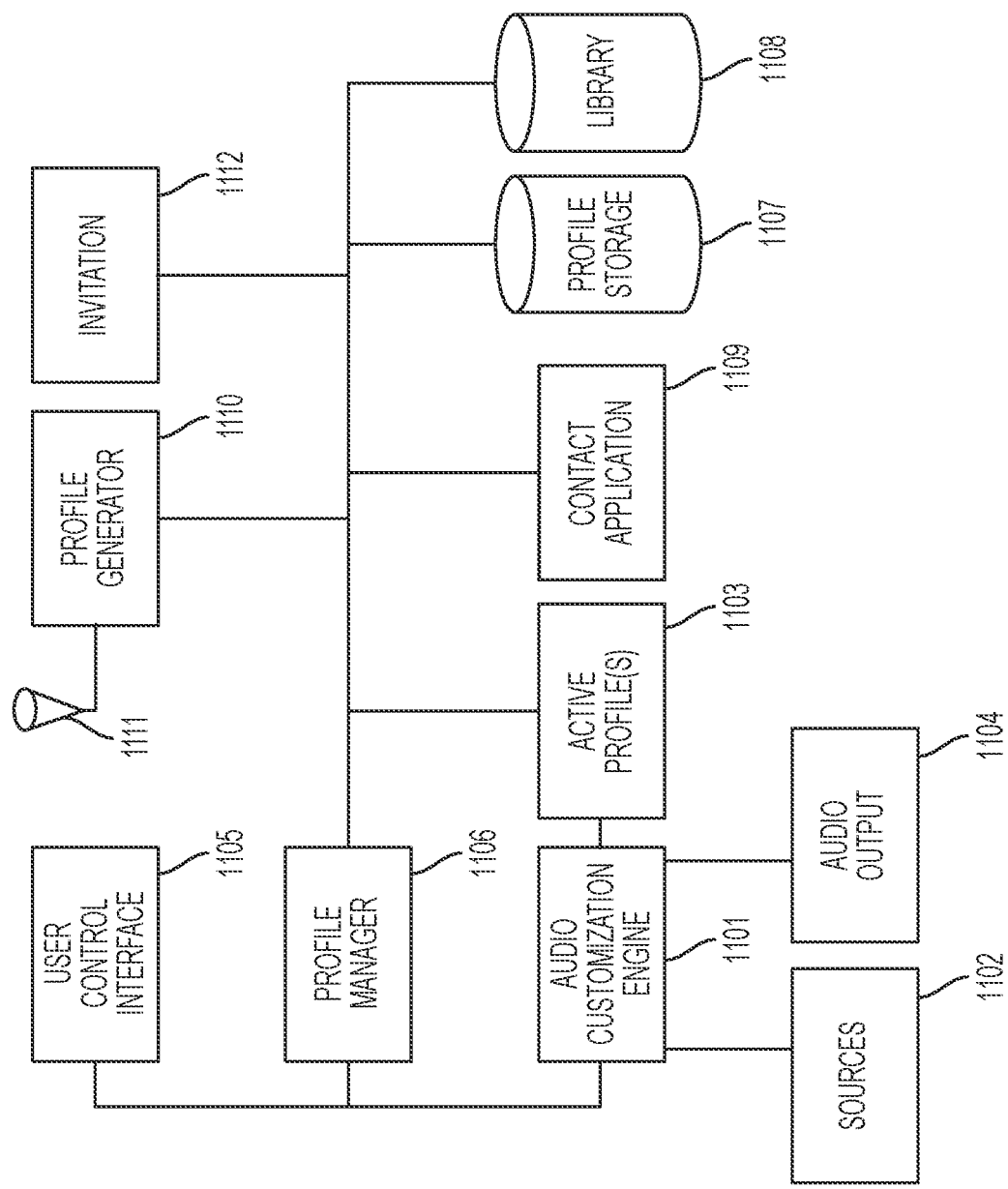
FIG. 11 shows a system for management, acquisition and creation of audio profiles for use in customizing audio.

The system may include audio profiles that are selected to control customization of audio provided to a user. FIG. 11 shows a system for management, acquisition and creation of audio profiles for use in customizing audio.

The system may include an audio customization engine 1101. One or more audio sources 1102 may be connected to the audio customization engine 1101. The audio sources advantageously include local audio sensor(s) such as one or more microphones or microphone arrays. The system may have microphones to detect local audio which may be used by the audio customization engine 1101 for active noise control.

One or more active profiles 1103 may be used by the audio customization engine 1101 to customize audio signals provided to an audio output device 1104, for example, headphones.

A user control interface 1105 operates with a profile manager 1106 to designate a set of active profiles. The profile manager 1106 can assemble audio profiles to be in active profiles 1103. The active profiles 1103 may be from one or more sources. The active profiles 1103 may include one or more default profile such as car horns or police sirens.

The system may have a user profile storage cache 1107 containing profiles obtained or generated by a user. Selected audio profiles may be from user profile storage cache 1107, may be transferred or copied to the active profiles 1103 for use by the audio customization engine. Another potential source of audio profiles is library 1108. The library 1108 may contain audio profiles indexed by a directory to allow a user to select an audio profile from a remote source. The library 1108 may contain profiles for individuals, environments, specified sounds or other audio components.

Audio profiles may also be stored in the contacts for a user or organization. The profile manager 1106 may access a contacts application to obtain audio profiles contained in a contacts application.

A profile generator 1110 may be present and connected to profile manager 106. The profile generator 1110 may sample audio from a microphone 1111 and process the sampled audio to generate an audio profile. The generated profile may be placed directly in the active profiles 1103, added to a contact 1109 or stored in user profile storage cache 1107 or library 1108. The audio profiles may be associated with appropriate metadata to facilitate location, identification and use.

An invitation system 1112 may be connected to the profile manager 1106 in order to invite another user or system to provide an audio profile or sample audio to generate a profile. The user control interface 1105 may control operation of the profile manager 1106 and audio customization engine 1101.

The system described herein may be implemented in a personal electronic device such as a smartphone or tablet. The system may be implemented and computation allocated between server and client devices depending on computational, communications, and power resources available.

The system may have or be connected to one or more microphones or microphone arrays, integrated with the housing of a user device or be remote. In the case of a personal electronic device, the system may have a jack to connect an audio sensor. The system may be connected to or integrated with a sound reproduction device such as one or more speakers or headphones. The connection may be by a speaker jack 1104. The system may be connected to an audio source, for example, a personal media player such as an MP3 player. The connection may use jack 105.

The system may be provided with an on/off switch and one or more user controls. The controls may be for one or more channels such as a left channel tune adjustment and a right channel tune adjustment. There may be one or more controls for frequency bands per channel. Alternatively, the controls may be for degree in balance in one or more frequency bands. The user controls may be applied to control operations on a server or local operation on a user device.

Figure 12:
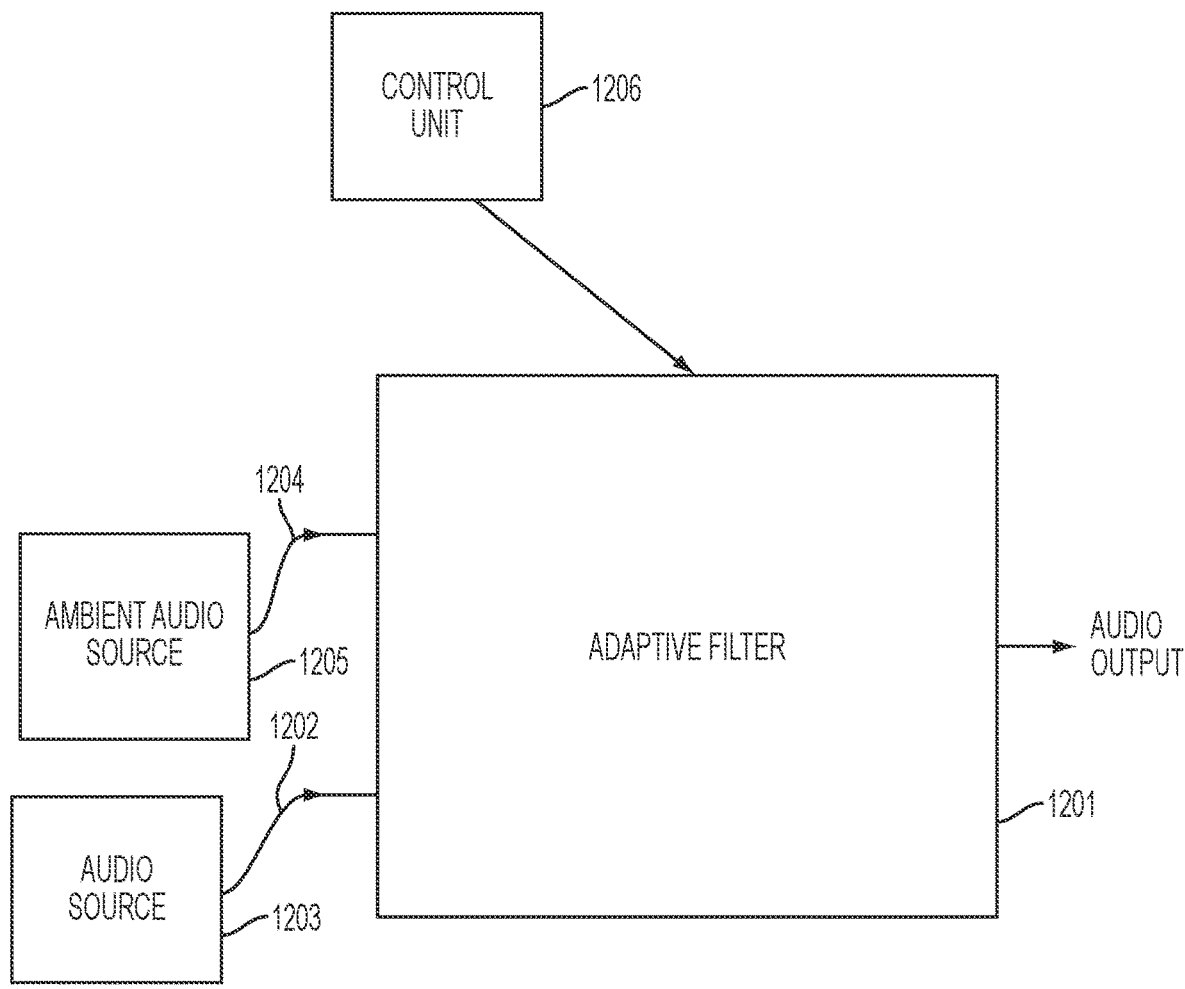
FIG. 12 shows a schematic of an embodiment of the custom audio system using an adaptive filter as an audio customization engine.

FIG. 12 shows a schematic of an embodiment of the custom audio system using an adaptive filter 1201 as an audio customization engine.

The adaptive filter 1201 may act on one or more audio input signals 1202, 1204 to condition the audio information for delivery of a modified or customized audio signal to a user. The audio characteristics may be tailored according to a profile selected by a user, a profile determined by audio analysis, a profile indicated by a non-audio input, and/or a preset profile. The adaptive filter may be hardware or software implemented. A software implementation may be executed using an appropriate processor and advantageously by a digital signal processor (DSP). An adaptive filter is a filter system that has a transfer function controlled by variable parameters. An adaptive filter may allow improved control over the adjustment of the parameters.

One or more sources 1203, 1205 may be connected to adaptive filter 1201 to provide audio signals 1202, 1204. Audio source 1203 may be local or remote. Audio source 1205 may provide local ambient audio information from one or more audio transducers such as microphones or microphone arrays. Other audio sources may be from remote or specialized audio transducers, mp3 or other audio players, or audio streams, or any other audio source.

The adaptive filter 1201 may be connected and responsive to a control unit 206. The control unit 1206 may provide parameters which define or influence the transfer function executed by the adaptive filter 1201.

Figure 13:
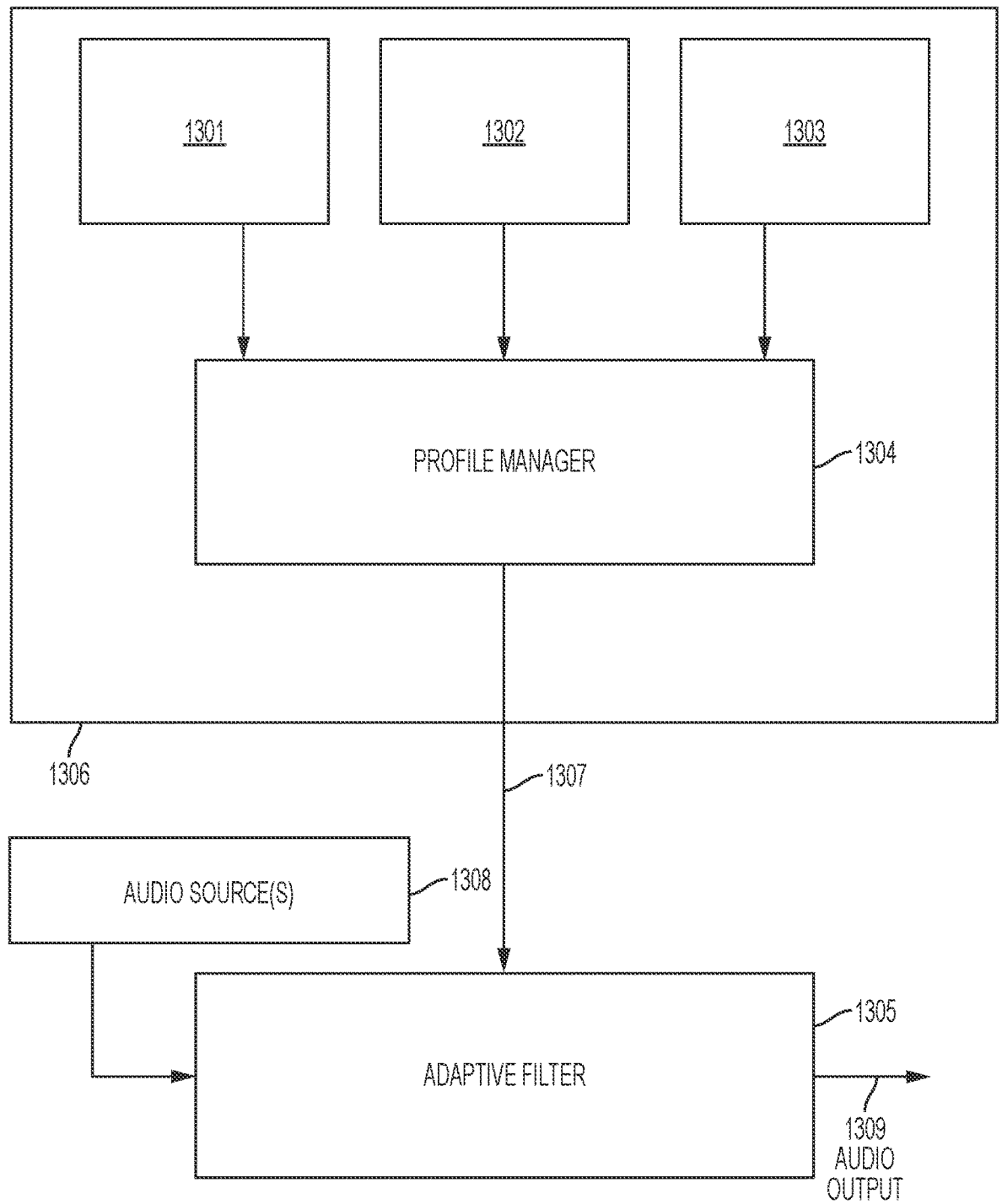
FIG. 13 shows an embodiment of an audio customization system.

FIG. 13 shows an embodiment of an audio customization system 1306 showing profile manager 1304. The profile manager 1304 may be associated with profiles 1301, 1302, 1303.

The profiles 1301, 1302, and 1303 may be mixed and used to control the adaptive filter to create an adaptive filter control signal 1307. The profile manager 1304 may perform this function. The adaptive filter control signal 1307 defines the transfer function used by the adaptive filter 1305. For illustration, FIG. 13 shows an audio source(s) 1308 which is representative of one or more audio inputs, including, but not limited to, local microphone(s)/microphone array(s); local audio player; cloud-based audio player; and/or network connected devices etc. The system is not limited by the source(s) or type of source(s). The adaptive filter 1305 applies the transfer function defined by the profile manager 1304 to the audio sources 1308 and outputs to an audio output 1309. The mixing function may also be performed in the adaptive filter itself, depending on implementation choices.

Figure 14:
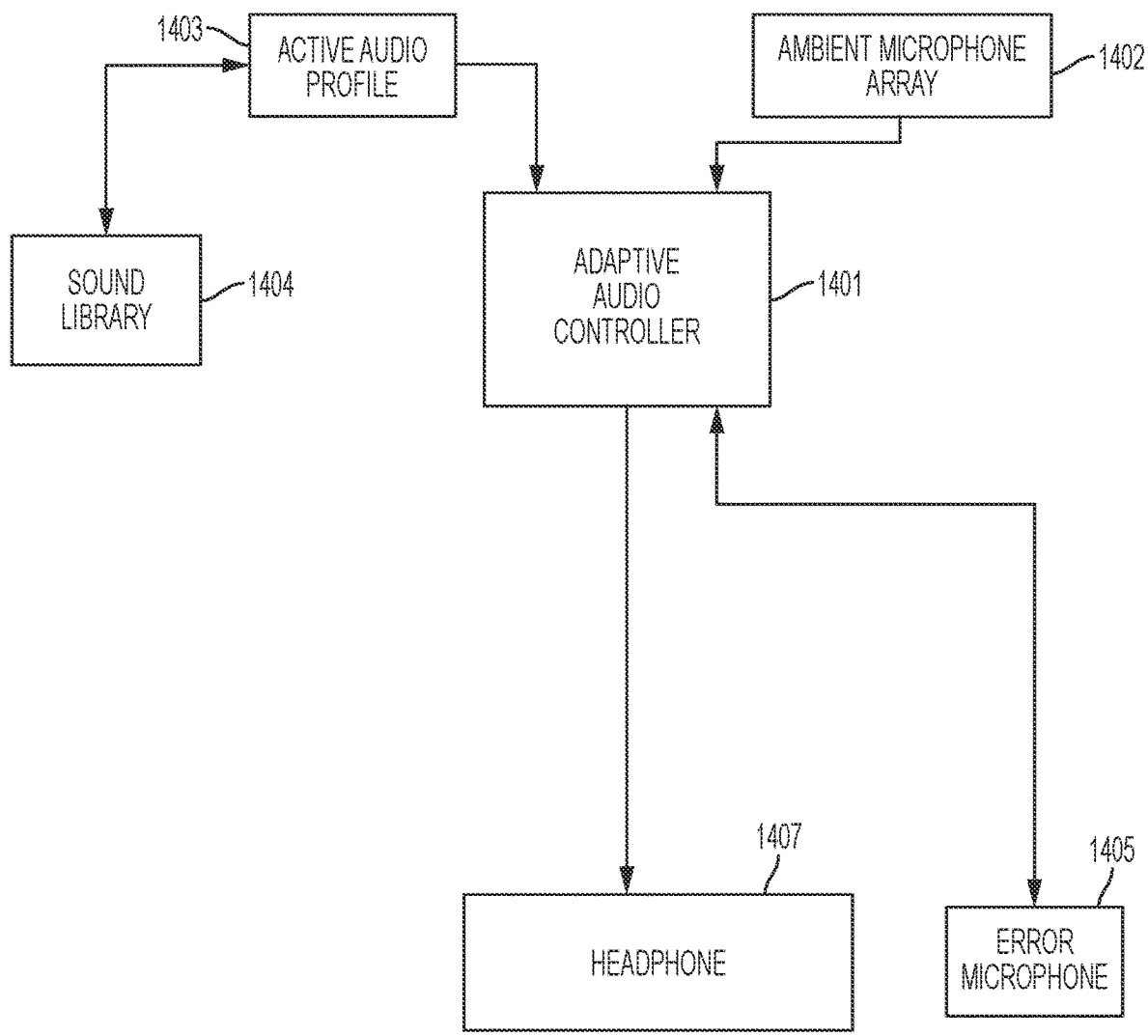
FIG. 14 shows a system layout according to an embodiment of the invention.

FIG. 14 shows a system layout. An adaptive audio controller 1401 may be provided. The adaptive audio controller 1401 may be connected to an audio source(s) 1402 which may be one or more microphones or other audio sources including an ambient microphone array. The adaptive audio controller may also be connected to a set of active audio profiles 1403. The active audio profiles 1403 may be selected from profiles stored in the sound library 1404. The sound library 1404 may contain audio profiles created by sampling audio information detected by the ambient microphone. If a user wants to establish a profile for certain characteristic audio, the audio may be sampled and characterized in order to create a profile. The sample audio may be used to create an audio profile such as a specific voice, machinery, or other noise. Profiles for a noise, such as a jackhammer or a person the user does not want to hear may be created, as well as profiles to a noise or person the user especially want to hear may be created by isolating and analyzing the specified audio to characterize the audio and establish a profile that can be used by the adaptive audio controller 1401, to either enhance or attenuate audio corresponding to the characteristics of the sample.

The adaptive audio controller 1401 may be implemented in a multi-channel audio processor, a digital signal processor, for example an Audio-System-On-A-Chip (ASOC) processor. The audio processor may have an auto mode that may divide an audio signal into eight frequency bands. Audio input signals may be divided, shaped or transferred according to controllable frequency bands or in any other manner that may be accomplished by a digital signal processor or other circuitry.

The audio divider may be connected to an audio controller implemented by the DSP which may dictate the manner in which the divided audio input signals are handled. The processed audio channels may then be mixed down to a mono or stereo output. The stereo or two-channel output may connect to a headphone.

Output device 1407 may be connected to the adaptive audio controller 1401. The audio source(s) 1402 may also include one or more error microphones 1405 for noise detection and cancellation purposes.

Figure 15:
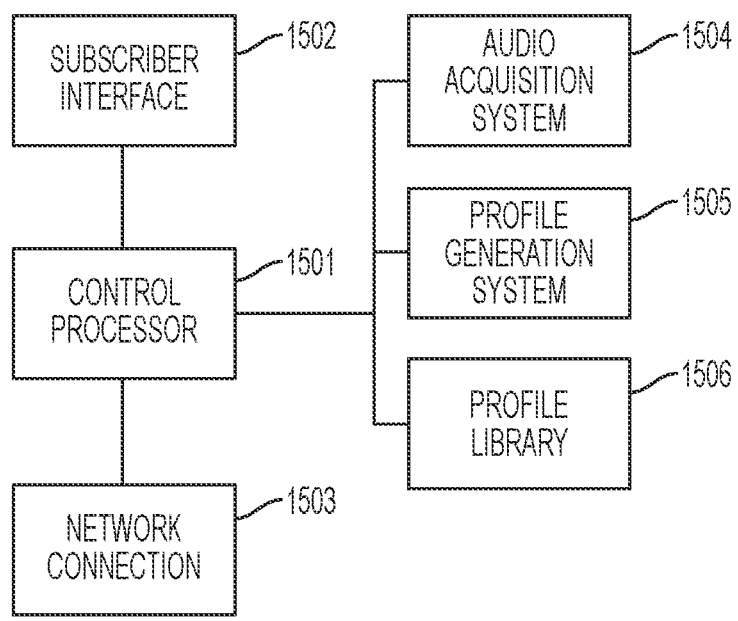
FIG. 15 shows an illustration of networked embodiment of a communications system.

The customization may be used and managed in a networked system. FIG. 15 illustrates an embodiment of a networked communications system for establishing and providing preferred audio. According to an embodiment of the system, a social networking system may be established where members of the network may authorize and/or request access to enhanced communication with others in the network. The communications may occur over a network or may occur in a non-networked fashion, i.e., people talking within "earshot" of each other. One system implementation is shown in FIG. 15. The system is managed by a control processor 1501. A subscriber interface 502 may be utilized by the subscriber's or network members. The subscribers may establish a transformation to be used for their own accessible audio. Subscribers may create their own audio profiles. Subscribers may authorize others to include the subscribers in transformations. A network connection 1503 is illustrated, however, processing and communications resources may suggest whether indicated processes are performed centrally on servers or distributed to user devices.

An audio acquisition system 1504 may be connected to the control processor 1501. The audio acquisition system is used to sample audio. The subscriber interface may include a microphone and a subscriber advantageously will record voice samples which will be processed through the audio acquisition system 1504 and provided to the profile generation system 1505. The profile generation system is utilized to characterize the nature of the acquired audio in order to establish a generalized filter useful for distinguishing audio content having the same characteristics for use in specifying a transformation. Certain audio signals may exhibit characteristic properties which facilitate establishment of a profile for use in transformation. For example, a telephone dial tone may have a particular narrow frequency which could be measured and profiled. The profile would be used in the transformation in order to filter out that particular frequency. Other audio sources are more complex but may still be characterized for filter generation. Complex audio sources such as individual voices will typically require substantial processing, and as such, centralized server processing may be appropriate. Profiles generated by the profile generation system may be stored in a profile library 1506. The subscriber interface 1502 may be utilized to identify and select profiles contained in the profile library for incorporation in a subscriber transformation. Advantageously a profile library may include subscriber profiles and generic profiles which may be useful such as police siren profiles, car horn profiles, alarm profiles, etc.

Figure 16A:
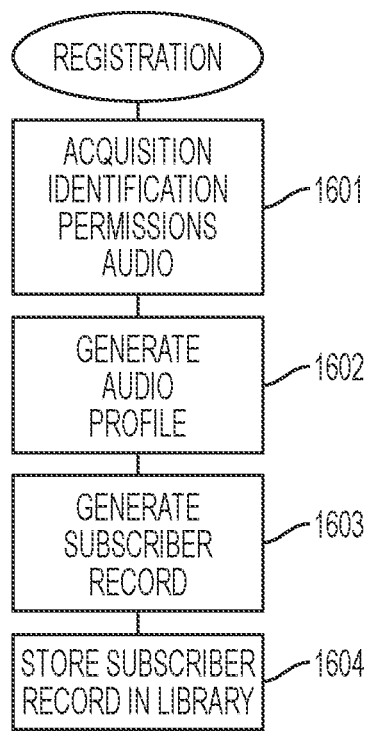
FIG. 16A shows an example of a registration process of an embodiment of a communication system.
Figure 16B:
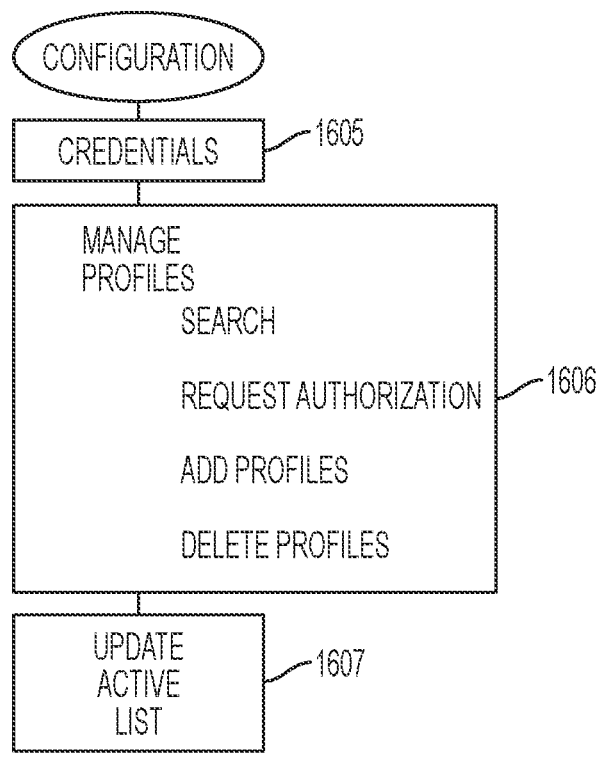
FIG. 16B shows an example of a configuration process of an embodiment of a communication system.
Figure 16C:
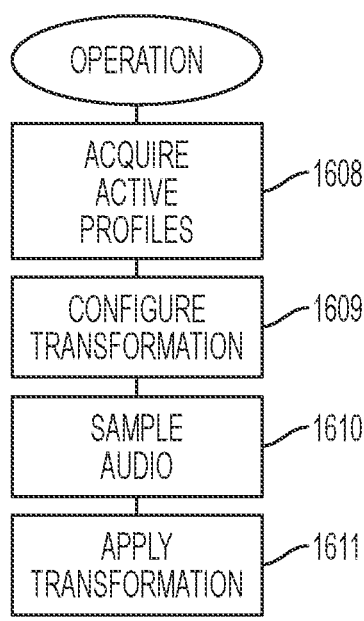
FIG. 16C shows an example of the operation process of an embodiment of a communication system.

FIGS. 16A, 16B, and 16C illustrate operations of an embodiment of the communications system. FIG. 16A illustrates the registration process for the system. Registration is initiated by acquisition operations 1601. The acquisition operations acquire information for use in the system for each subscriber. The acquisition process includes acquiring subscriber identification and registering credentials. The acquisition process also involves setting permissions. Setting permissions as a process to establish which subscribers may have access to subscriber profiles. The acquisition process 1601 also includes acquiring audio samples from the subscriber. Process 1602 serves to generate an audio profile on the basis of audio acquired in process 1601. Process 1603 generates a subscriber record which includes or links subscriber identifications, subscriber permissions and subscriber audio profiles. Process 1604 operates to store the subscriber record in a library for use by the subscribers and those authorized by the subscriber. FIG. 16B illustrates the configuration operation for subscribers. Configuration is initiated when a subscriber connects and submits acceptable credentials for identification and establishing authorization to access the system. The credentials are submitted and verified at process 1605. Process 1606 illustrates operations to manage profiles. A subscriber, once connected to the configuration system, can manage the profiles which are utilized to generate the subscriber audio transformation. The manage profile operation 1606 includes search; request authorization; add profiles; and delete profiles. The search function is a mechanism for a subscriber to search for other subscribers and available profiles. The request authorization function may be initiated on the basis of the results of a subscribers search, or on the basis of input on a subscriber identification. The request authorization function initiates an authorization request to another subscriber for access to the other subscriber's audio profile. Once a subscriber has access to the audio profile of another subscriber, the first subscriber may use that audio profile in a transformation to enhance or attenuate audio information having matching characteristics.

The request authorization operation initiates an authorization request to another subscriber. Once that subscriber receives the request, it may be accepted, rejected, or ignored. According to an embodiment, once the request is accepted, the subscriber record of the accepting subscriber is updated to reflect permission granted to the request of the subscriber for use of the audio profile.

The managed profile operation also includes an add profile function whereby a subscriber can select profiles to be activated for that subscriber. Profiles including permissions which are added by a subscriber are then included in the active profiles and utilized to generate a transformation that will be applied to audio information received by that subscriber.

The manage profiles operation 1606 also includes a delete profiles function. The delete profiles function serves to deactivate and remove a particular profile from the subscriber's active profiles. The update active lists function 1607 operates to modify the subscriber's active audio profiles in accordance with the add profiles function and delete profiles function of the manage profiles operation 1606.

FIG. 16C illustrates the operations function of the communications system. Operations are initiated by acquisition of the subscriber's active profiles 1608. Once the active profiles are acquired for a session, the system carries out a configure transformation operation 1609. The configure transformation operation 1609 combines the active profiles into a transformation which may be used by the adaptive audio profiler 1401, the adaptive filter 1305, or the audio customization engine 1101. The system includes a sample audio operation 610 which advantageously utilizes one or more microphones to "listen" to the ambient environment and may include local or networked audio signals combined with the ambient signals.

One or more of the audio signals are provided to an audio processor which provides the audio transformation 1611 which is created by the configure transformation operation 1609. The transformed audio may be provided to a transducer such as a speaker, and preferably headphones.

The techniques, processes and apparatus described may be utilized to control operation of any device and conserve use of resources based on conditions detected or applicable to the device.

Headphones are a pair of small speakers that are designed to be held in place close to a user's ears. They may be electroacoustic transducers which convert an electrical signal to a corresponding sound in the user's ear. Headphones are designed to allow a single user to listen to an audio source privately, in contrast to a loudspeaker which emits sound into the open air, allowing anyone nearby to listen. Earbuds or earphones are in-ear versions of headphones.

The system may be controlled so that a particular communication station will be in audio communication with one or more other communications stations 1701. The control station 1702 may require permissions from one or more of the communications stations 1701 to establish and maintain audio communications. The permissions may be designated at a control station 1702. Advantageously the control stations 1702 may be client applications running on a desktop or other computing platform. A user may log into a control station 1702 in order to manage and control audio communications to stations which the user is authorized to manage.

The control station may be connected by a network 1705 such as the internet to a connection manager 1706. The connection manager 1706 may contain logic facilitating the identification of audio sources that each communications station has requested. The audio sources may be other subscriber stations which must be set up by their users to authorize communications. In addition, the audio sources may include static audio sources such as radio stations or other broadcast facilities and signaling stations to provide information of a more general interest. Examples of signaling stations may include weather alerts, AMBER alerts, or school closing notifications. A control station 1702 may be utilized to program the connection manager 1706 to designate the sources that the communications station 1701 is requesting.

Each individual computing device may have a physical or logical identification. The physical or logical identifications may be IP addresses, MAC addresses, telephone numbers, user numbers or any other identification token. When the communication manager 1706 has received sufficient permissions to authorize a communication connection, the connection manager informs the connection matrix 1707 of the enabled connection. The connection matrix 1707 is connected to and controls a matrix switching system 1708 which establishes authorized connections between communications stations 1701.

Figure 17:
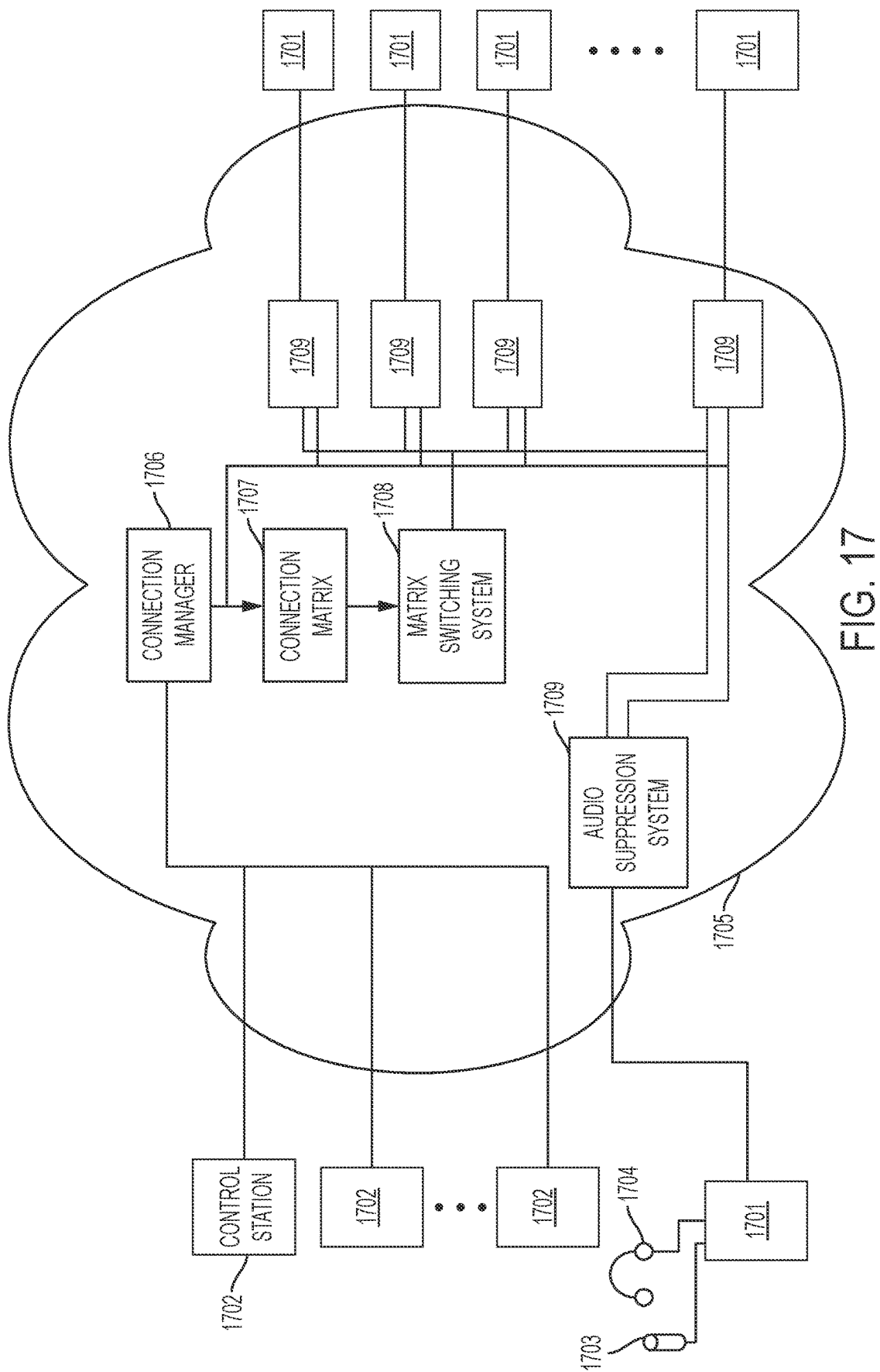
FIG. 17 shows an embodiment of a mutual permission customized audio source according to an embodiment of the invention.

It may be desirable to control the nature of or aspects of audio information which is communicated between communications stations 1701. FIG. 17 illustrates an audio suppression system 1709 between the communications station 1701 and the matrix switching system 1708. The audio suppression system 1709 may advantageously be controlled according to instructions from a control station 1702 provided to a communications manager 1706. The communications manager 1706 may provide control instructions to the audio suppression system 1709.

Audio suppression system 1709 may be in place to attenuate background noise or other portions of the audio information being communicated. Depending on the application, the audio suppression may be applied to inbound communications to a communications station 1701 or outbound communications from a communication system 1701.

The control station 1702 may be used to populate a communications table 1710 as shown in FIG. 18. The communications table 1810 may have a set of records 1834 that include a requesting station ID field 1831, a requested station ID field 1832 and a mutual authorization flag field 1811. FIG. 19 shows an authorization table 1912 with records containing a transmitting station ID field 1933 and transmit authorization flag 1935. The control station 1702 may provide an identification of a station and an identification of each station that the station wishes to include in its communications group. The communications table 1810 may also include a flag field 1811 to signal a mutual authorization to establish communications. The mutual authorization field 1811 is activated when a station initiates a communication request to a second station which has previously been authorized by the second station. An authorization table 1912 may include records identifying communications stations that do not require explicit authorization to establish communications. For example, a radio station could be set up so that it does not require authorization, for example, a subscription-based station. A radio station may also be set up so that it does require authorization. The radio station's subscription management system 1913 would be responsible for communicating authorized identifications to the communications manager 1706.

An entry may be created in a communications table 1810 when an authorized request is made for a first communications station to be in communication with a second communications station. The entry 1834 will include the ID of the first station as the requesting station ID 1831 and the ID of the second station as a requested station ID 1832. If an authorized request for the second station to be in communication with the first station had not been previously made an entry is created in the communications table 1810, an invitation may be transmitted to the second station to establish communication. If that invitation is accepted, a second entry may be created in the communications table 1810 indicating the ID of the second station seeking authorization to establish communications. A process may be used to determine when complementary entries exist in the communications table 110, and if so, set the authorization flags 1811 to authorize communications and having an authorized field set.

If a station requests communication authorization with a second station which had previously authorized communication, a record may be entered in the communications table 1810 indicating the communication pair and setting the authorization flag 1811. The communications manager 1706 identifies all communication pairs which have been mutually authorized either by specific action or by default and places an entry in the connection matrix 1707. The connection matrix 107 controls the matrix switching system 1708 to establish a communication channel between the stations of the communication pair.

According to an advantageous feature, an address book may be provided in or in connection with each station. The address book may be a personal look-up table to identify a correlation between a user-identifiable information, like a name, and a logical identification like a station identification number.

In this fashion, a system can be established where a group of friends request communications. Each friend can listen in on audio originating from a paired communications station. The friends may modify the authorizations on an ad hoc basis.

According to an advantageous feature, each station may include a communication activation control. In this fashion, the user of each station may control whether the station broadcasts, receives broadcasts, broadcasts and receives or does not broadcast and does not receive. The control interface may be an application.

Figure 20:
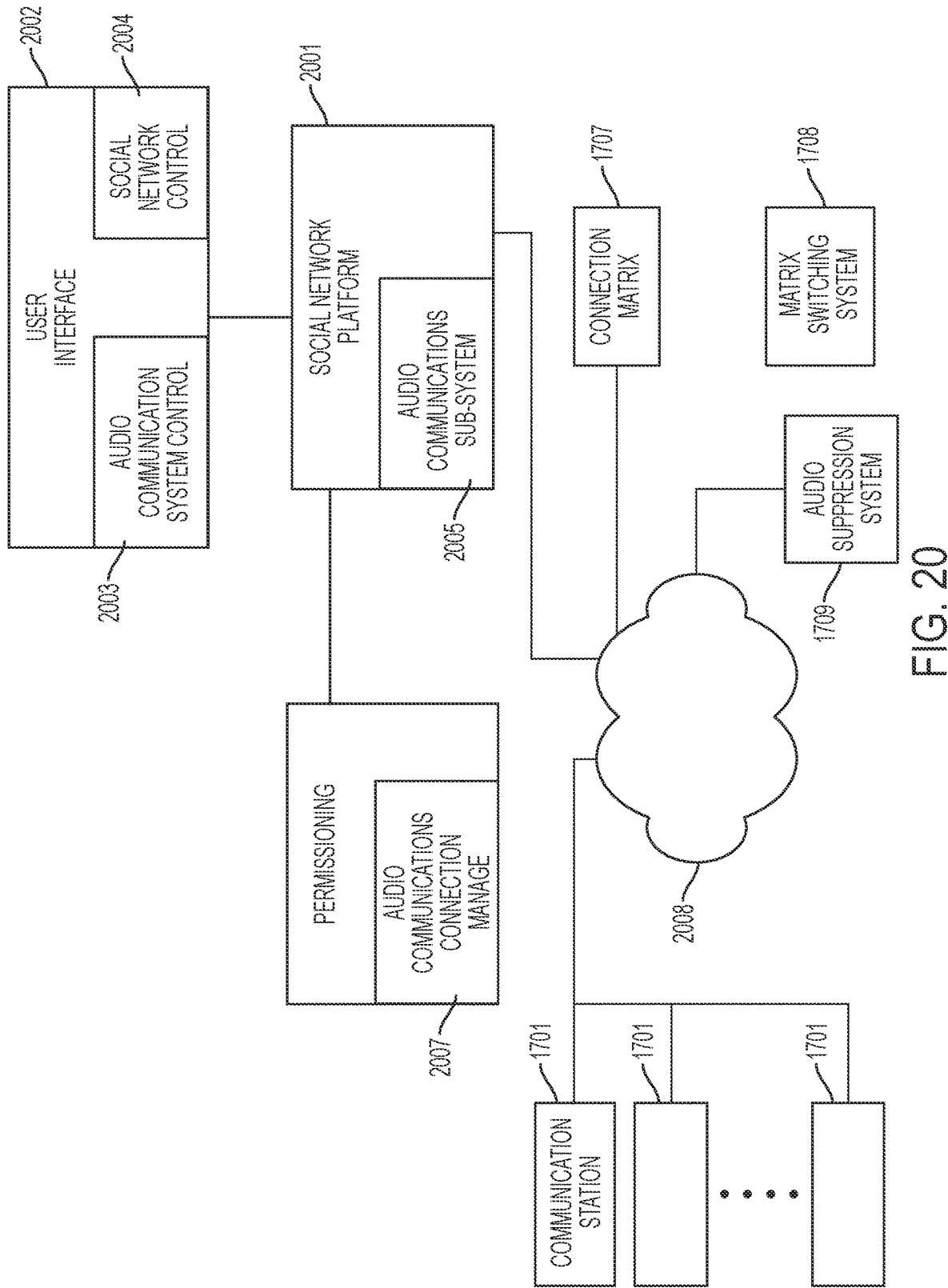
FIG. 20 shows an embodiment of a mutual permission audio connection system acting in cooperation with a social networking system.

FIG. 20 shows an embodiment of a mutual permission audio connection system acting in cooperation with a social networking system. In the embodiment of FIG. 20 a mutual permission audio communication system is shown working in connection with a social network platform. An example of an established social network platform is the Facebook platform. The Facebook platform facilitates add-on systems which may take advantage of the Facebook functionality for certain operations such as registration and log-on. In the embodiment illustrated in FIG. 20 an established social network platform 2001 may be controlled or operated through a user interface 2002. The user interface may include an audio communication control station user interface 2003, along with the intrinsic social network user interface 2004.

The operation of the communication system may be controlled through an audio communication subsystem 2005 which may be associated with the established social network platform 2001 or may be independent, connected through a communications network 2008. In either case the audio communication control station user interface 2003 may be separate from the social network user interface 2004, freestanding and connected through communications network 2008. Communication stations 1701, previously described, may be connected through communications network 2008. A connection matrix 1707 and matrix switching system 1708 along with audio suppression system 1709, all previously described, may also be connected to the communications stations and audio communication subsystem through a communications network 2008. The established social network platform 2001 may be connected to an intrinsic permissioning system 2006. The connection manager 2007, having the functionality previously described for connection manager 1706, may be incorporated in the permissioning system 2006 of the established social network platform 2001, or connected to connection matrix 1707.

Figure 21:
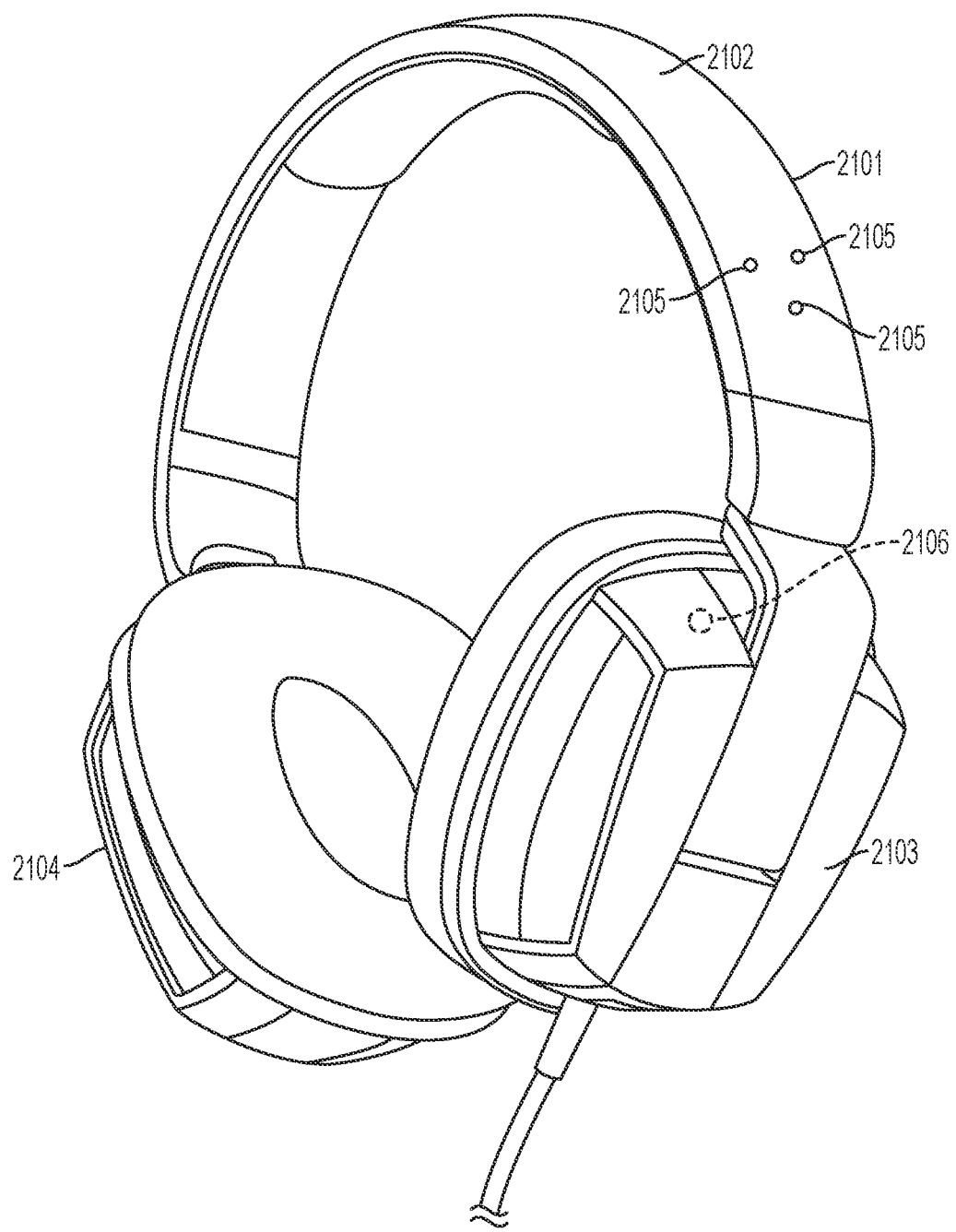
FIG. 21 shows a pair of headphones with an embodiment of a microphone array.
Figure 22:
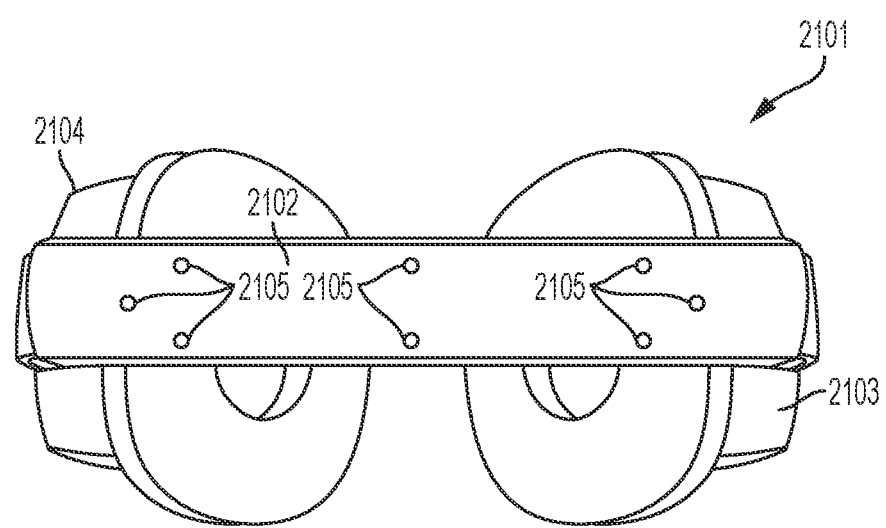
FIG. 22 shows a top view of a pair of headphones with a microphone array.

FIG. 21 and FIG. 22 show a pair of headphones with an embodiment of a microphone array. FIG. 22 shows a top view of a pair of headphones with a microphone array.

The headphones 2101 may include a headband 2102. The headband 2102 may form an arc which, when in use, sits over the user's head. The headphones 2101 may also include ear speakers 2103 and 2104 connected to the headband 2102. The ear speakers 2103 and 2104 are colloquially referred to as "cans." A plurality of microphones 2105 may be mounted on the headband 2102. There may be three or more microphones where at least one of the microphones is not positioned co-linearly with the other two microphones in order to identify azimuth.

The microphones in the microphone array may be mounted such that they are not obstructed by the structure of the headphones or the user's body. Advantageously the microphone array is configured to have a 360-degree field. An obstruction exists when a point in the space around the array is not within the field of sensitivity of at least two microphones in the array. An accelerometer 2106 may be mounted in an ear speaker housing 2103.

Figure 23:
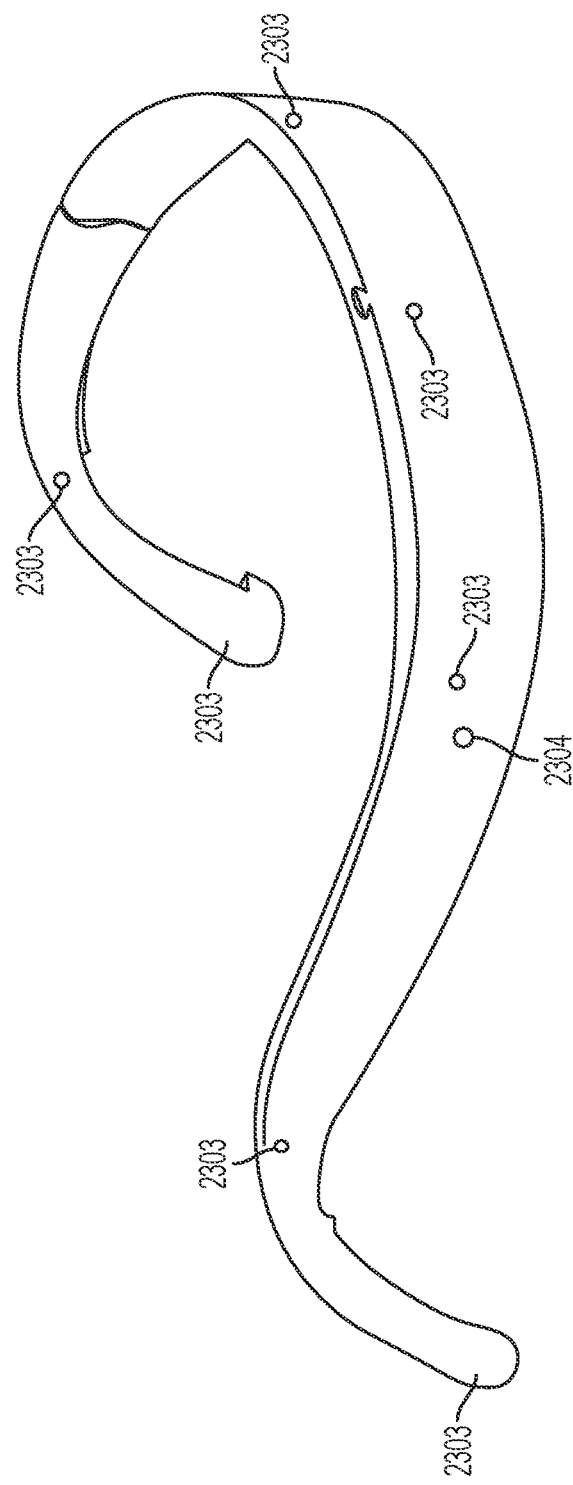
FIG. 23 shows a collar-mounted microphone array.
Figure 24:
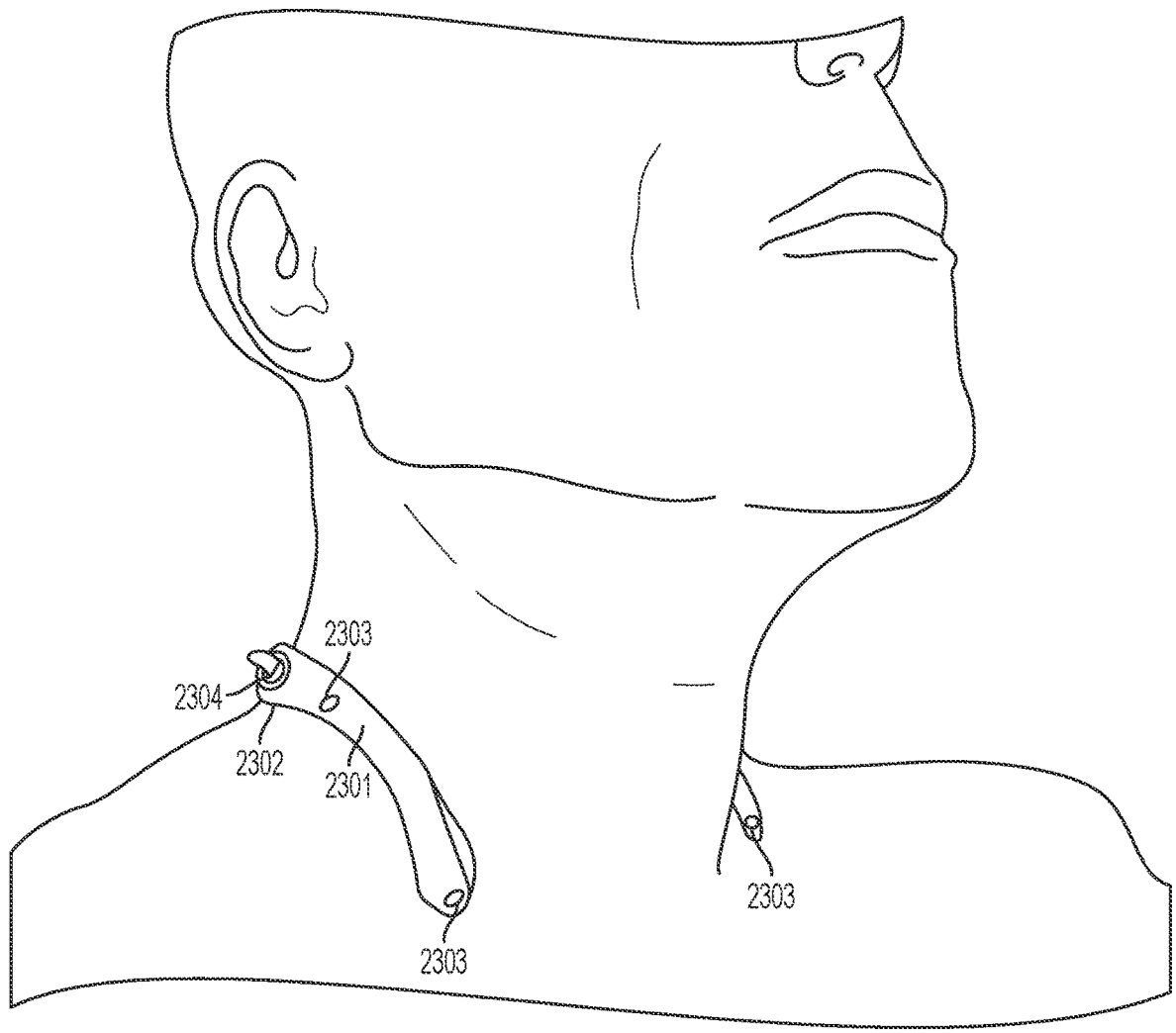
FIG. 24 illustrates a collar-mounted microphone array positioned on a user.

FIG. 23 and FIG. 24 show a collar-mounted microphone array 2301.

FIG. 24 illustrates the collar-mounted microphone array 2301 positioned on a user. A collar-band 2302 adapted to be worn by a user is shown. The collar-band 2302 is a mounting substrate for a plurality of microphones 2303. The microphones 2303 may be circumferentially-distributed on the collar-band 2302, and may have a geometric configuration which may permit the array to have a 360-degree range with no obstructions caused by the collar-band 2302 or the user. The collar-band 2302 may also include an accelerometer 2304 rigidly-mounted on or in the collar band 2302.

Figure 25:
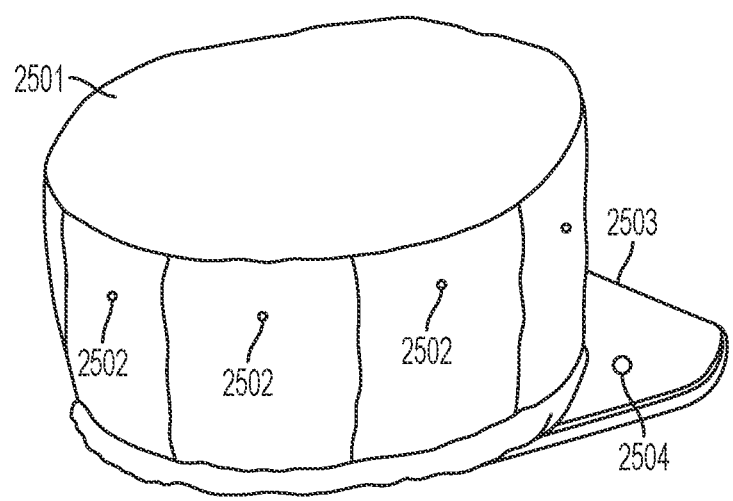
FIG. 25 illustrates a hat-mounted microphone array.

FIG. 25 illustrates a hat-mounted microphone array. FIG. 25 illustrates a hat 2501. The hat 2501 serves as the mounting substrate for a plurality of microphones 2502. The microphones 2502 may be circumferentially-distributed around the hat or on the top of the hat in a fashion that avoids the hat or any body parts from being a significant obstruction to the view of the array. The hat 2501 may also carry on accelerometer 2504. The accelerometer 2504 may be mounted on a visor 2503 of the hat 2501. The hat mounted array in FIG. 25 is suitable for a 360-degree view (azimuth), but not necessarily elevation.

Figure 26:
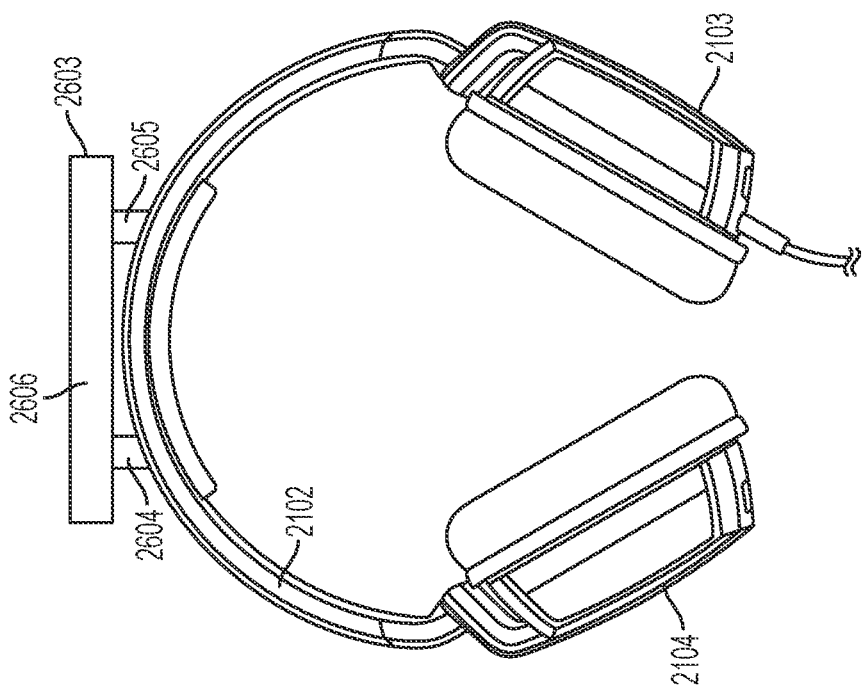
FIG. 26 shows a further embodiment of a microphone array.

FIG. 26 shows a further embodiment of a microphone array. A substrate is adapted to be mounted on a headband of a set of headphones. The substrate may include three or more microphones 2702. A substrate 2603 may be adapted to be mounted on headphone headband 2102. The substrate 2603 may be connected to the headband 2102 by mounting legs 2604 and 2605. The mounting legs 2604 and 2605 may be resilient in order to absorb vibration induced by the ear speakers and isolate microphones and an accelerometer in the array.

Figure 27:
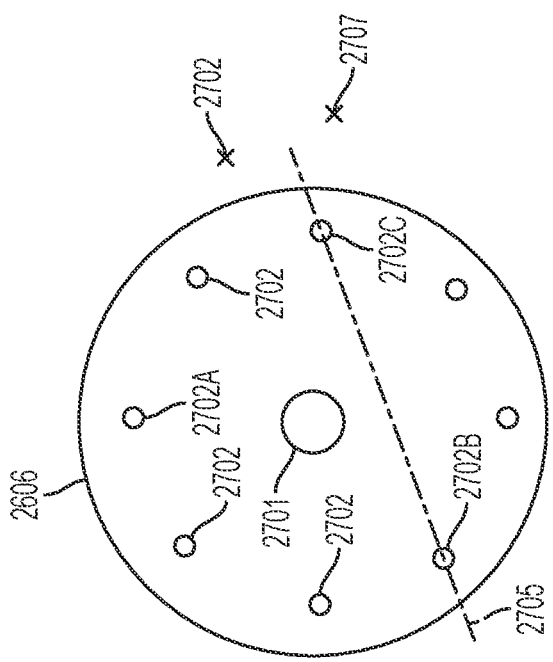
FIG. 27 shows a top view of a mounting substrate.

FIG. 27 shows a top view of a mounting substrate 2603. Microphones 2702 are mounted on the substrate 2603. Advantageously an accelerometer 2701 is also mounted on the substrate 2603. The microphones alternatively may be mounted around the rim 2604 of the substrate 2603. According to an embodiment, there may be three microphones 2702 mounted on the substrate 2603 where a first microphones is not co-linear with a second and third microphone. Line 2705 runs through microphone 2702B and 2702C. As illustrated in FIG. 27, the location of microphone 2702A is not co-linear with the locations of microphones 2702B and 2702C as it does not fall on the line defined by the location of microphones 2702B and 2702C. Microphones 2702A, 2702B and 2702C define a plane. A microphone array of two omni-directional microphones 2702B and 2702C cannot distinguish between locations 2706 and 2707. The addition of a third microphone 2702A may be utilized to differentiate between points equidistant from line 2705 that fall on a line perpendicular to line 2705.

According an advantageous feature, a motion detector such as Gyroscope, and/or a compass may be provided in connection with a microphone array. Because the microphone array is configured to be carried by a person, and because people move, a motion detector may be used to ascertain change in position and/or orientation of the microphone array. It is advantageous that the motion sensor, for example accelerometer, be in a fixed position relative to the microphones 502 in the array, but need not be directly mounted on a microphone array substrate. An accelerometer 304 may be mounted on the collar-band 2302 as illustrated in FIG. 24. An accelerometer may be mounted in a fixed position on the hat 2501 illustrated in FIG. 25, for example, on a visor 2503. The accelerometer may be mounted in any position. The position 2504 of the accelerometer is not critical.

Figure 28:
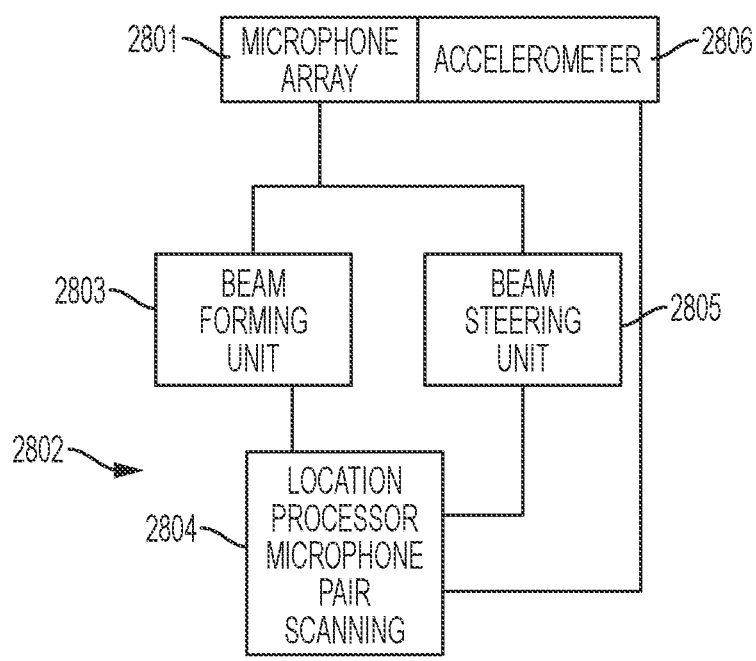
FIG. 28 shows a microphone array in an audio source location and isolation system.

FIG. 28 shows a microphone array 2801 in an audio source location and isolation system. A beam-forming unit 2803 is responsive to a microphone array 2801. The beam-forming unit 2803 may process the signals from two or more microphones in the microphone array 2801 to determine the location of an audio source, preferably the location of the audio source relative to the microphone array. A location processor 2804 may receive location information from the beam-forming system 2803. The location information may be provided to a beam-steering unit 2805 to process the signals obtained from two or more microphones in the microphone array 2801 to isolate audio emanating from the identified location. A two-dimensional array is generally suitable for identifying an azimuth direction of the source. An accelerometer 2806 may be mechanically coupled to the microphone array 2801. The accelerometer 2806 may provide information indicative of a change in location or orientation of the microphone array. This information may be provided to the location processor 2804 and utilized to narrow a location search by eliminating change in the array position and orientation from any adjustment of beam-forming and beam-scanning direction due to change in location of the audio source. The use of an accelerometer to ascertain change in position and/or change in orientation of the microphone array 2801 may reduce the computational resources required for beam forming and beam scanning.

Figure 29:
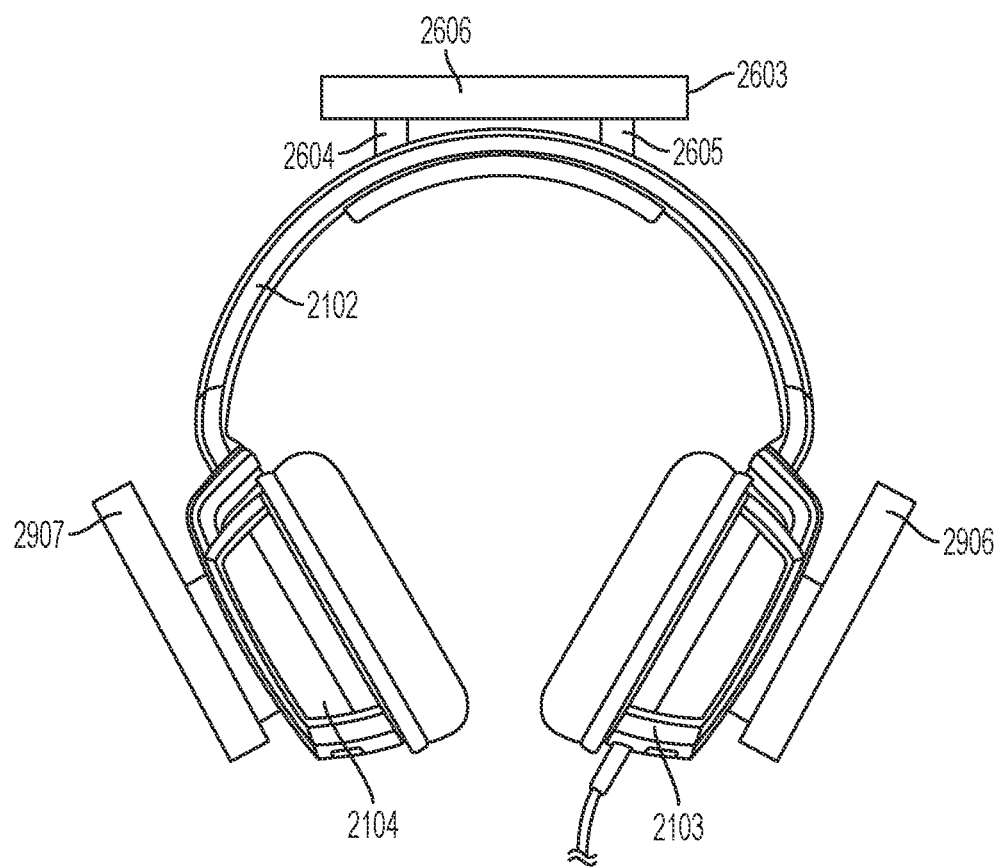
FIG. 29 shows a front view of headphones with a multi-planar microphone array.

FIG. 29 shows a front view of a headphone fitted with a microphone array suitable for sensing audio information to locate an audio object in three-dimensional space.

An azimuthal microphone array 2603 may be mounted on headphones. An additional microphone array 2906 may be mounted on ear speaker 2103. Microphone array 2906 may include one or more microphones 2702 and may be acoustically and/or vibrationally isolated by a damping mount from the earphone housing. According to an embodiment, there may be more than one microphone 2702. The microphones may be dispersed in the same configuration illustrated in FIG. 27.

A microphone array 2907 may be mounted on ear speaker 2104. Microphone array 2907 may have the same configuration as microphone array 2906.

Microphones may be embedded in the ear speaker housing and the ear speaker housing may also include noise and vibration damping insulation to isolate or insulate the microphone arrays 2906 and 2907 from the acoustic transducer in the ear speakers 2103 and 2104.

Three non-co-linear microphones in an array may define a plane. A microphone array that defines a plane may be utilized for source detection according to azimuth, but not according to elevation. At least one additional microphone 108 may be provided in order to permit source location in three-dimensional space. The microphone 108 and two other microphones define a second plane that intersects the first plane. The spatial relationship between the microphones defining the two planes is a factor, along with sensitivity, processing accuracy, and distance between the microphones that contributes to the ability to identify an audio source in a three-dimensional space.

In a physical embodiment mounted on headphones, a configuration with microphones on both ear speaker housings reduces interference with location finding caused by the structure of the headphones and the user. Accuracy may be enhanced by providing a plurality of microphones on or in connection with each ear speaker.

Figure 30:
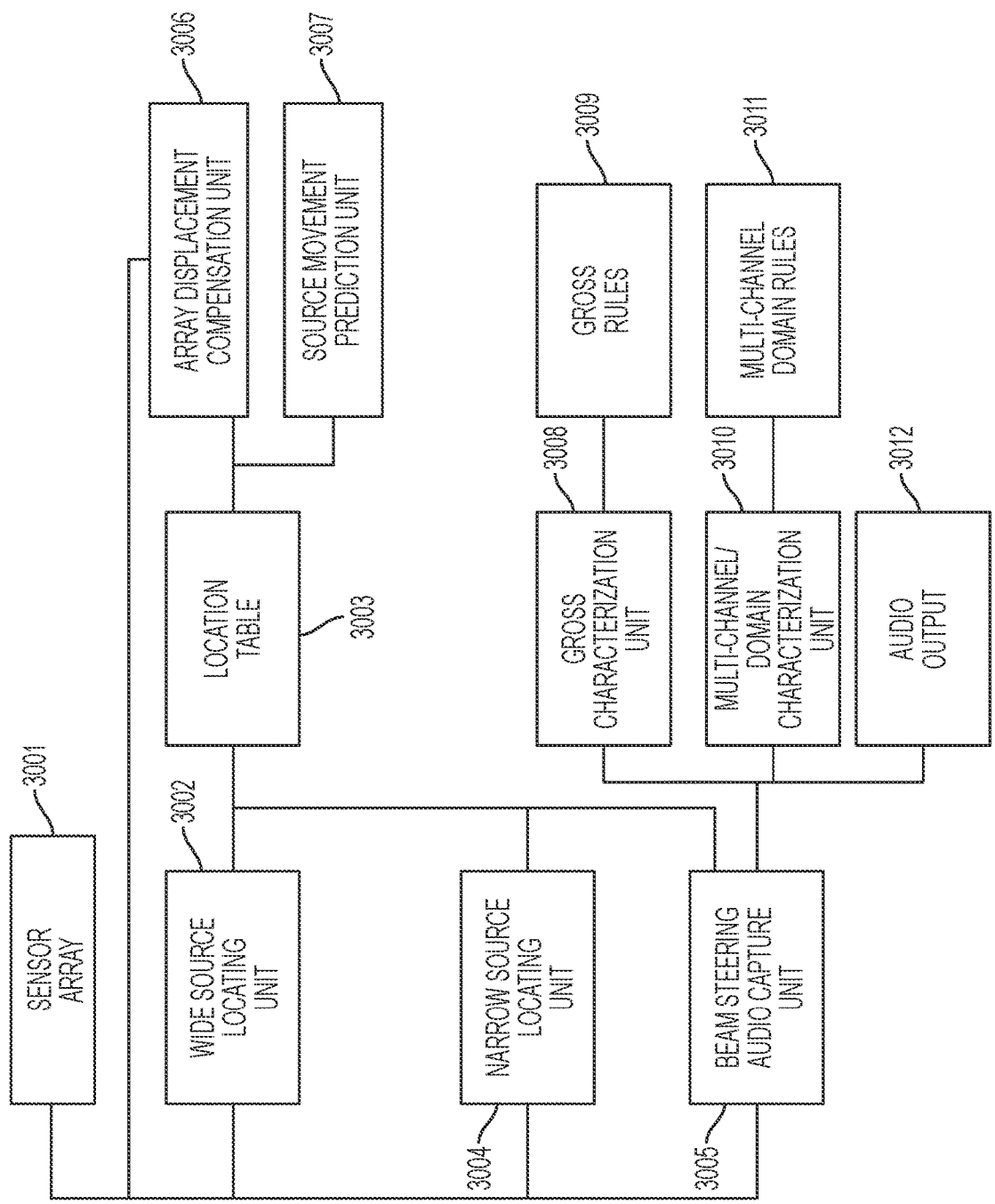
FIG. 30 shows an embodiment of the audio source location, tracking, and isolation system.

FIG. 30 shows an audio source location tracking and isolation system. The system includes a sensor array 3001. Sensor array 3001 may be stationary. According to a particularly useful embodiment the sensor array 3001 may be body-mounted or adapted for mobility. The sensor array 3001 may include a microphone array. The microphone array may have two or more microphones. The sensor array may have three microphones in order to be capable of a 360-degree azimuth range. The sensor array may have four or more microphones in order to have a 360-degree azimuth and an elevation range. The 360-degree azimuth requires that the three microphones be non-co-linear and the elevation-capable array must have at least three non-co-linear microphones defining a first plane and at least three non-co-linear microphones defining a second plane intersecting the first plane provided that two of the three microphones defining the second plane may be two of the three microphones also defining the first plane.

In the event that the sensor array 3001 is adapted to be portable or mobile, it is advantageous to also include a motion sensor rigidly-linked to the sensor array.

A wide source locating unit 3002 may be responsive to the sensor array. The wide source locating unit 3002 is able to detect audio sources and their general vicinities. Advantageously the wide source locating unit 3002 has a full range of search. The wide source locating unit may be configured to generally identify the direction and/or location of an audio source and record the general location in a location table 3003. The system is also provided with a narrow source locating unit 3004 also connected to sensor array 3001. The narrow source locating unit 3004 operates on the basis of locations previously stored in the location table 3003. The narrow source locating unit 3004 will ascertain a pinpoint location of an audio source in the general vicinity identified by the entries in a location table 3003. The pinpoint location may be based on narrow source locations previously stored in the location table or wide source locations previously stored in the location table. The narrow source location identified by the narrow source locating unit 3004 may be stored in the location table 3003 and replaced the prior entry that formed a basis for the narrow source locating unit scan.

The system may also be provided with a beam steering audio capture unit 3005. The beam steering audio capture unit 3005 responds to the pinpoint location stored in the location table 3003. The beam steering audio capture unit 3005 may be connected to the sensor array 3001 and captures audio from the pinpoint locations set forth in the location table 3003.

The location table may be updated on the basis of new pinpoint locations identified by the narrow source locating unit 3004 and on the basis of an array displacement compensation unit 3006 and/or a source movement prediction unit 3007. The array displacement compensation unit 3006 may be responsive to the accelerometer rigidly attached to the sensor array 3001. The array displacement compensation unit 3006 ascertains the change in position and orientation of the sensor array to identify a location compensation parameter. The location compensation parameter may be provided to the location table 3003 to update the pinpoint location of the audio sources relative to the new position of the sensor array.

Source movement prediction unit 3007 may also be provided to calculate a location compensation for pinpoint locations stored in the location table. The source movement prediction unit 3007 can track the interval changes in the pinpoint location of the audio sources identified and tracked by the narrow source locating unit 3004 as stored in the location table 3003. The source movement prediction unit 3007 may identify a trajectory over time and predict the source location at any given time. The source movement prediction unit 3007 may operate to update the pinpoint locations in the location table 3003.

The audio information captured from the pinpoint location by the beam steering audio capture unit 3005 may be analyzed in accordance with an instruction stored in the location table 3003. Upon establishment of a pinpoint location stored in the location table 3003, it may be advantageous to identify the analysis level as gross characterization. The gross characterization unit 3008 operates to assess the audio sample captured from the pinpoint location using a first set of analysis routines. The first set of analysis routines may be computationally non-intensive routines such as analysis for repetition and frequency band. The analysis may be voice detection, cadence, frequencies, or a beacon. The audio analysis routines will query the gross rules 3009. The gross rules may indicate that the audio satisfying the rules is known and should be included in an audio output, known and should be excluded from an audio output or unknown. If the gross rules indicate that the audio is of a known type that should be included in an audio output, the location table is updated and the instruction set to output audio coming from that pinpoint location. If the gross rules indicate that the audio is known and should not be included, the location table may be updated either by deleting the location so as to avoid further pinpoint scans or simply marking the location entry to be ignored for further pinpoint scans.

If the result of the analysis by the gross characterization unit 3008 and the application of rules 3009 is of unknown audio type, then the location table 3003 may be updated with an instruction for multi-channel characterization. Audio captured from a location where the location table 3003 instruction is for multi-channel analysis, audio may be passed to the multi-channel/multi-domain characterization unit 3010. The multi-channel/multi-domain characterization unit 3010 carries out a second set of audio analysis routines. It is contemplated that the second set of audio analysis routines is more computationally intensive than the first set of audio analysis routines. For this reason, the second set of analysis routines is only performed for locations which the audio has not been successfully identified by the first set of audio analysis routines. The result of the second set of audio analysis routines is applied to the multi-channel/multi-domain rules 3011. The rules may indicate that the audio from that source is known and suitable for output, known and unsuitable for output or unknown. If the multi-channel/multi-domain rules indicate that the audio is known and suitable for output, the location table may be updated with an output instruction. If the multi-channel/multi-domain rules indicate that the audio is unknown or known and not suitable for output, then the corresponding entry in the location table is updated to either indicate that the pinpoint location is to be ignored in future scans and captures, or by deletion of the pinpoint location entry.

When the beam steering audio capture unit 3005 captures audio from a location stored in location table 3003 and is with an instruction as suitable for output, the captured audio from the beam steering audio capture unit 3005 is connected to an audio output 3012.

Figure 31:
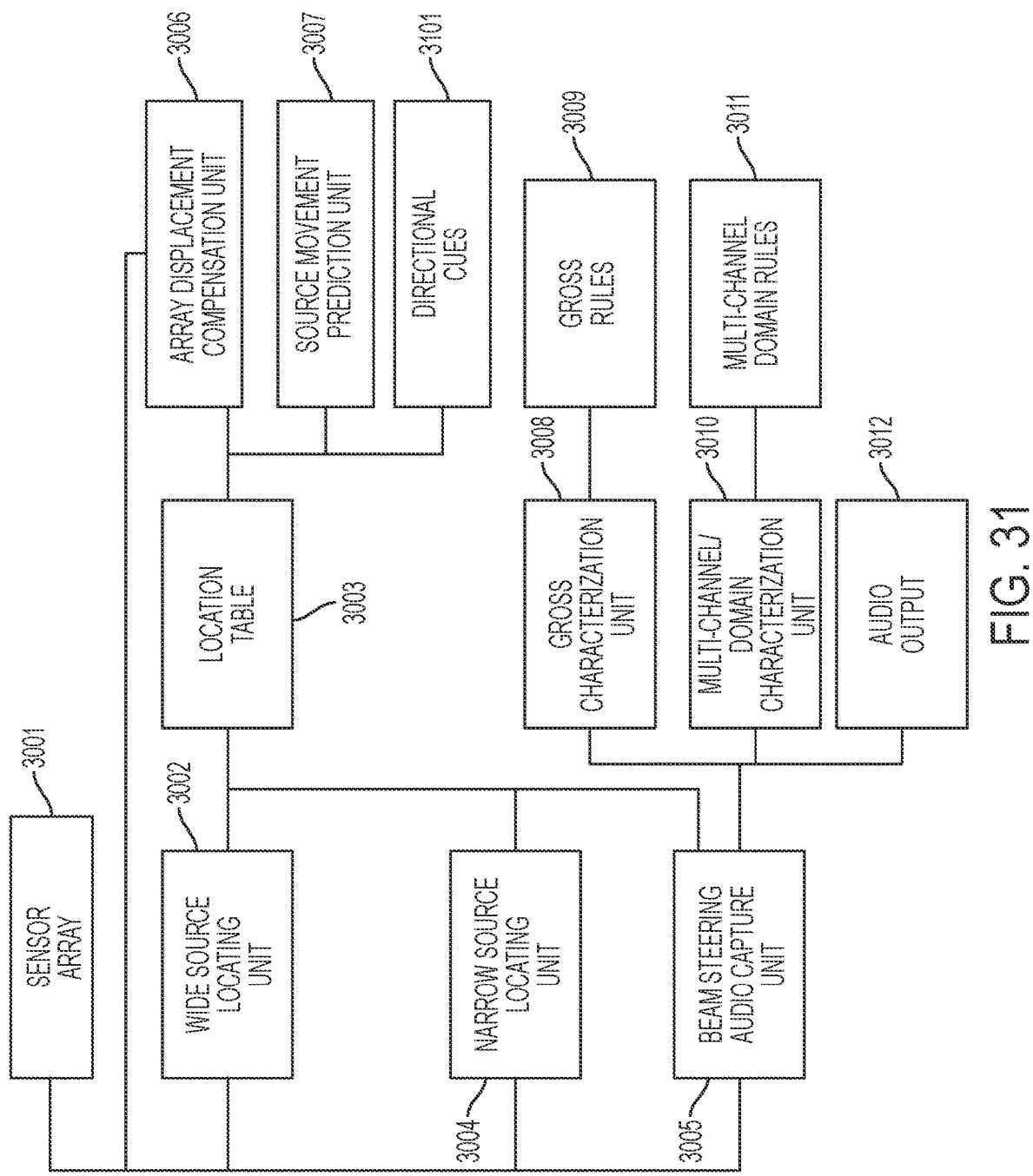
FIG. 31 shows an embodiment of the audio source location, tracking, and isolation system and particularly sensors and a location processor.

As illustrated in FIG. 31, the location of microphone 2702A is not co-linear with the locations of microphones 2702B and 2702C as it does not fall on the line defined by the location of microphones 2702B and 2702C. Microphones 2702A, 2702B and 2702C define a plane. A microphone array of two omni-directional microphones 2702B and 2702C cannot distinguish between locations 2706 and 2707. The addition of a third microphone 2702A may be utilized to differentiate between points equidistant from line 2705 that fall on a line perpendicular to line 2705.

A motion sensor may be provided in connection with a microphone array. The motion sensor may be an accelerometer 2701. The motion sensor may include an accelerometer, a gyroscope and/or a magnetometer/compass. A 9-axis motion sensor may be used. Because the microphone array is configured to be carried by a person, and because people move, a motion sensor may be used to ascertain change in position and/or orientation of the microphone array. It is advantageous that the motion sensor be in a fixed position relative to the microphones 2702 in the array, but need not be directly mounted on a microphone array substrate. A microphone array is useful as an audio sensor capable of multi-directional sensing. Other multi-directional sensors may be used.

FIG. 31 shows an audio source location tracking and isolation system. The system includes a sensor array 3001. Sensor array 3001 may be stationary. The sensor array 3001 may also be body-mounted or adapted for mobility. The sensor array 3001 may include a microphone array or other multi-directional acoustic sensor. The multi-directional acoustic sensor may be two or three dimension capable.

In the event that the sensor array 3001 is adapted to be portable or mobile, it is advantageous to also include a motion sensor rigidly-linked to the sensor array.

A wide source locating unit 3002 may be responsive to the sensor array. The wide source locating unit 3002 is able to detect audio sources and their general vicinities. Advantageously the wide source locating unit 3002 has a full range of search. The wide source locating unit may be configured to generally identify the direction and/or location of an audio source and record the general location in a location table 3003. The system is also provided with a narrow source locating unit 3004 also connected to sensor array 3001. The narrow source locating unit 3004 operates on the basis of locations previously stored in the location table 3003. The narrow source locating unit 3004 will ascertain a pinpoint location of an audio source in the general vicinity identified by the entries in a location table 3003. The pinpoint location may be based on narrow source locations previously stored in the location table or wide source locations previously stored in the location table. The narrow source location identified by the narrow source locating unit 3004 may be stored in the location table 3003 and replace the prior entry that formed a basis for the narrow source locating unit scan. The system may also be provided with a beam steering audio capture unit 3005. The beam steering audio capture unit 3005 responds to the pinpoint location stored in the location table 3003. The beam steering audio capture unit 3005 may be connected to the sensor array 3001 and captures audio from the pinpoint locations set forth in the location table 3003.

The location table may be updated on the basis of new pinpoint locations identified by the narrow source locating unit 3004 and on the basis of an array displacement compensation unit 3006 and/or a source movement prediction unit 3007. The array displacement compensation unit 3006 may be responsive to the accelerometer rigidly attached to the sensor array 3001. The array displacement compensation unit 3006 ascertains the change in position and orientation of the sensor array to identify a location compensation parameter. The location compensation parameter may be provided to the location table 3003 to update the pinpoint location of the audio sources relative to the new position of the sensor array. The location table 3003 output may be used for the directional cues 3101 stored in the digital audio storage unit 3307.

Source movement prediction unit 3007 may also be provided to calculate a location compensation for pinpoint locations stored in the location table. The source movement prediction unit 3007 can track the interval changes in the pinpoint location of the audio sources identified and tracked by the narrow source locating unit 3004 as stored in the location table 3003. The source movement prediction unit 3007 may identify a trajectory over time and predict the source location at any given time. The source movement prediction unit 3007 may operate to update the pinpoint locations in the location table 3003.

The audio information captured from the pinpoint location by the beam steering audio capture unit 3005 may be analyzed in accordance with an instruction stored in the location table 3003. Upon establishment of a pinpoint location stored in the location table 3003, it may be advantageous to identify the analysis level as gross characterization. The gross characterization unit 3008 operates to assess the audio sample captured from the pinpoint location using a first set of analysis routines. The first set of analysis routines may be computationally non-intensive routines such as analysis for repetition and frequency band. The analysis may be voice detection, cadence, frequencies, or a beacon. The audio analysis routines will query the gross rules 3009. The gross rules may indicate that the audio satisfying the rules is known and should be included in an audio output, known and should be excluded from an audio output or unknown. If the gross rules indicate that the audio is of a known type that should be included in an audio output, the location table is updated and the instruction set to output audio coming from that pinpoint location. If the gross rules indicate that the audio is known and should not be included, the location table may be updated either by deleting the location so as to avoid further pinpoint scans or simply marking the location entry to be ignored for further pinpoint scans.

If the result of the analysis by the gross characterization unit 3008 and the application of rules 3009 is of unknown audio type, then the location table 3003 may be updated with an instruction for multi-channel characterization. Audio captured from a location where the location table 3003 instruction is for multi-channel analysis, audio may be passed to the multi-channel/multi-domain characterization unit 3010. The multi-channel/multi-domain characterization unit 3010 carries out a second set of audio analysis routines. It is contemplated that the second set of audio analysis routines is more computationally intensive than the first set of audio analysis routines. For this reason, the second set of analysis routines is only performed for locations which the audio has not been successfully identified by the first set of audio analysis routines. The result of the second set of audio analysis routines is applied to the multi-channel/multi-domain rules 3011. The rules may indicate that the audio from that source is known and suitable for output, known and unsuitable for output or unknown. If the multi-channel/multi-domain rules indicate that the audio is known and suitable for output, the location table may be updated with an output instruction. If the multi-channel/multi-domain rules indicate that the audio is unknown or known and not suitable for output, then the corresponding entry in the location table is updated to either indicate that the pinpoint location is to be ignored in future scans and captures, or by deletion of the pinpoint location entry.

When the beam steering audio capture unit 3005 captures audio from a location stored in location table 3003 and is with an instruction as suitable for output, the captured audio from the beam steering audio capture unit 3005 is connected to an audio output 3012.

Figure 32:
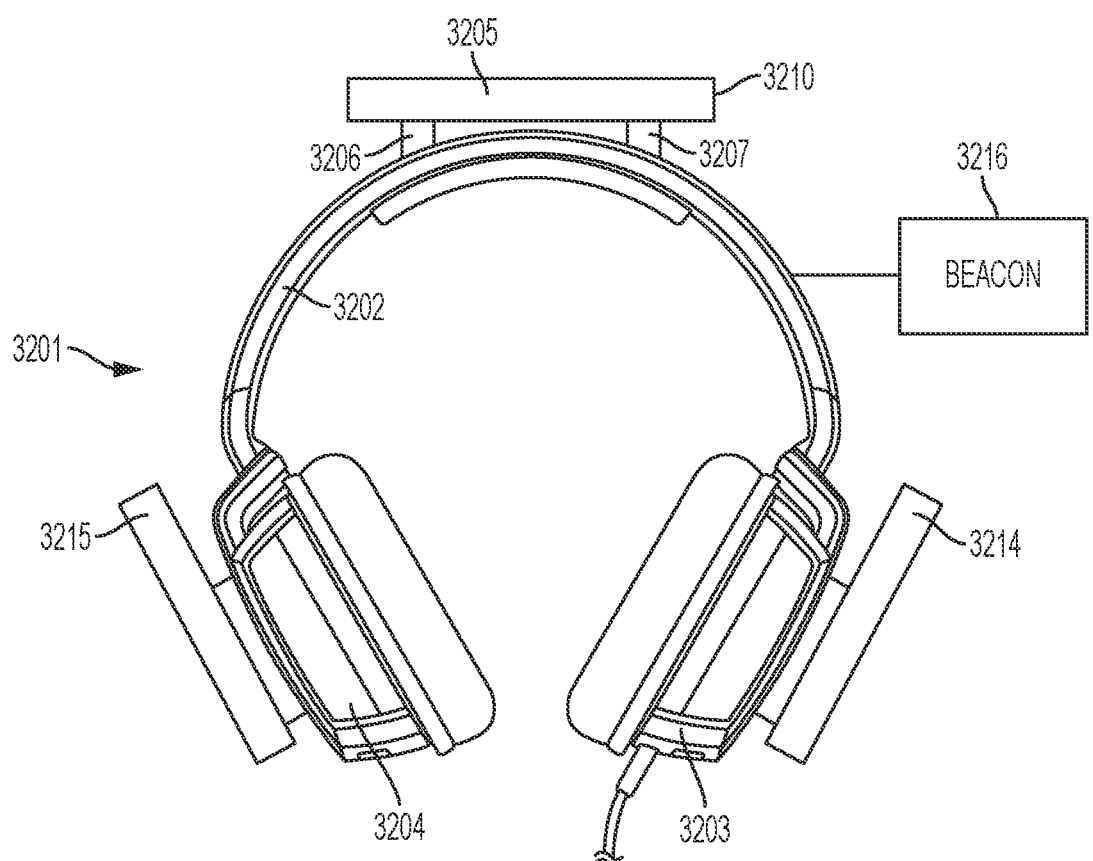
FIG. 32 shows a pair of headphones with microphone arrays.
Figure 33:
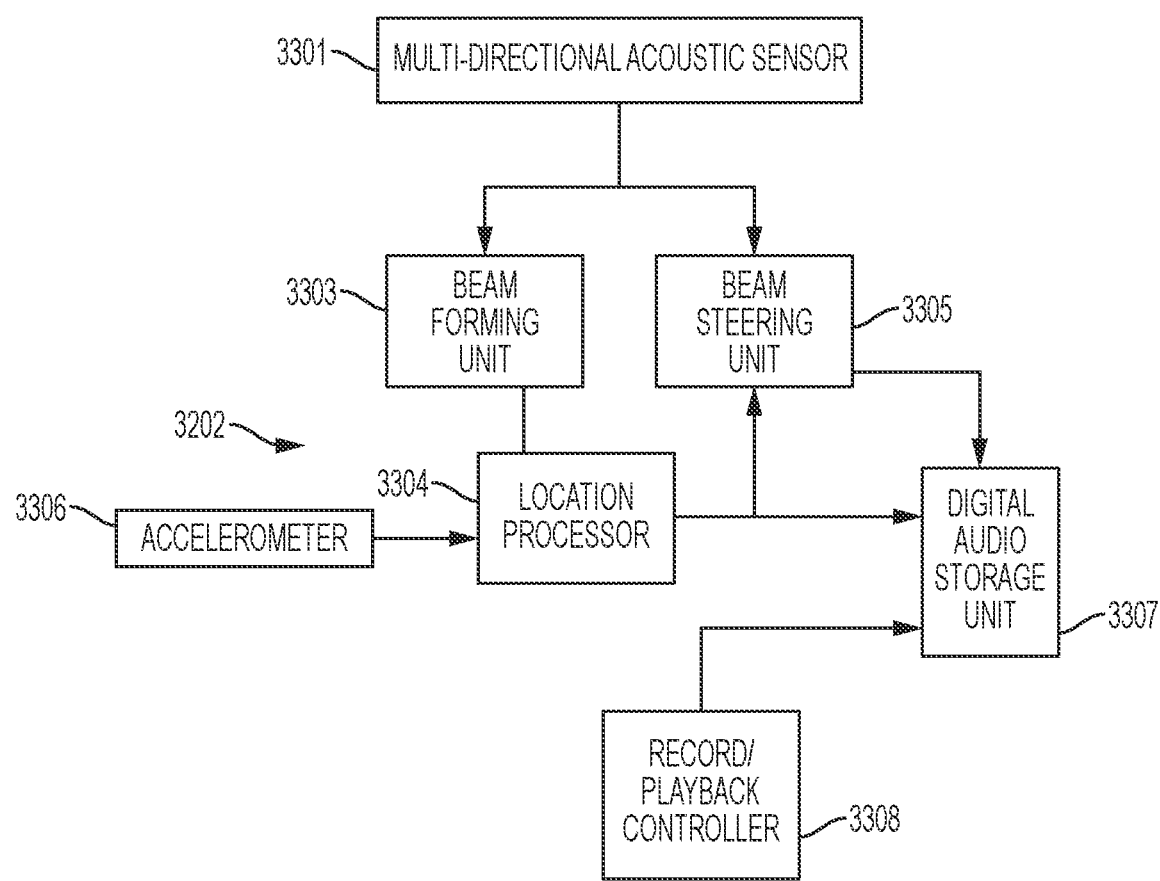
FIG. 33 shows an audio source location and isolation system.

FIG. 32 shows a pair of headphones with multi-planar multi-directional acoustic sensors such as microphone arrays. FIG. 33 shows a top view of a substrate with a microphone array which may be part of the headphones of FIG. 32.

The headphones 3201 may include a headband 3202. The headband 3202 may form an arc which, when in use, sits over the user's head. The headphones 3201 may also include ear speakers 3203 and 3204 connected to the headband 3202. The ear speakers 3203 and 3204 are colloquially referred to as "cans."

A substrate is adapted to be mounted on a headband of a set of headphones. The substrate may include three or more microphones 3208.

A substrate 3205 may be adapted to be mounted on headphone headband 3202. The substrate 3205 may be connected to the headband 3202 by mounting legs 3206 and 3207. The mounting legs 3206 and 3207 may be resilient in order to absorb vibration induced by the ear speakers or otherwise and isolate acoustic transducers and an accelerometer. A beacon 3216 may be mounted on the headphones 3201. The beacon may be an acoustic or radio beacon. Acoustic beacons may be audible or inaudible. An inaudible beacon may emit ultrasound. A radio beacon may be a Bluetooth Low Energy (BLE) beacon, for example, according to the iBeacon standard.

FIG. 33 shows a microphone array 3301 in an audio source location and isolation system. A beam-forming unit 3303 is responsive to a microphone array 3301. The beam-forming unit 3303 may process the signals from two or more microphones in the microphone array 3301 to determine the location of an audio source, preferably the location of the audio source relative to the microphone array. A location processor 3304 may receive location information from the beam-forming system 3303. The location information may be provided to a beam-steering unit 3305 to process the signals obtained from two or more microphones in the microphone array 3301 to isolate audio emanating from the identified location. A two-dimensional array is generally suitable for identifying an azimuth direction of the source. An accelerometer 3306 may be mechanically coupled to the microphone array 3301. The accelerometer 3306 may provide information indicative of a change in location or orientation of the microphone array. This information may be provided to the location processor 3304 and utilized to narrow a location search by eliminating change in the array position and orientation from any adjustment of beam-forming and beam-scanning direction due to change in location of the audio source. The use of an accelerometer to ascertain change in position and/or change in orientation of the microphone array 3301 may reduce the computational resources required for beam forming and beam scanning.

Figure 34:
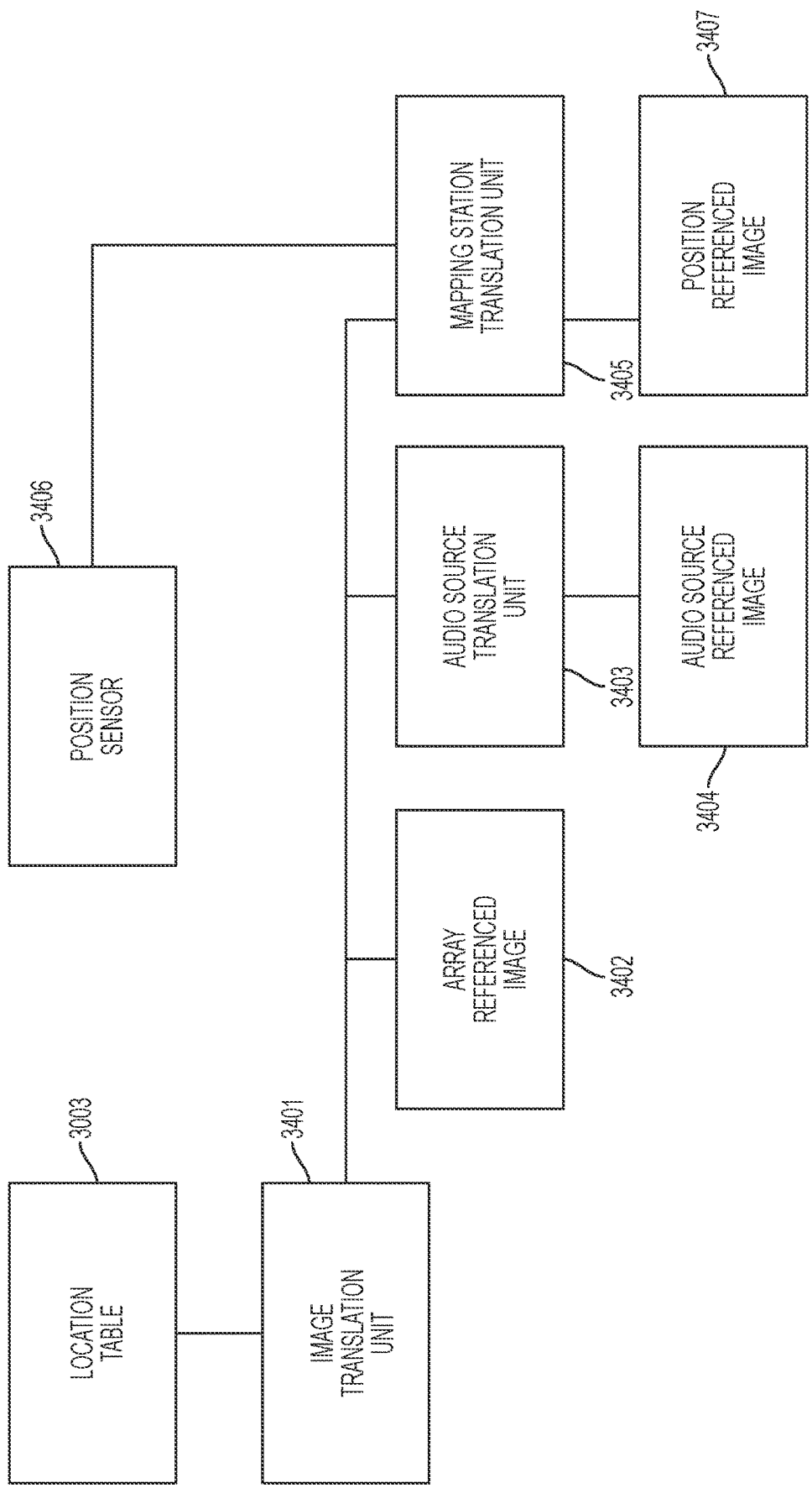
FIG. 34 shows an audio source imaging system.

FIG. 34 shows an audio source imaging system.

A location table 3003 as described in connection with FIG. 30 stores, inter alia, the location of audio sources being tracked by an audio source location system in a format suitable for the audio source location and isolation system. The format of the data indicating relative location stored in location table 3003 is not suitable for output directly to a display device. A display image translation unit 3401 is connected to the location table 3003. The display image translation unit 3401 transforms the data contained in location table 3003 to a format which is suitable for output directly or indirectly to an image display. The display image translation unit 3401 has an output suitable for use by an image display. The output of the display image translation unit 3401 is or may be converted in a conventional manner to an image 3402 referenced to sensor array position. Image 3402 is particularly suitable for displaying to a user the tracked audio sources from the point of view of the sensor array. The image may be a two-dimensional, a simulated three-dimensional image, or an actually three-dimensional image display. Such images may be suitable to display on a wearable display such as a wrist-mounted display, a Google Glass-style display or any heads-up display.

The images referenced to the sensor array position 3402 may also be provided to an audio source station translation unit 3403. The audio source station translation unit 3403 may translate the image 3402 referenced to the sensor array position to an image 3404 referenced to one of the audio sources tracked in location table 3003. The audio source translation station may use a vector inversion process to translate the sensor array referenced image 3402 to an audio source referenced image 3404. For example, the image 3402 referenced to sensor array position may express the location of each audio source contained in location table 3003 as a vector with its origin at the sensor array and each source being expressed in terms of a direction and distance. If, for example, the sensor array is located at Point A and the location of an audio source B is identified by direction and distance, for example, the image 3402 referenced to sensor array position may reflect that audio source B is in the northwest direction at a distance of 20 feet. Audio source translation unit 3403 may transform the origin of the vector to a location referenced to the location of audio source B. For example, the sensor array would therefore be located 20 feet from audio source B in the southeast direction. This type of translation may be accomplished to translate an image 3402 referenced to a sensor array position to an image 3404 referenced to any audio source location contained in location table 3003.

According to an alternative or additional feature, the image 3402 referenced to a sensor array position can be translated to a referenced image 3407 for any known position. A mapping station translation unit 3405 may utilize information obtained from an array position sensor 3406 and the image 3402 referenced to the sensor array in order to transform the image 3402 referenced to sensor array to a referenced image 3407 referenced to any position correlated to a location identified by an array position sensor 3406.

Array position sensor 3406 may utilize transducers in order to identify the position of the sensor array in relation to a known reference point. The position sensor 3406 may be co-located with the sensor array and may utilize location services or other position sensitive transducers in order to sense the position of the sensor array. The array position sensor may be responsive to a beacon located in a known position. An example of the transformation of an image 3402 referenced to an array to an image 3407 referenced to Point O is, the position sensor determines that the sensor array is 10 feet to the west of Point O and determines that the location of audio source B is 20 feet west of the sensor array, then the mapping station translation unit may select Point O as a reference point and determine that the location of audio source B is 30 feet west of Point O. In a similar fashion the mapping station translation unit 3405 may translate the image 3402 referenced to the sensor array position to an image 3407 referenced to any location in a known direction and distance from the origin, Point O.

The image generated by the audio source imaging system may be useful for any application where a particular reference position is desirable. For example, the image reference to the sensor array where the sensor array is mounted on the headband of headphones may be utilized for a heads-up image projection from a wearable display such as a Google Glass-type display unit or as an image for a wrist-mounted display unit. An image referenced to an audio source may be useful for any application where the audio source is the desired point of view. For example, an operative or team member may be outfitted to emit an audio signal as a beacon. The image referenced to the sensor array will include the position of the audio beacon and the audio source station translation unit 3403 may output the image reference to the audio source to a heads-up display worn or carried by the operative at Location B. In this manner, the operative receives a display of the audio sources being tracked by the location table 3003 but from its own point of view.

Using the sensor array and known distance between a first sensor location and a second sensor location, the distance to an audio source can be ascertained by one of ordinary skill knowing (i) the angles between a line extending from a first sensor location to a second sensor location (the "base line"), and a line extending from said second sensor location to an audio source, (ii) the angle between a line extending from said first sensor location to the audio source and the base line, and (iii) the distance between the first sensor location and the second sensor location. Because of the inherent nature of sensor elements, beamforming identifies a direction in terms of a range of directions the variations within the range affects accuracy of the determinations. The distance determinations may be enhanced by increasing the distance between the sensor locations. This is done using at least a known distance between sensor locations that is large enough to overcome uncertainty in the distance caused by uncertainty in the directions.

Figure 35:
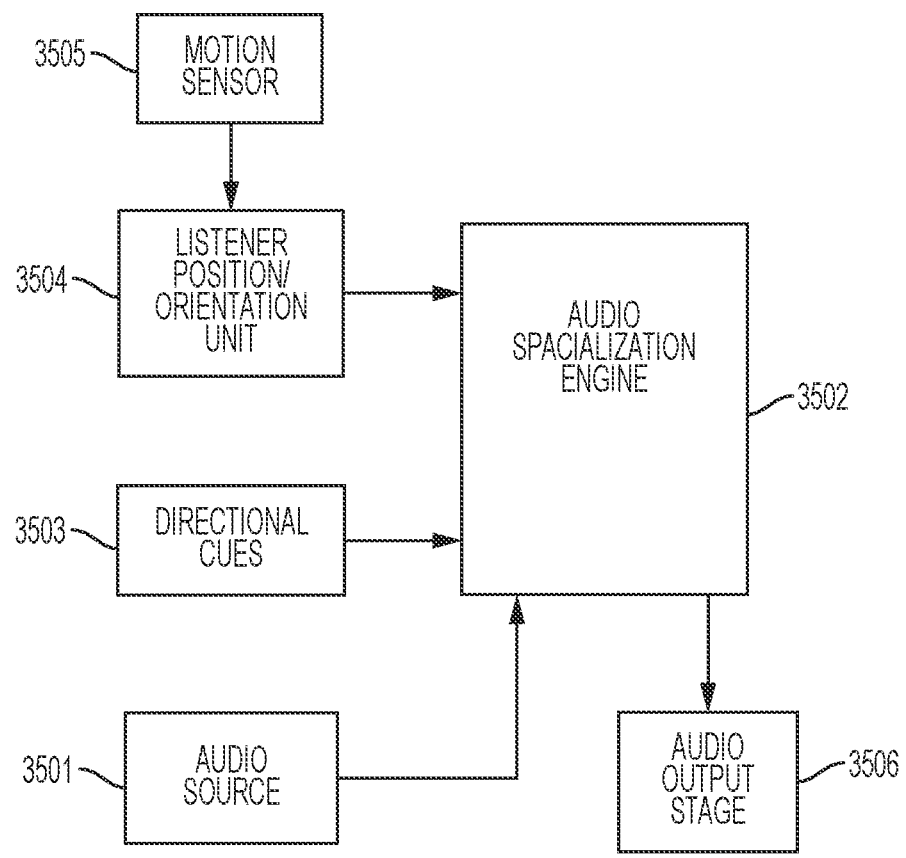
FIG. 35 shows an adaptive audio spatialization system.

FIG. 35 shows an adaptive audio spatialization system. The system may be responsive to an audio source 3501. The audio source may be live or pre-recorded. Audio from the source may be captured with a multi-directional acoustic sensor, also referred to as a directionally discriminated acoustic sensor. An example of a multi-directional audio sensor is a microphone array. Audio from the audio source 3501 is processed by the audio spatialization engine 3502. The audio spatialization engine may apply a perceived spatial component to the audio obtained from the direction of the source. The application of the perceived spatial component may use head-related transfer functions (HRTF) applied to the audio so that the user perceives the audio source as emanating from the applied direction. The audio spatialization engine 3502 may be responsive to audio source directional cues 3503. The audio source directional cues may be provided on the basis of the relative position of an audio source or on an artificial position or direction. The audio spatialization engine 3502 may also be responsive to a listener position/orientation unit 3503. The listener position/orientation unit 3503 generates a signal representative of the listener position/orientation and is responsive to a motion sensor 3505. The motion sensor 3505 may advantageously be rigidly linked to the personal audio output device and provides a signal indicative of the position or orientation of a user or changes in the position or orientation of the user. The motion sensor may be one or more of a compass, a gyroscope, and/or an accelerometer. According to one embodiment, a nine-access motion sensor may be utilized.

The audio spatialization engine 3502 has an output representing a spatialized audio signal. The output is connected to an audio output stage 3506. The audio output stage 3506 may operate as a pre-amplifier and/or amplifier for the audio signal. In addition, the audio output stage 3506 may mix other audio signals so that audio information from more than one audio source is provided to the personal speakers. The audio source directional cues 3503 may be a location table as shown in FIG. 30.

It is possible that the audio cues provided are not as specific as the location specified by the location table. The reason for this is that the beam steering functionality is optimized by having a very accurate location or direction to isolate. By contrast, in many applications, the precision of the spatialization is less important to a listener than the precision required for optimum beam steering functionality. The use of less precise directionality in the monitoring of user position and orientation and application of spatialization can conserve computational resources and may not be perceptually significant to a user.

The system may be used, for example, amongst a group of people each using a personal communication device linked to a customized audio delivery system in a multifaceted event. In an exemplary environment they may be participating in an event that may be spread across a large geographic area. In other cases participants may be densely assembled. Examples of multifaceted events include, but are not limited to arena venues, festival events, fairs, and conventions/exhibitions. Information may be passed between personal communication devices of the participants using point-to-point wireless communication, a distributed network of computers such as the Internet, a wireless communication network, small cell LTE, Wi-Fi, and so on. In any case, information received at the personal communications devices can include an identification of the event and an indication of available content or identification of one or more other participants possibly according to some specified criteria that can be passed to a participant's personal communication device. The system can be implemented as part of a communication system for establishing and providing preferred audio and/or a mutual permission customized audio source connection system In the described embodiments, the personal communication device can take the form of a portable media player, cellular phone, or as a handheld computing device such as a tablet computer. In any case, the personal communication device can be configured to wirelessly receive and in some cases may send a signal that can contain information that can include a menu of available content, requests for content and/or communication with or to facilitate communications with other participants and/or event updates or news flashes (announcements). The information can include a snippet or chunk of data that can be broadcasted by one or more devices to other devices that are within the transmission range of the broadcasting device(s). In one embodiment, the snippet or chunk of data can take the form of a token that can be used to seed a group of personal communication devices with the menu of available content. The token can be stored in a personal communication device and concurrently broadcasted to any other personal communication device using, for example, short message service (SMS) messaging or a Wi-Fi RF transmission. In this way, by broadcasting the information, each personal communication device can be made aware of the available content, event updates, and announcements at about the same time.

In the described embodiments, the signal received at the personal communication device can include information other than the available content, event updates, and announcements. Such information can include any personal communication device identifiers, or PCDIDs, indicating the identity of those personal communication devices that have already received the information. In this way, a personal communication device can retrieve not only information related to the available content, event updates, and announcements, but other information related to those personal communication devices participating in the multifaceted event. One of the features of the PCDID is the ability to facilitate social networking within the group. In any case, the unique identifier (including any personalized information associated therewith) can be associated with the PCDID of the personal communication device and be passed between various other personal communication devices. In this way, a dynamic social network can be formed independent of or in conjunction with the available content, event updates, and announcements.

In addition to available content, event updates, and announcements, and any PCDIDs used to identity personal communication devices, the information (or the token for that matter) can include other information such as a time counter used to specify a start time and a stop time for a particular music session.

The menu of available content can be used to select audio content, event updates, and announcements stored or cached on each of the personal communication devices. The selection of available content, event updates, and announcements can be carried out in any number of different ways. For example, one of the ancillary services provided by the communication application can include categorizing content and/or stored on the personal communication device based upon various values of a particular music characteristic or content previously cached or individual identifications of participants. The communication application can create an alert to the presence of other participants selected on the basis of a specified criteria to facilitate ad hoc social networking connection. The criteria may be "fiends" or "contacts" within a certain distance. The criteria may also be based on common interests or other factors or information accessible to the system. The selected information may be prepared for private playing to a user of the personal communication device by way of a private listening accessory, such as headphones. In one embodiment, the music item(s) selected can be added to a playlist for private playing. The playlist can be presented for viewing on the personal communication device and in some cases, made available to the user for manual selection of specific content or connections. It should be noted that the individuals selected can be prequalified according to a specified criterion.

These and other embodiments of an environment where the lighting subsystem may be deployed are discussed below with reference to FIGS. 36, 37 and 38. However, those skilled in the art will readily appreciate that the detailed description given herein with respect to these figures is for explanatory purposes only and should not be construed as limiting.

Figure 36:
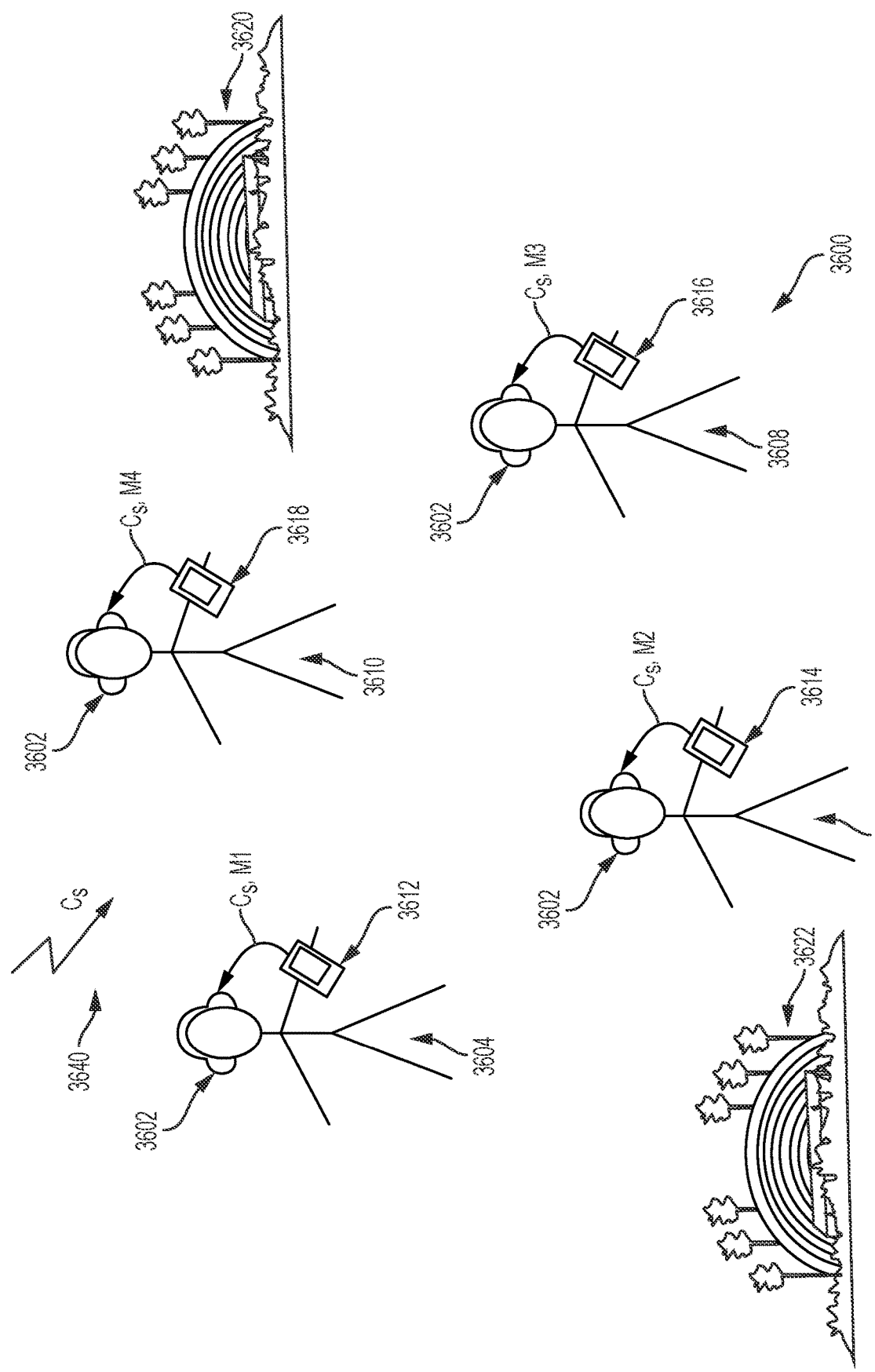
FIG. 36 shows a representative shared music session.

FIG. 36 shows group 3600 participating in a multifaceted event. Along the lines of a music festival, group 3600 can congregate at the event. The congregating can occur in separated areas, for example, at a first stage 3620, a second stage 3622, a food court exhibition area, etc. The participants can each be apprised of event updates by, for example, SMS messaging, emails (similar to a silent disco), instant messages, or a dedicated communication app such as the aforementioned audio communication or preferred audio systems. An event update might be an announcement that a particular act is about to perform at an identified stage. Each personal communication device (PCD) can privately play content for the associated member of group 3600. The member can select the content it will receive. By privately playing it is meant that only the member in possession of the personal communication device can hear the privately played content. This audio privacy can be accomplished using private listening accessory 3602 along the lines of a head phone, ear bud, and so on. The members may be listening to the same content broadcast, or listening to customized and/or selected content. The lighting display may be correlated to the selected content.

The members may be listening to the same content broadcast, or listening to customized and/or selected content.

In order to participate in the multifaceted event communications, each of PCD 3614-PCD 3618 must include communications infrastructure and a control interface to select and play appropriate content. In order to assure that each of the personal communication devices in group 3600 has access to the content, a communication application (not shown) can be provided and stored on each of the personal communication devices. In one embodiment, the communication application can be part of an operating system provided upon the original purchase of a personal communication device. Alternatively, the communication application can be obtained after-market using, for example, remote media management services along the lines of iTunes. On the other hand, the communication application can be obtained in an ad hoc manner during, for example, an initial invitation session whereby part of an individual acceptance of an invitation to participate in the shared music session (using email, SMS messaging, Facebook, and so on) involves downloading and installing the communication application with a subsequent verification and acceptance.

In some cases, the system may communicate over an ad hoc P2P network, or by direct by broadcast 3640 communications. It should be noted that broadcast 3640 can take the form of a wireless RF transmission using any number and combination of available wireless protocols. For example, broadcast 3640 can take the form of conventional over the air (OTA) AM or FM broadcast in which case the user can be instructed to manually input the appropriate tuning instruction to their respective personal communication device. Alternatively, broadcast 200 can take the form of a Wi-Fi or Bluetooth RF signal that the communication application can recognize as including the updated music characteristic information.

If the system utilizes an ad hoc P2P network a limited number of members of group 3600 (referred to as initiators) can be identified to seed the P2P network with announcements or a menu of available content. For a more detailed description of the heuristics of distributing information in an ad hoc P2P network please refer to "On Disseminating Information Reliably Without Broadcasting", Proc. 7$^{th}$ Int. Conf. on Distributed Computing Systems (ICDCS-7), pp. 74-81 Berlin, September 1987 by Alon, N., Barak, A. and Manber, U and "An Asynchronous Algorithm for Scattering Information Between the Active Nodes of a Multicomputer System", Journal of Parallel and Distributed Computing, Vol. 3, No. 3, pp. 344-351, September 1986 by Drezner, Z. and Barak each incorporated by reference in their entireties. Assuming that member 3606 has been designated as an initiator, member 3606 can seed ad hoc P2P network with the event information. Member 3606 may be replaced by an initiation server acting as a control station.

It is foreseeable that due to local conditions, it may not be possible to reliably send information from one node directly to another node in P2P network. For example, PCD 3614 belonging to member 3606 (initiator) can broadcast token T that can be received by PCD 3612 and PCD 3616 belonging to members 3604 and 3608, respectively. However, member 3610 may be too far away or may be in an area (such as behind a wall) where direct reception by PCD 3618 is unlikely. Therefore, each node of network can be instructed to retransmit the information wirelessly upon receiving information wirelessly. For example, when PCD 3616 (as well as PCD 3612) wirelessly receives the event information each can generate re-broadcast a signal that includes the event information received from member 3606. In this way, PCD 3618 can receive re-broadcast content information from PCD 3616 (as well as that from PCD 3612).

In some cases, a multifaceted event can have session rules. The session rules can define various relationships and actions that can occur between the members of the group during a specific session. For example, the session rules can provide criteria for identifying networking proposals for individual members to connect during the session. In this way, by setting the session networking rules individual members can be identified to each other and establish social networking communications.

Figure 37:
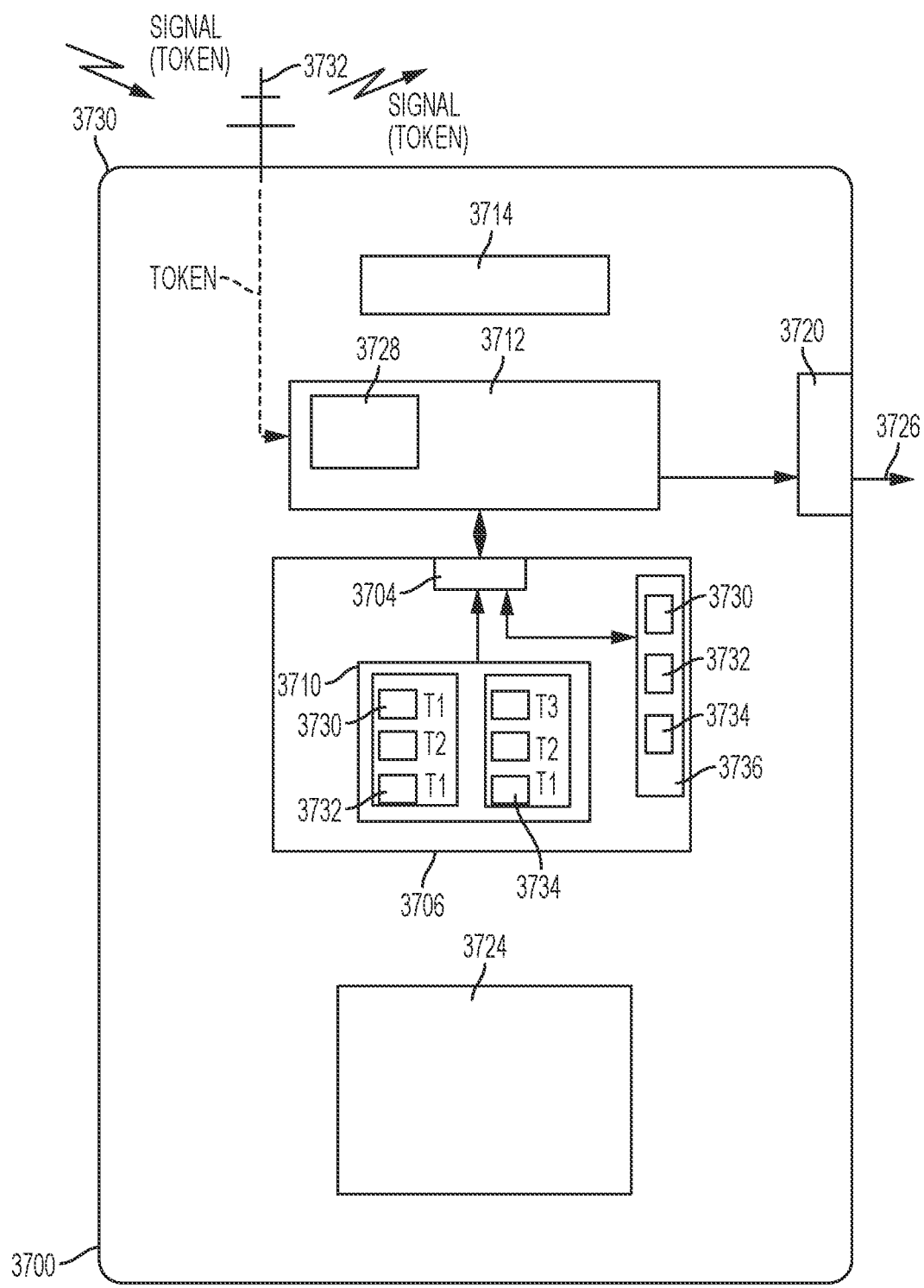
FIG. 37 shows an embodiment of a PCD during a shared music session.

FIG. 37 shows a block diagram of a representative personal communication device (PCD) 3700 in accordance with the described embodiments. PCD 3700 can be formed to include at least housing 3702 configured to enclose and support various operational circuits. In some cases, PCD 3700 can include controller 3704 used to control data storage device 206 that can be used for storing a plurality of data files that can take the form of, for example, audio data, textual data, graphical data, image data, video data and multimedia data. The stored data files can be encoded either before or after being stored using a variety of compression algorithms. It should be noted that a user can interact with manager 3712 through an interface. For example, audio content can be compressed using MP3, AAC and Apple Lossless compression protocols. Other data may be compressed using protocols appropriate to such data. The audio content can include, for example, auxiliary content files 3708 stored in memory 510 controlled by the content manager 3712. Content manager 3712 can be embodied as software executed by processor 3714 or as a separate hardware component. In any case, content manager 3712 can control the audio output of content files 3708 stored in memory 3710. The content may also include available content menus, in audio or graphic form as well as social networking criteria and/or identification.

During operation, for example, content manager 3712 can select content item 3716 from auxiliary content 3708 which can be decoded using an appropriate codec. The decoded content file can then by output as audio signal 3718 to audio output interface 3720. In accordance with one embodiment, content manager 3712 can select content items 3716 identified by a user through a guide or by voice command. Furthermore, content manager 3712 may receive transmission of content and play such content substantially in real time, subject to loading, buffering and decoding delays and subject to any user control such as pause or rewind or replay.

Content may include a tag 3722 to identify content type or other characteristic of the auxiliary content. For example, in a music festival the tag may indicate that the content is a commercial advertisement or offer. The tag may indicate information regarding purchase of the content, or may identify the facet of the multifaceted event that the content relates to. For example, the tag may indicate that the content relates to a performance on stage.

User input interface 3724 can assist a user of PCD 3700 in controlling various functions performed by PCD 3700. For example, user interface 3724 can include a touch sensitive layer (not shown) that can facilitate the use of a user touch event for inputting control instructions or the user interface may be an audio interface for voice commands. In the case where PCD 3700 includes speakers, then audio signal 3718 can be broadcast to the external environment via the speakers. However, in those situations where PCD 3700 does not include speakers, or the speakers can be bypassed, PCD 3700 can include private listening interface 3726 suitable for directing audio signal 3718 to an external transducer associated with a personal listening accessory, such as earphones, ear buds, and so on. The personal/listening device may also include a microphone for detecting and sensing audio. In this way, the user of PCD 3700 can privately listen to audio output by music manager 3712. PCD 3700 can also include wireless interface 3728 arranged to both receive and transmit information by way of any suitable wireless protocol such as, for example, Wi-Fi, Bluetooth, and so on capable of accessing various configurations of wireless networks, such as WLAN or peer to peer (P2P). It should be noted that even though only a limited set of components are shown this does not imply a limitation on the functional components that can be included in PCD 3700. For example, in addition to the components shown in FIG. 37, embodiments of PCD 3700 can also include a power connector, a data transfer component, voice recognition circuits, and so on.

Content manager 3712 can customize the audio experience of the user. The audio may be processed to enhance and/or mask aspects of the audio to be delivered to the user, for example, in accordance with the techniques described herein.

In another implementation, content manager 3712 can control social networking functionality. Selective networking may be provided by identifying participants in the event that satisfy a selection criteria. The system may allow a user the option of establishing networking communications with other participants who satisfy the selection criteria and designated by one or both users.

A communication application 3728 can provide instructions executable by processor 3714 for controlling the operations of PCD 200. In the described embodiment, the communication application can be downloaded from an online data store automatically or as a result of a user selection at user interface 3724 from a central media management application (such as iTunes™) or from Apps Store maintained by Apple Inc. Alternatively, communication application 3728 can be present at the time of original purchase. In any case, communication application 3728 maintains a connection table to be periodically updated. The updating can occur, for example, during a synchronization operation performed between PCD 3700 and a central media management application (such as iTunes™). The updating can also occur on an ad hoc basis.

Communication application 3728 can provide a mechanism by which a user of PCD 3700 can participate in a social networking experience provided that a connection between two users satisfies a criteria identifying a suggested connection. In addition to providing services required for participation in the social networking experience, communication application 3728 can provide PCD 3700 with at least the appropriate network protocols required to exchange information with other personal communication devices in a P2P network. In addition to providing the requisite communication protocols, communication application 3728 can provide services related to categorizing music items stored on PCD 3700 based upon various values of a particular music characteristic. The selection and networking function can be based in or distributed among PCDs or be server based. In a server-based system, the server may be local (logically) to the multifaceted event or remote such as a server connected through a wide area network including, without limitation, the Internet.

In any case, PCD 3700 can obtain a connection token T by way of RF transmission 3730. It should be noted that if PCD 3700 is a node in a P2P network, RF transmission 3730 can originate from another personal communication device within the network. In this situation, upon receiving token T, PCD 3700 can generate re-broadcast signal 3732 that includes at least token T while storing only tokens designated for that user. In this way, other personal communication devices with the P2P network can receive connection tokens applicable to other devices. Tokens can be transmitted by way of RF transmission 3730 that originates from a central broadcaster unit. It is also possible that PCD 3700 does not have wireless capabilities, in which case the token T can be provided by the communication application 3728. In this way, a more limited session can be held since only those personal communication devices that have the same version of communication application 3728 can participate. For example, in order to participate, PCD 3700 may require the latest version of token T which can be obtained during, for example, a synchronization operation performed between the personal communication device and a central media management application.

Once token T has been received, processor 3714 can determine if token T has an indication of supplemental content. For example, token T can indicate availability of content which might be background information, coupon or commercial offers, or schedules. In this case, the user may have the option to listen to the supplemental content which may be requested or accessed and can be privately played by PCD 3700. Accordingly, content 3730, 3732, and 3734 each tagged as an ID that corresponds to token t1 may be accessed. In the described embodiment, a content venue 3736 can be visually displayed at interface 3724.

Figure 38:
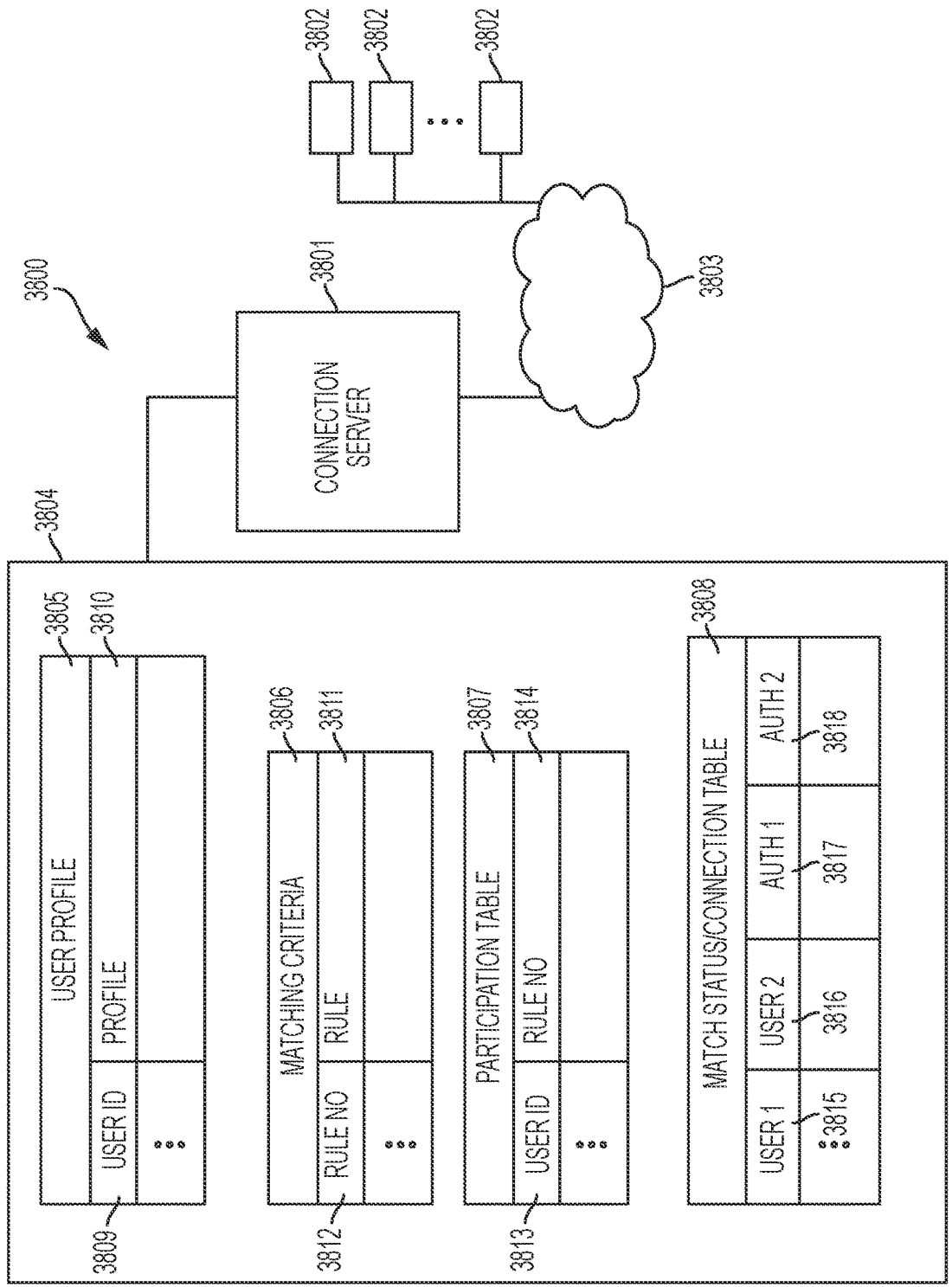
FIG. 38 shows a content selection system.

FIG. 38 shows an event-centric networking matching system 3800. The system includes a connection server 3801 connected to a plurality of user personal communication devices 3802 by a network 3803. The personal communication devices 3802 may have an interface for users to control, provide instructions, and provide information to the system. Alternatively, the instruction and information interface may be a separate terminal also connected to the network 3803. The network 3803 may be a wired or wireless local area network or wide area network. The connections may be by Bluetooth, peer-to-peer connections, small cell LTE or any other connection mechanism. The system is not specific to a particular network. The communication server 3801 may be connected to data store 3804.

FIG. 38 illustrates a single data store 3804 in the form of a database management system however individual tables or distributed tables may be utilized. The data may be distributed among the users 3802 or centrally located. The data may include user profile data 3805 composed of a user ID 3809 associated with a profile 3810. The profile may include any information used by the system related to the user, for example, user name, password, gender, musical tastes, playlist, age, geographic location and any other demographic information. The system may also include a matching criteria table 3806. The criteria table may include a plurality of rules 3811, each associated with a rule number 3812. In addition, the system may include a participation table 3807 which includes a user ID 3813 as an index and a rule number 3814 correlating to rule numbers 3812 of the matching criteria table 3806. The participation table 3807 includes a list of user IDs correlated to the rule numbers and the matching criteria table 3806 includes those rule numbers correlated to matching criteria. Each user may be subscribed to one or more of the criteria as indicated by entries in the participation table 3807. The matching criteria may include one or more requirements such as an identification of an event, a location service matching criteria, demographic matching criteria, a flag indicating appearance in a contact or approved list, and other criteria. In the example of a multi-faceted event such as a concert festival, the system may first identify all users who are participating in the event, i.e. are attending the music festival. This may be accomplished by determining which users have purchased tickets or have a token on their PCD indicating they have been admitted to the event. Alternatively, participation may be determined by location services. Each user may establish or subscribe to criteria which, if satisfied, suggests a connection. A matched status connection table 3808 may be established in order to identify connections approved in accordance with the proper operation of the system. The system may go through each entry in participation table 3807. For each entry the rule corresponding to the user ID may be utilized to evaluate all of the entries in the user profile table. When an entry in the user profile table satisfies a user ID rule designation, an entry may be placed in the matched status connection table 3808 of the user ID in the user 1 field 3815. The ID of the user who satisfied the criteria may be placed in user 2 field 3816. The system may use different logic or sequences, but the idea is to create a table which has an entry for each pair of users who both satisfy the other's designated criteria. The designated criteria may be customized by each user and/or established by the system. An additional feature may permit each participant in a connection to approve or deny access even though the established criteria have been satisfied. Alternatively, one of the criteria may be approval of the matching user.

The system may also be able to establish communication groups so that connections may be one-to-many or even one-to-all. This may be established by user ID corresponding to a group criteria and each individual user who matches the group criteria is connected in the group. The system may impose an artificial limitation of allowing participation in only a single group.

Figure 39:
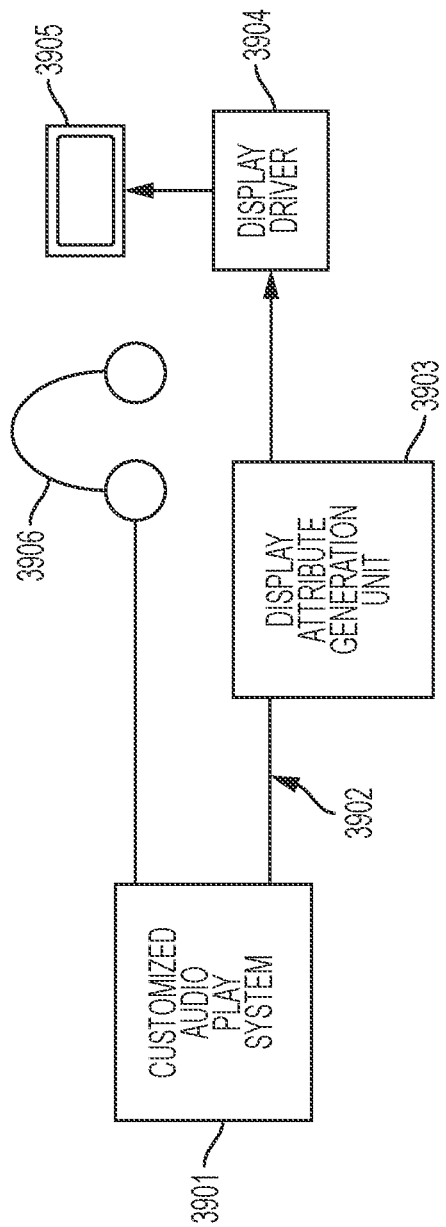
FIG. 39 shows an embodiment of a personalized lighting display system.

FIG. 39 shows an audio play system 3901. The audio play system 3901 has an output representative of one or more aspects of the audio selection. A display attribute generation unit 3903 may be provided and is responsive to the signal representative of content 3902. The customized audio play system 3901 may be connected to personal audio speakers 3906. The personal audio speakers 3906 may be headphones, earphones, or any other device for converting electrical signals to audio.

The display 3905 may constitute one or more light elements. The light elements may be LED light elements or any other light emitting element. The display 3905 may be monochrome or controllable to vary the color, intensity, and image of the lighting output. The display 3905 may have one or more color points such as the Pixmob or Xyloband displays. The display 3905 may be suitable to display image or video. The display 3905 may be mounted on a headphone or may be wearable in some other fashion, although it is not necessary for the display 3905 to be mounted on or even co-located with a user. The signal representative of content 3902 must be derived in part from the operational parameters of the customized audio play system. While the display 3905 may in part be controlled by audio intensity in the fashion of a light organ, the signal representative of content must include, in part, a signal representative of operating parameters. The operating parameters may include audio source selection, non-audio control signals, user-selected parameters, system-selected parameters, content-type parameters or other non-audio parameters.

A display attribute generation unit 3903 may be provided to generate signals to be displayed. Those signals may be provided to the display driver 3904.

As an example, the light display system might be utilized in connection with a system shown in FIGS. 36-38 for a multi-stage concert event. In such a multi-stage concert event, each user may customize the audio being provided to a headphone by selection of one stage to be included in the user's customized audio. The light attribute to be displayed will in some way correspond the selected stage. For example, a country music stage may be designated by the color red, a rock and roll stage may be designated by the color white, and a techno stage may be designated by blue. When a user selects which stage to include in a customized audio feed, the display 3905 may be illuminated with the corresponding color.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention. For the sake of clarity, D/A and A/D conversions and specification of hardware or software driven processing may not be specified if it is well understood by those of ordinary skill in the art. The scope of the disclosures should be understood to include analog processing and/or digital processing and hardware and/or software driven components Thus, specific apparatus for and methods of a customized audio display system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Figure 40:
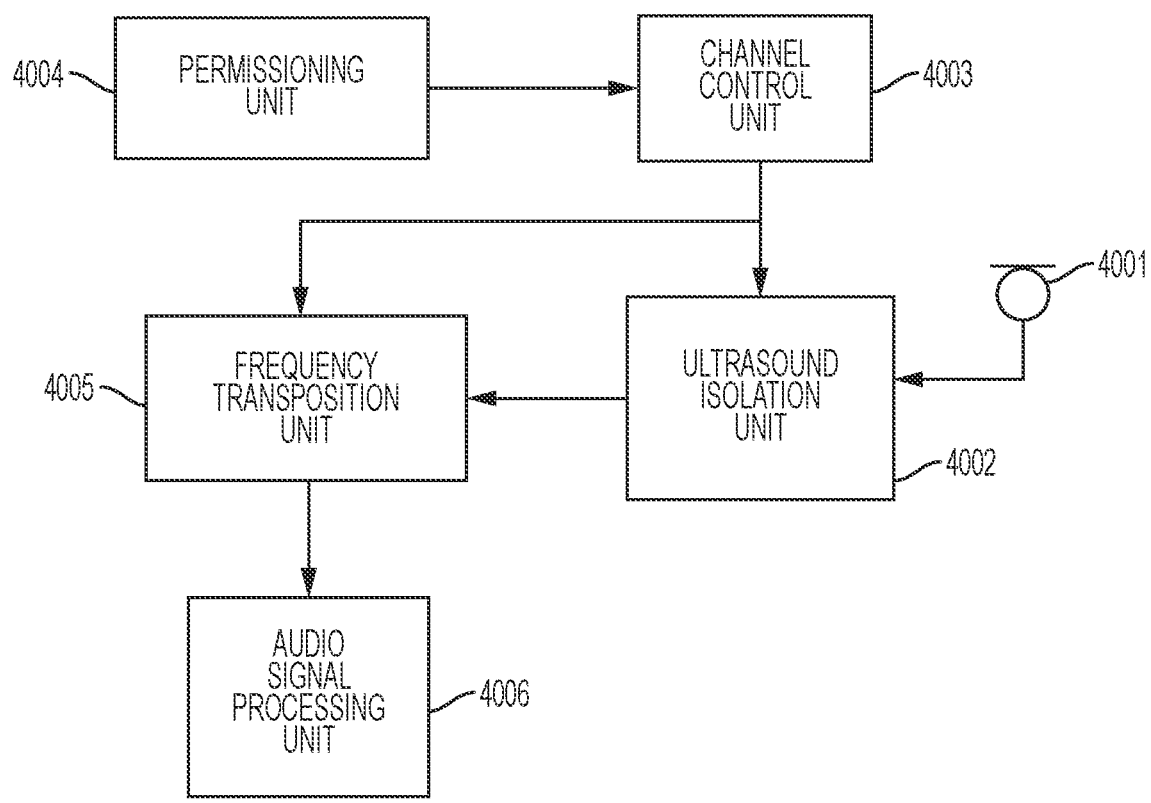
FIG. 40 shows a schematic of a narrowcast messaging system.

FIG. 40 shows a schematic of a narrowcast messaging system. In particular, FIG. 40 illustrates the receiver side of the messaging system. A transducer 4001 is provided to convert acoustic signals to electrical signals. The transducer of FIG. 40 may be suitable for detecting acoustic waves in the ultrasound frequency band. The transducer may also be suitable to detect acoustic signals in the audible frequency range. The transducer 4001 may be connected to an ultrasound isolation unit 4002. The ultrasound isolation unit 4002 may be responsive to a channel control unit 4003. The channel control unit 4003 may be responsive to a permissioning subsystem 4004. A frequency transposition unit 4005 may be responsive to the ultrasound isolation unit 4002 and the channel control unit 4003. The frequency transposition unit 4005 may have an output of an electrical signal corresponding to audio information. The audio information may be provided to an audio signal processing unit 4006.

The audio signal processing unit 4006 may be provided to output audio information to a user. In one embodiment the audio signal processing unit may be a preamp connected to a speaker such as an earphone or headphone. In another embodiment the audio signal processing may be an audio customization unit.

In operation, an ultrasonic beacon system may be provided. An example of a beacon system is the iBeacon compatible transmitters. See https://developer.apple.com/iBeacon/. The Apple iBeacon system use Bluetooth LE. A beacon system may include an ultrasonic transmitter. Beacons, such as the iBeacon have localized transmission and are designed to assist in determining proximity of a receiving device to the beacon.

A drawback to a proximity sensing system is that it can only determine proximity to a particular beacon and to some extent distance from a particular beacon. The beacon may be designed to work with a directional sensing audio receiver.

An embodiment may include a microphone array having two or more spaced microphones. The microphones may receive the signal emitted by a beacon and determine the direction to that beacon. The direction may be represented in the form a vector. One or more additional beacons may be provided to facilitate the direction-sensing microphone to identify one or more vectors indicating the direction of the one or more additional beacons.

Figure 41:
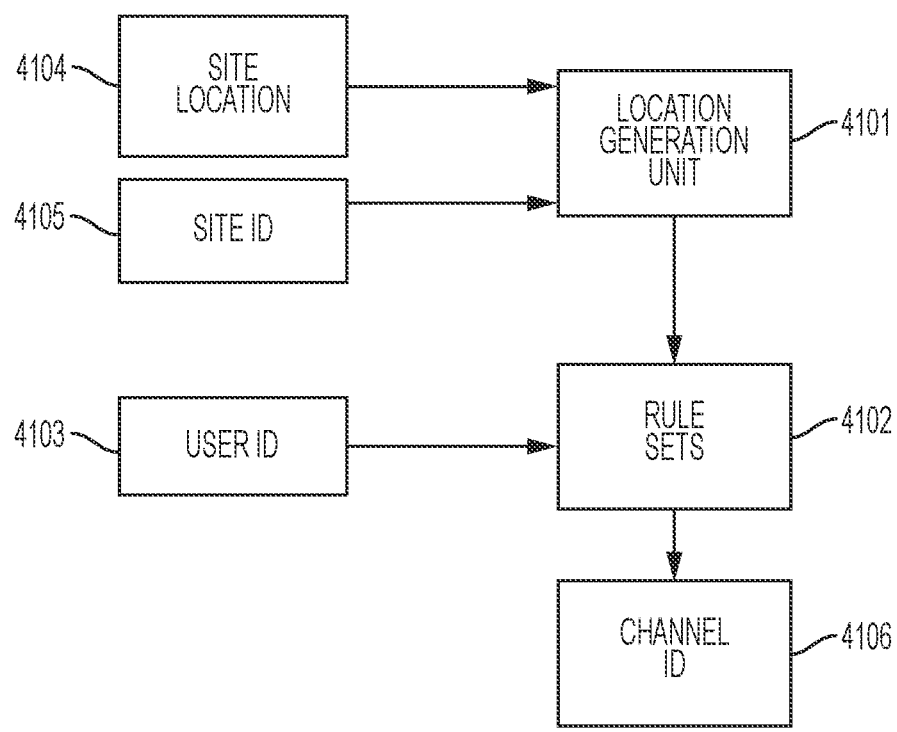
FIG. 41 shows an embodiment of a permissioning subsystem.
Figure 42:
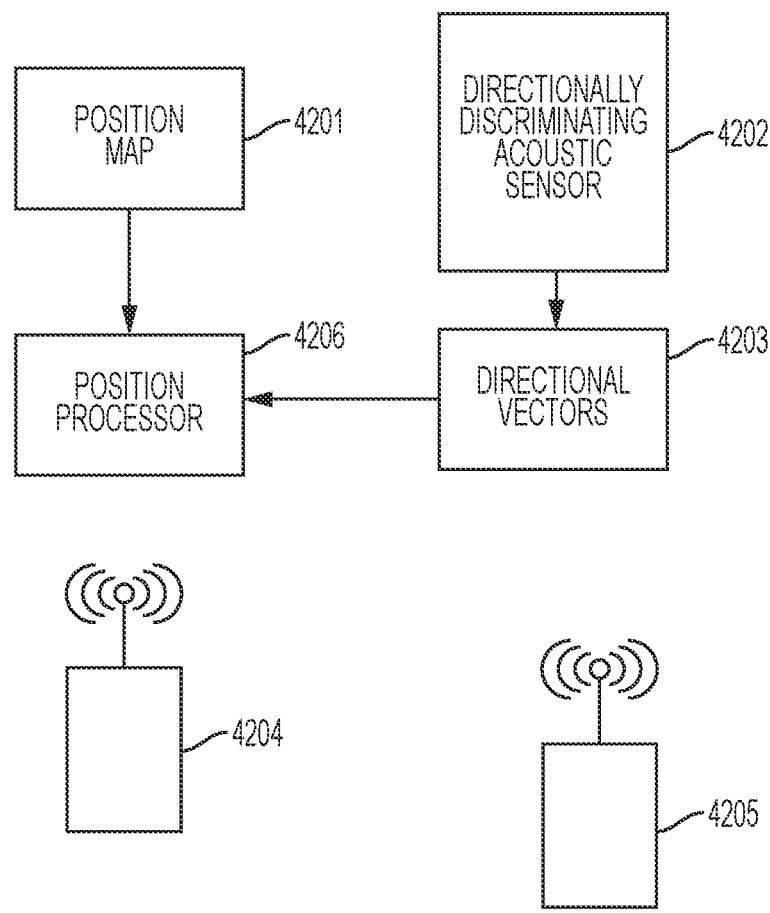
FIG. 42 shows a schematic of an embodiment of a location generation unit.

FIG. 41 shows a location generation unit 4101 which may be used with the narrowcast messaging system and FIG. 42 shows an embodiment of a location generation system which may be utilized. A position map 4201 may be a digital representation of the absolute or relative locations of two or more beacons.

A directionally discriminating acoustic sensor 4202 may be connected to a directional vector generation unit 4203. The directional vector generation unit 4203 may operate to determine the direction of a beacon 4204 relative to the acoustic sensor 4202. The directional vector generation unit 4203 may also determine a vector representing the direction of a second beacon 4205 relative to the acoustic sensor 4202 which may be a microphone array. A position processor 4206 may be responsive to the position map 4201 and the directional vector generation unit 4203. The position map is a digital representation of information sufficient to specify the relative positioning of beacons 4204 and 4205. The relative positioning of the beacons and directionality of the beacons relative to the directionally discriminating acoustic sensor 4202 is sufficient to determine the location of the array relative to the beacons. In addition, if the absolute position of one or more of the beacons is known the relative location of the array is sufficient to determine the absolute location of the array. A rule set 4102 may be responsive to the location generation unit 4101 and a user ID 4103 corresponding to the sensor 4202. The location generation unit 4101 as described in connection with FIG. 42 may base the location, in part, on information reflecting the site location 4104 and a site identification 4105.

The rule set 4102 includes logic that facilitates generation of a channel ID 4106. The channel ID represents content or instructions to be played or executed by a personal communication device on the basis of the location of sensor 4202 coinciding with a designated location subject to qualifications (contingencies) as applied by the rule sets 4102. The channel control unit 4003 may provide the channel ID 4106 to the ultrasound identification unit 4002 and the frequency transposition unit 4005.

In operation, a user wearing or carrying a microphone array, may obtain transmissions of selected information based upon positioning in or traversal of a beacon field. One example of a beacon field may be installed in a retail department store. As the array moves through the department store the system facilitates determining the precise location of the array. iBeacon technology determines proximity and utilizes signal strength to infer some measure of confidence and distance. An iBeacon has no directional sensitivity. Thus, if an iBeacon infers a distance of 3 meters, the sensor is inferred to lie on the circumference of a circle that is 6 meters in diameter. An iBeacon is unable to determine if the device is at an exact position of interest or up to six meters away. The location may be utilized along with other parameters such as user preferences and system preferences to determine what information to provide to a user. For example, a user may select to enable messaging for special offers related to a particular type of product, for example, men's clothing. The retail outlet may establish a message that communicates a special offer for certain golf shirt. As the microphone array reaches a predetermined location, which may be a location immediately adjacent to the golf shirt, the system may communicate a special offer to the user triggered by being in that location. The message may be a promotional offer for the nearby golf shirt, for example, other types of offers may also be suitable such as a promotional offer for a golfing vacation package or a promotional offer for a different related or unrelated product. The position in this example is important as the message may not be relevant to a position up to 6 meters away.

Having determined the position of an array and permissioning for a particular message, the message may be transmitted to the user. It is desirable to have the ability to restrict the message to the individual user. One embodiment is the transmission of an inaudible ultrasonic wave containing the message. Various mechanisms can be provided to allow the user to receive and isolate an ultrasonic transmission. For example, the user system may be informed of the direction of the ultrasonic transmission source relative to the microphone array. The microphone array may use beamforming techniques to isolate that direction.

Another embodiment may provide for multi-channel ultrasonic transmissions. The transmission information may be modulated at different frequencies or may be provided in a specified frequency band. The isolation system may be provided to isolate the modulated transmission on the basis of its modulation frequency or filter communications outside of the specified frequency band.

Once the desired ultrasonic frequency is received and isolated, it remains an inaudible signal. The inaudible signal may be subject to frequency transposition converting the signal from an inaudible frequency to an audible frequency, for example, a frequency in the voice band. In this manner a personalized narrowcast message may be transmitted to a user on the basis of being in or having been in a particular location.

Figure 43:
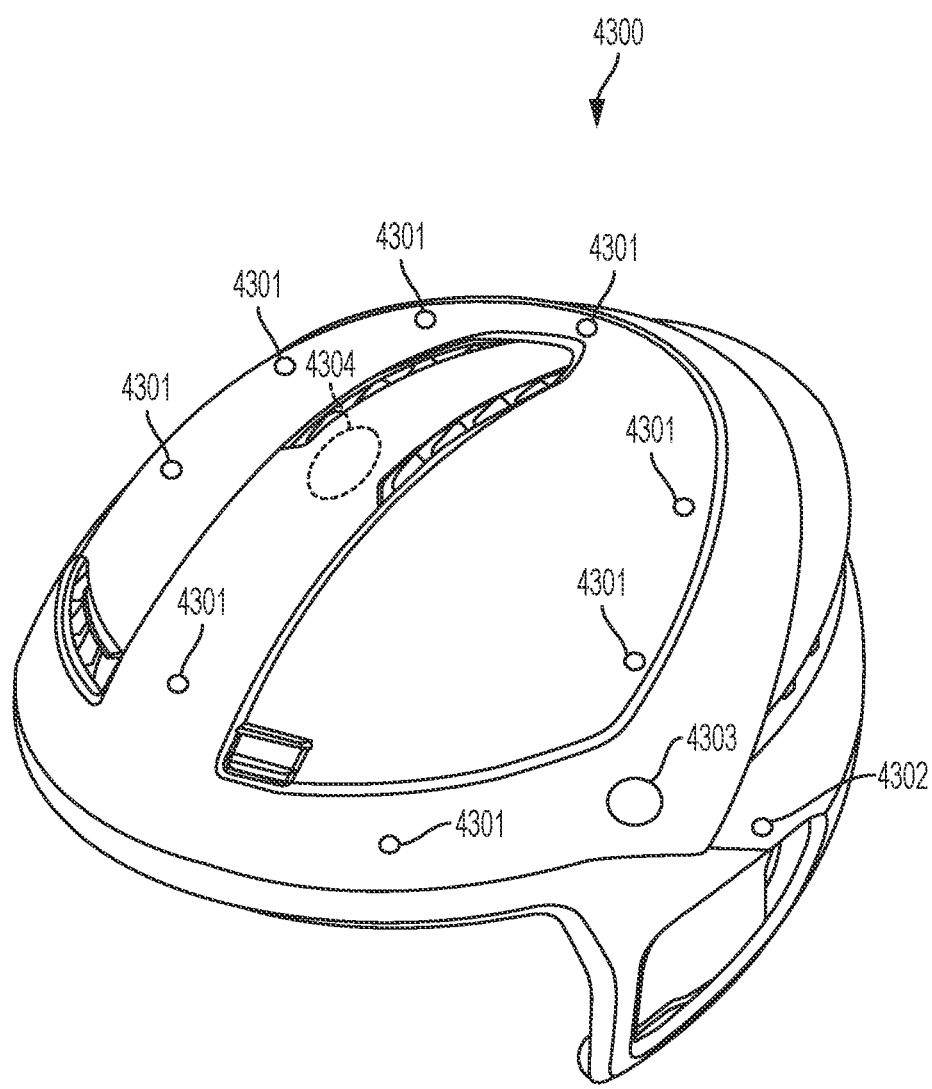
FIG. 43 shows a helmet-mounted multi-directional array.

FIG. 43 shows a multi-directional acoustic sensor integrated into a ski helmet 4300. Multi-directional acoustic sensors may be similarly integrated into other types of headgear, particularly protective headgear. For example, but without limitation, construction hardhats, bicycle helmets, football helmets, hockey helmets, skateboarding helmets, batting helmets, combat helmets, or any other kind of protective headgear. The elements described herein may be integrated directly into the outer surface of protective headgear integrated into a shell attached to the protective headgear.

The headgear may include a plurality of microphones 4301 mounted onto a surface of the headgear 4300. Because of the typical dimensions of protective headgear it is possible to position microphone element 4301 at a greater distance from each other than microphone elements integrated into the headband of a pair of headphones. The accuracy of the sensing array is dependent in part upon the distance between the microphone elements, and as such implementation of a multi-directional acoustic sensor on protective headgear may enhance the accuracy of the directional location and isolation.

One or more additional microphone elements 4302 may be attached to the protective headgear 4300 at a position that is not coplanar with microphone element 4301. Advantageously, microphone element 4301 may be positioned around the crown of the headgear and additional microphones 4302 may be positioned at a location corresponding to a wearer's ears or lower. The protective headgear 4300 may also be provided with a motion sensor 4303. The location of the motion sensor is not critical.

The protective headgear 4300 may also be provided with an ultrasonic transmitter 4304. The ultrasonic transmitter 4304 is useful to generate an ultrasound signal operating as a beacon. The ultrasound signal may be inaudible and may also be coded for identification purposes. In an alternative configuration, an audible acoustic transmitter or radio frequency transmitter, such as an iBeacon or other BLE beacon may be used. The transmitter facilitates identification and location of the protective headgear.

Figure 44A:
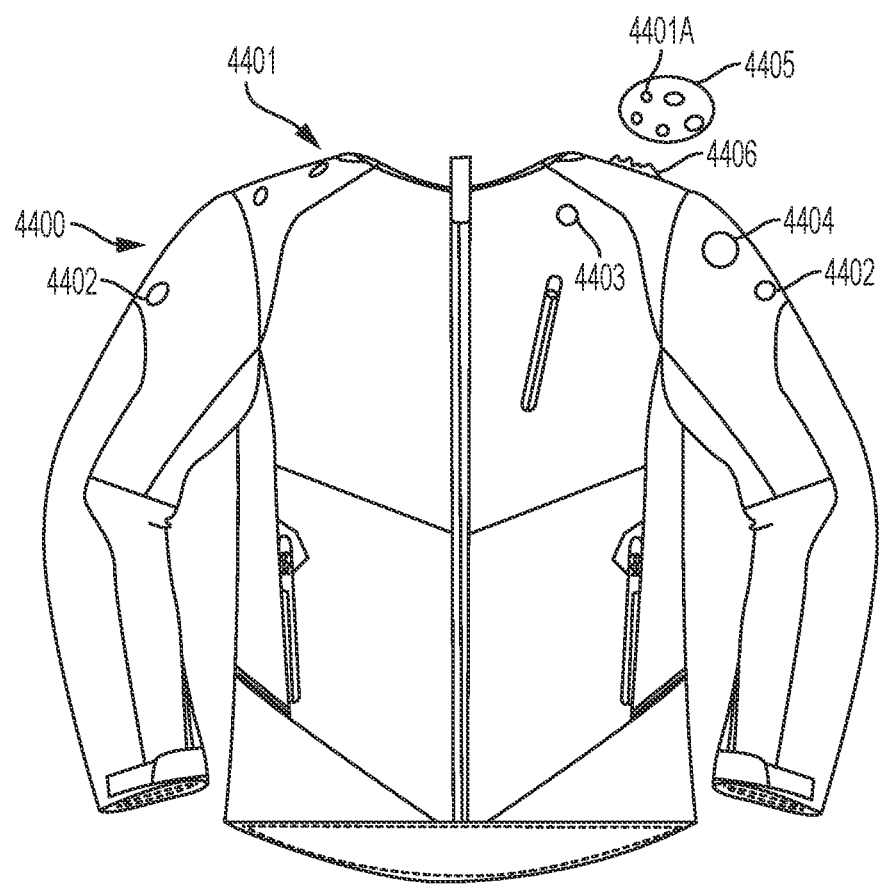
FIG. 44A shows a front view of a headphone mounted array.
Figure 44B:
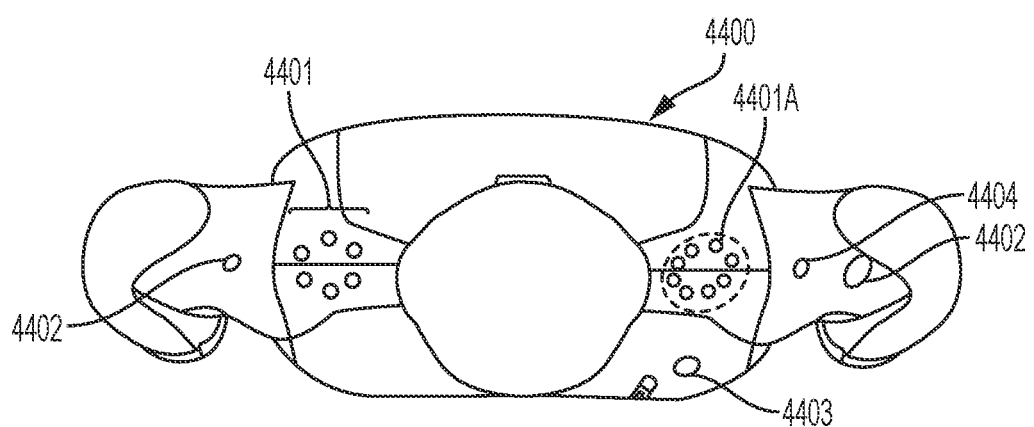
FIG. 44B shows a jacket-mounted multi-directional array.
Figure 45:
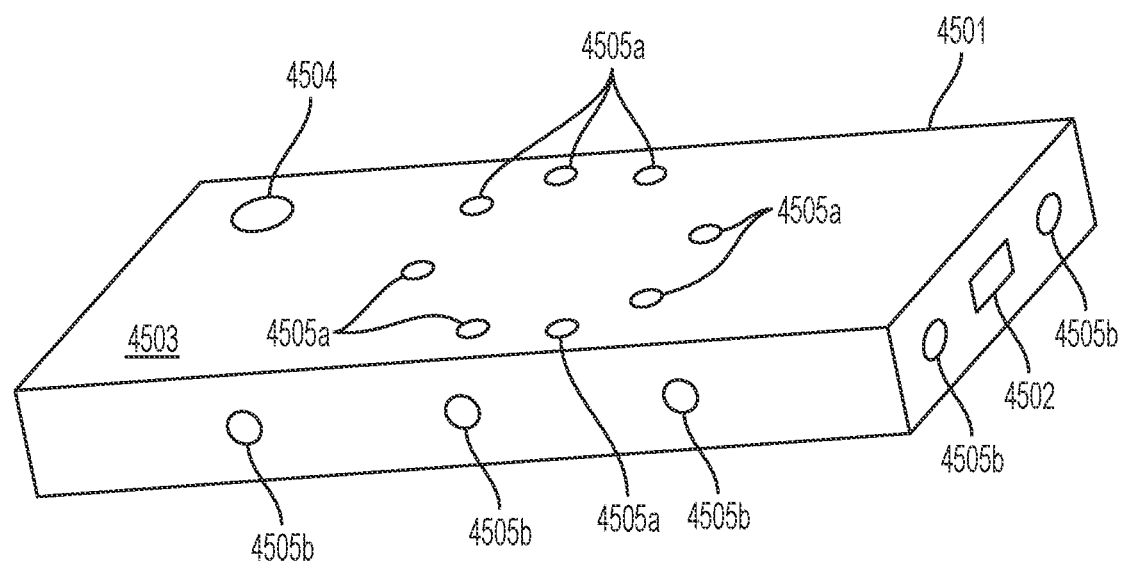
FIG. 45 shows a smartphone with an integrated microphone.
Figure 46:
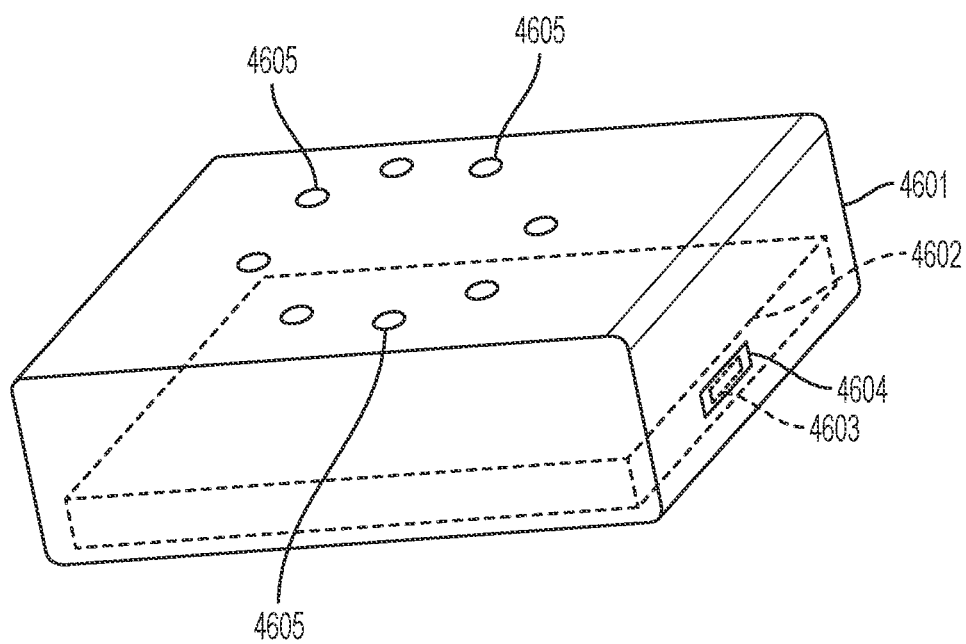
FIG. 46 shows a smartphone or smartphone case with an integrated microphone array.
Figure 47:
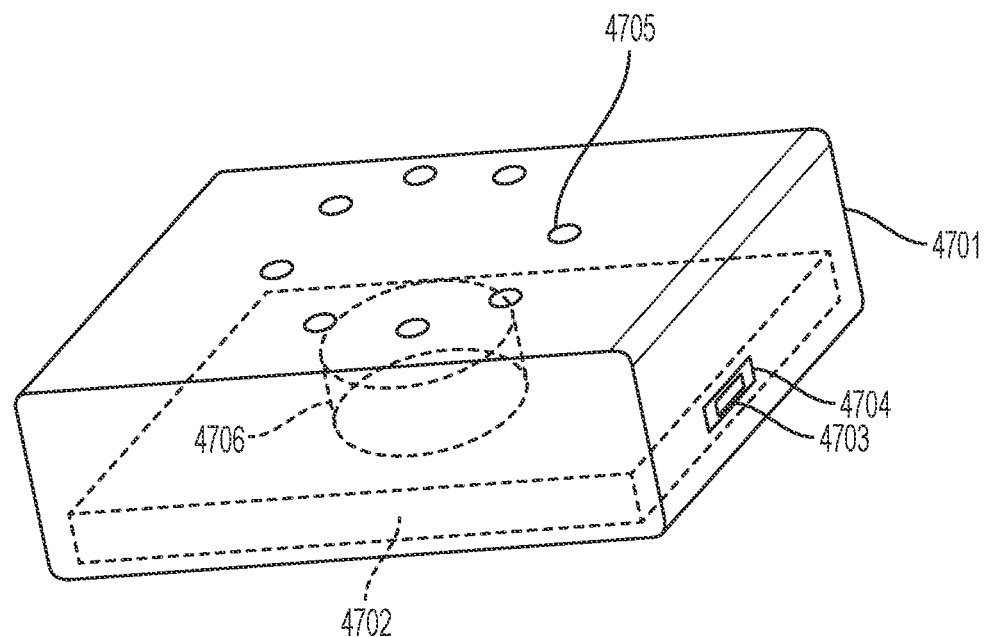
FIG. 47 shows a smartphone case with an integrated microphone array and an auxiliary power supply.
Figure 48:
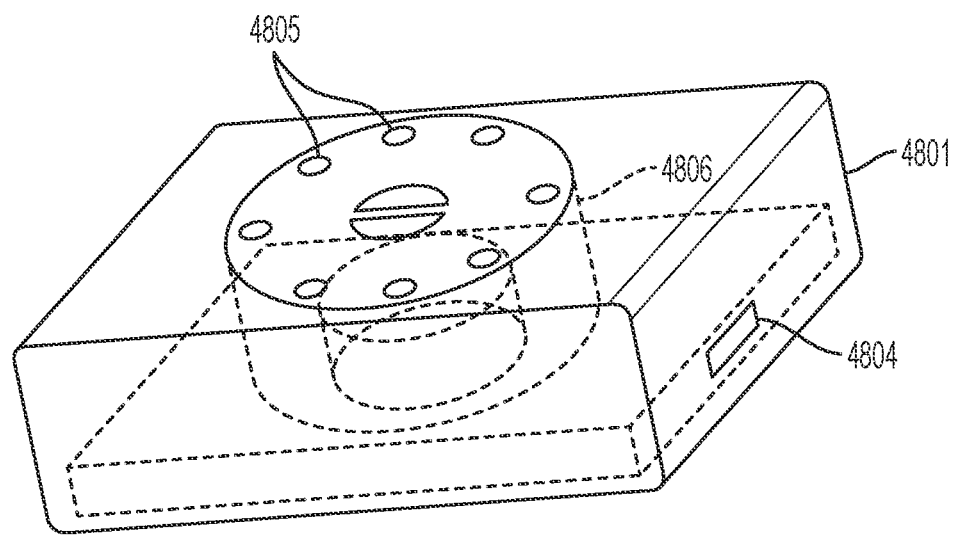
FIG. 48 illustrates a smartphone case with a removable microphone array and battery module.
Figure 49:
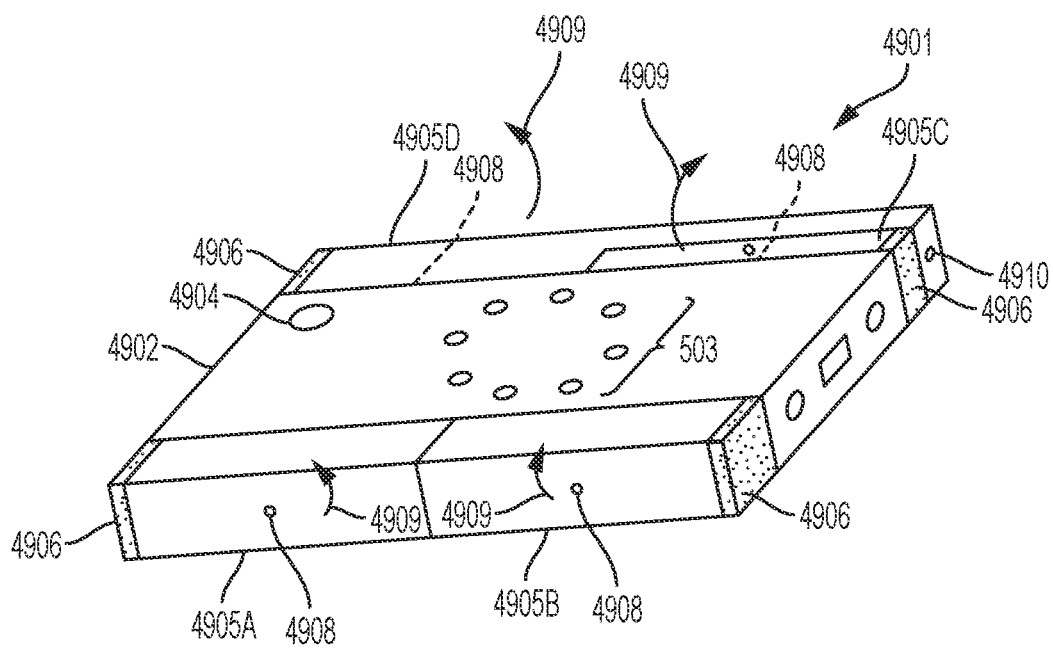
FIG. 49 illustrates a smartphone or smartphone case with an integrated microphone array having pivot-mounted legs and aerial.
Figure 50:
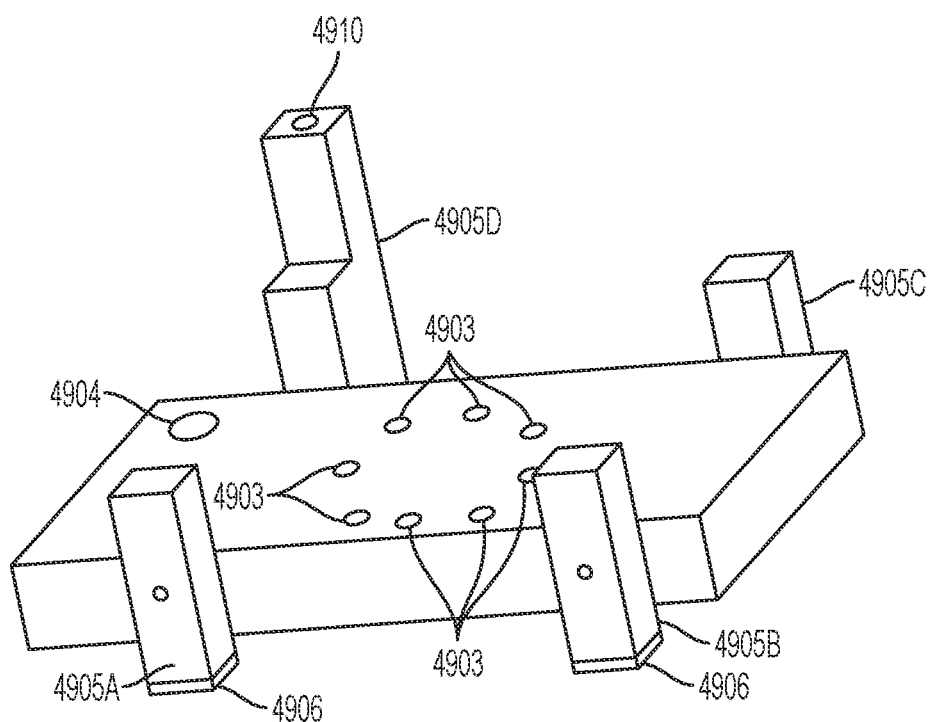
FIG. 50 shows a smartphone or smartphone case according to FIG. 5 in a deployed configuration.
Figure 51:
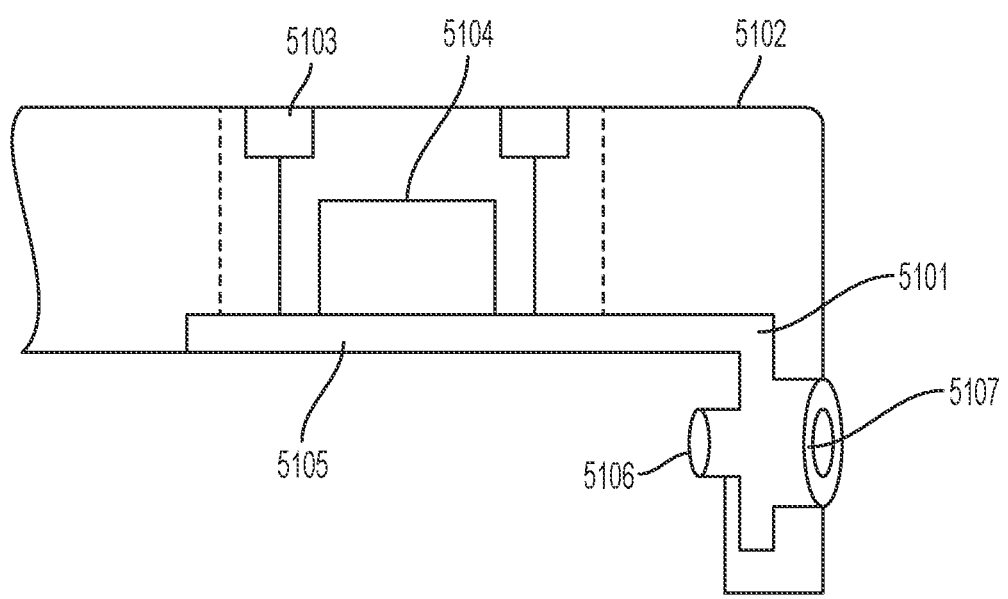
FIG. 51 shows a cross-section of an interface connector.

FIGS. 44A and 44B show a multi-directional acoustic sensor integrated into a ski jacket 4400. Multi-directional acoustic sensors may be similarly integrated into other types of outerwear, particularly activewear. For example, but without limitation, ski jackets, sports jerseys, jumpsuits, flack jackets, biker jackets, bomber jackets, dusters, water ski vests, live preservers, or any other garment to be worn on a torso. The acoustic sensor elements described herein may be integrated directly into the outer surface of the outerwear or integrated into a shell worn over the outerwear.

The jacket may include a plurality of microphones 4401 mounted onto a surface of the jacket 4400. Because of the typical dimensions of outerwear, it is possible to position microphone element 4401 at a greater distance from each other than microphone elements integrated into the headband of a pair of headphones. The accuracy of the sensing array is dependent in part upon the distance between the microphone elements, and as such implementation of a multi-directional acoustic sensor on outerwear may enhance the accuracy of the directional location and isolation. Microphone element 4401 may be positioned directly on the jacket 4400 or microphone elements 4401 may be positioned on a base 4405 attached by a fastener 4406. The fastener 4406 may be hook and loop buttons, snaps, or other fasteners.

One or more additional microphone elements 4402 may be attached to the jacket 4400 at a position that is not coplanar with microphone element 4401. Advantageously, microphone element 4401 may be positioned on the shoulders or around the collar and neckline and additional microphones 4402 may be positioned at a location lower than the microphone elements 4401. The jacket 4400 may also be provided with a motion sensor 4403. The location of the motion sensor is not critical.

The jacket 4400 may also be provided with an ultrasonic transmitter 4404. The ultrasonic transmitter 4404 is useful to generate an ultrasound signal operating as a beacon. The ultrasound signal may be inaudible and may also be coded for identification purposes. In an alternative configuration, an audible acoustic transmitter or radio frequency transmitter, such as an iBeacon or other BLE beacon may be used. The transmitter facilitates identification and location of the protective outerwear. The techniques, processes and apparatus described may be utilized to control operation of any device and conserve use of resources based on conditions detected or applicable to the device.

The techniques, processes and apparatus described may be utilized to control operation of any device and conserve use of resources based on conditions detected or applicable to the device. For the sake of clarity, D/A and A/D conversions and specification of hardware or software driven processing may not be specified if it is well understood by those of ordinary skill in the art. The scope of the disclosures should be understood to include analog processing and/or digital processing and hardware and/or software driven components.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of audio signature generation and automatic content recognition have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A directional recording system comprising:
    a beam forming unit responsive to a directionally discriminating acoustic sensor;
    a location processor connected to said beam forming unit and responsive to a motion sensor for identifying direction of an audio source;
    a beam steering unit connected to said location processor and to said directionally discriminating acoustic sensor; and
    a digital storage unit connected to said beam steering unit and said location processor wherein said digital storage unit contains audio information and directional information corresponding to said audio information; and
    a record controller connected to said digital storage unit.

2. The directional recording system according to claim 1 wherein said digital storage unit stores information representing directionally isolated acoustic information and information representing directional cues corresponding to said directionally isolated acoustic information.

3. The directional recording system according to claim 2 wherein said record/playback controller is an audio buffer controller.

4. The directional recording system according to claim 2 wherein said record/playback controller is a session controller.

5. The directional recording system according to claim 4 wherein said record/playback controller further comprises and audio buffer controller.

6. The directional recording system according to claim 5 further comprising an audio spatialization engine attached to said digital storage unit wherein said audio spatialization unit combines said information representing directionally isolated acoustic information with information representing directional cues.

7. The directional recording system according to claim 6 wherein said audio spatialization engine further comprises a structure that combines said information representing directionally isolated acoustic information with information representing directional cues using head-related transfer functions.

8. The directional recording system according to claim 7 wherein information representing directional cues connected to said spatialization engine is specified by said record controller.

* * * * *